US012558647B2

(12) United States Patent
Cully et al.

(10) Patent No.: US 12,558,647 B2
(45) Date of Patent: Feb. 24, 2026

(54) STRUCTURE WITH EXTERNAL SUPPORT FOR PARTICLE ADSORBENT BED FOR ADSORPTION GAS SEPARATION PROCESS

(71) Applicant: W. L. Gore & Associates, Inc., Newark, DE (US)

(72) Inventors: Edward H. Cully, Clarksville, VA (US); Christine M. Scotti, Newark, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 321 days.

(21) Appl. No.: 18/216,769

(22) Filed: Jun. 30, 2023

(65) Prior Publication Data

US 2024/0001284 A1 Jan. 4, 2024

Related U.S. Application Data

(60) Provisional application No. 63/357,925, filed on Jul. 1, 2022.

(51) Int. Cl.
*B01D 53/04* (2006.01)
*B01D 53/047* (2006.01)
(Continued)

(52) U.S. Cl.
CPC ..... *B01D 53/0438* (2013.01); *B01D 53/0446* (2013.01); *B01D 53/0462* (2013.01);
(Continued)

(58) Field of Classification Search
CPC ................ B01D 53/0438; B01D 53/04; B01D 53/0446; B01D 53/0462; B01D 2253/202;
(Continued)

(56) References Cited

U.S. PATENT DOCUMENTS 3,186,149 A 6/1965 Ayers
3,278,673 A 10/1966 Gore
(Continued)

FOREIGN PATENT DOCUMENTS

CA 934939 A 10/1973
DE 3030967 A1 3/1982
(Continued)

OTHER PUBLICATIONS

International Preliminary Report on Patentability in International Application No. PCT/US2023/026696, mailed on Jan. 16, 2025, 12 pages.

(Continued)

*Primary Examiner* — Frank M Lawrence, Jr.
(74) *Attorney, Agent, or Firm* — Fish & Richardson P.C.

(57) ABSTRACT

A gas separation unit for the separation of carbon dioxide from air is proposed for use in a cyclic adsorption/desorption process and using a loose particulate sorbent material. The loose particulate sorbent material is disposed within an internal volume of an external support structure and supported by the external support structure, the external support structure comprising a plurality of base portions, deflected portions, and openings. The sheets are arranged parallel defining an inlet face and an outlet face, are arranged with a distance in the range of 0.1-2.5 cm (preferably 0.1-0.5 cm), and the inflow passes through the inlet face, subsequently through the particular sorbent material located in the cavity of the respective layer, subsequently to exit the layer through the outlet face to form the gas outflow. Directionality of the inflow and the outflow through the external support structure is controlled by the deflected portions of the external support structure.

31 Claims, 29 Drawing Sheets

(51) Int. Cl.
*B01J 20/24* (2006.01)
*B01J 20/28* (2006.01)

(52) U.S. Cl.
CPC ......... *B01J 20/24* (2013.01); *B01J 20/28023* (2013.01); *B01J 20/28052* (2013.01); *B01D 2253/202* (2013.01); *B01D 2253/304* (2013.01); *B01D 2257/504* (2013.01); *B01D 2257/80* (2013.01); *B01D 2259/40086* (2013.01); *B01D 2259/40088* (2013.01); *B01D 2259/4068* (2013.01)

(58) Field of Classification Search
CPC ........ B01D 2253/304; B01D 2257/504; B01D 2257/80; B01D 2259/40086; B01D 2259/40088; B01D 2259/4068; B01D 2259/4146; B01D 53/0476; B01D 2258/06; B01D 53/0407; B01J 20/24; B01J 20/28023; B01J 20/28052; Y02C 20/40
USPC ............ 96/121, 129, 131, 134, 146; 95/139; 423/230
See application file for complete search history.

(56) References Cited

U.S. PATENT DOCUMENTS 3,354,623 A * 11/1967 Keller .................. B01D 46/121 55/484
3,581,476 A 6/1971 Rivers
3,873,287 A * 3/1975 Barnebey ........... B01D 46/0013 96/139
4,133,660 A * 1/1979 Steiner ............... B01D 53/0423 55/474
4,234,326 A 11/1980 Bailey et al.
4,725,290 A 2/1988 Ohlmeyer et al.
5,082,473 A 1/1992 Keefer
6,379,437 B1 4/2002 Heinonen et al.
6,451,095 B1 9/2002 Keefer et al.
6,533,847 B2 * 3/2003 Seguin ................ G03F 7/70916 96/138
6,692,626 B2 2/2004 Keefer et al.
7,288,136 B1 10/2007 Gray et al.
7,645,324 B2 1/2010 Rode et al.
8,163,066 B2 4/2012 Eisenberger
8,202,350 B2 6/2012 Asaro et al.
8,500,854 B1 8/2013 Pennline et al.
8,834,822 B1 9/2014 Gay et al.
8,940,072 B2 1/2015 Boulet et al.
9,205,359 B2 12/2015 Kelmartin et al.
9,751,039 B2 9/2017 Gebald et al.
9,925,488 B2 3/2018 Eisenberger
9,926,416 B2 3/2018 Sbriglia
10,427,086 B2 10/2019 Gebald et al.
11,007,470 B2 5/2021 Wurzbacher et al.
11,285,425 B2 3/2022 Sauerbeck et al.
2007/0149398 A1 6/2007 Jones et al.
2009/0120288 A1 5/2009 Lackner et al.
2009/0293720 A1 12/2009 Liu
2011/0041688 A1 2/2011 Eisenberger
2011/0088550 A1 4/2011 Tirio
2011/0146487 A1 * 6/2011 Celik ................. B01D 53/0407 96/121
2011/0179948 A1 7/2011 Choi et al.
2011/0296872 A1 12/2011 Eisenberger
2012/0076711 A1 3/2012 Gebald et al.
2012/0174778 A1 7/2012 Eisenberger
2013/0312606 A1 11/2013 Eisenberger
2014/0004016 A1 1/2014 Eisenberger et al.
2014/0096684 A1 4/2014 Ogino
2014/0109608 A1 4/2014 Hsu
2014/0130670 A1 5/2014 Eisenberger et al.
2015/0139862 A1 5/2015 Chen et al.
2015/0209718 A1 7/2015 Eisenberger
2016/0074803 A1 3/2016 Gebald et al.
2018/0214822 A1 8/2018 Eisenberger
2018/0272266 A1 9/2018 Sprachmann et al.
2020/0391153 A1 12/2020 Sauerbeck et al.
2024/0050885 A1 2/2024 Cully et al.
2024/0139710 A1 5/2024 Cully et al.
2024/0189755 A1 6/2024 Cully et al.
2025/0073677 A1 3/2025 Cully et al.

FOREIGN PATENT DOCUMENTS

EP 0766993 A2 4/1997
EP 2563495 A1 3/2013
EP 2609981 A2 7/2013
EP 2874727 A1 5/2015
EP 2986357 B1 2/2018
EP 3535044 A1 9/2019
EP 3624921 A1 3/2020
GB 1296889 A 11/1972
WO WO 1992/020406 A1 11/1992
WO 2009/014292 A2 1/2009
WO 2009/067625 A1 5/2009
WO 2009/148872 A2 12/2009
WO 2009/155539 A2 12/2009
WO 2010/022339 A2 2/2010
WO 2010/027929 A1 3/2010
WO 2010/091831 A1 8/2010
WO 2010/096916 A1 9/2010
WO 2010/151271 A1 12/2010
WO 2011/049759 A1 4/2011
WO 2011/137398 A1 11/2011
WO 2012/168346 A1 12/2012
WO 2014/012966 A1 1/2014
WO 2014/063046 A1 4/2014
WO 2014/170184 A1 10/2014
WO 2016/005226 A1 1/2016
WO 2016/037668 A1 3/2016
WO 2016/038339 A1 3/2016
WO 2018/083109 A1 5/2018
WO 2018/085927 A1 5/2018
WO 2018/210617 A1 11/2018
WO 2020/113281 A1 6/2020
WO 2021/239747 A1 12/2021
WO WO 2021/259760 A1 12/2021
WO WO 2022/013197 A1 1/2022

OTHER PUBLICATIONS

International Search Report and Written Opinion in International Application No. PCT/US2023/026696, mailed on Dec. 18, 2023, 17 pages.
Invitation to Pay Additional Fees in International Application No. PCT/US2023/026696, mailed on Oct. 27, 2023, 10 pages.
Canivet et al., “Water adsorption in MOFs: fundamentals and applications”, Chem. Soc. Rev, vol. 43, No. 16, May 29, 2014, pp. 5594-5617.
Fernandez et al., “Hydrophobic and moisture-stable metal-organic frameworks”, Dalton Trans, vol. 44, No. 30, May 1, 2015, pp. 13490-13497.
International Search Report and Written Opinion received for PCT Patent Application No. PCT/US23/30220, mailed on Dec. 19, 2023, 25 pages.
Jareteg et al., “Investigation of steam regeneration strategies for industrial-scale temperature-swing adsorption of benzene on activated carbon”, Chemical Engineering and Processing—Process Intensification, vol. 167, No. 1, Oct. 2021, pp. 1-10.
Jeong et al., “Modular monolith adsorbent systems for CO2 capture and its parameterized optimization”, Chemical Engineering Research and Design, vol. 176, No. 1, Dec. 2021, pp. 1-13.
Kim et al., “CO2 adsorption on zeolite 13X modified with hydrophobic octadecyltrimethoxysilane for indoor application”, Journal of Cleaner Production, vol. 337, No. 1, Feb. 20, 2022.
McQueen et al., “A review of direct air capture (DAC): scaling up commercial technologies and innovating for the future”, Progress in Energy, vol. 3, No. 3, 2021, pp. 1-23.

(56) References Cited

OTHER PUBLICATIONS

Miyamoto et al., "High Water Tolerance of a Core-Shell-Structured Zeolite for CO2 Adsorptive Separation under Wet Conditions", ChemSUSChem, vol. 11, No. 11, Jun. 11, 2018, pp. 1756-1760.
Montes et al., "Carbon Monoliths in Adsorption-based Post-combustion CO2 Capture", Elsevier, vol. 114, No. 1, Aug. 18, 2017, pp. 2341-2352.
Shokouhimehr., "Magnetically Separable and Sustainable Nanostructured Catalysts for Heterogeneous Reduction of Nitroaromatics", Catalysts, vol. 5, No. 1, Mar. 31, 2015, pp. 534-560.
Sun et al., "Imparting amphiphobicity on single-crystalline porous materials", Nature Communications, vol. 7, No. 13300, Oct. 31, 2016, pp. 1-7.
Zhang et al., "A Facile and General Coating Approach to Moisture/Water-Resistant Metal-Organic Frameworks with Intact Porosity", J. Am. Chem. Soc, vol. 136, No. 49, Nov. 20, 2014, pp. 16978-16981.

* cited by examiner

101

101
100
200
600 a) b)

10 t d

11

6

2202
2200
2204
100A 2400
100A 2402B
2206
2400
2400
100A
100B
2402A 2402B
2206
2400
2400
100
2402A
5

2402B
2206

100A
100B
100
2402A
2402B
2206

100A
100B
100
2402A 3101
3103
3112
3110
3108
3102
3100
3106
3108
3110
3106
3104

3100
3106
100
3200
3102
3104

3100
3106
100
3200
3102
3104

STRUCTURE WITH EXTERNAL SUPPORT FOR PARTICLE ADSORBENT BED FOR ADSORPTION GAS SEPARATION PROCESS

CROSS REFERENCE TO RELATED APPLICATION

This application claims the benefit of U.S. Provisional Application No. 63/357,925, filed Jul. 1, 2022, which is incorporated by reference herein in its entirety for all purposes.

FIELD

The present disclosure relates to sorbent bed structures for gas separation processes and the use of such structures for gas separation, for example for the separation/capture of $CO_2$ from gas streams.

BACKGROUND

Gas separation by adsorption has many different applications in industry, for example removing a specific component from a gas stream, where the desired product can either be the component removed from the stream, the remaining depleted stream, or both. Thereby both, trace components as well as major components of the gas stream can be targeted by the adsorption process.

One important application is capturing carbon dioxide ($CO_2$) from gas streams, e.g., from flue gases, exhaust gases, industrial waste gases, or atmospheric air.

Capturing $CO_2$ directly from the atmosphere, referred to as direct air capture (DAC), is one of several means of mitigating anthropogenic greenhouse gas emissions and has attractive economic perspectives as a non-fossil, location-independent $CO_2$ source for the commodity market and for the production of synthetic fuels. The specific advantages of $CO_2$ capture from the atmosphere include: (i) DAC can address the emissions of distributed sources (e.g. cars, planes), which account for a large portion of the worldwide greenhouse gas emissions and can currently not be captured at the site of emission in an economically feasible way; (ii) DAC can address emissions from the past and can therefore create truly negative emissions; (iii) DAC systems do not need to be attached to the source of emission but are rather location independent and can for example be located at the site of further $CO_2$ processing; and (iv) if $CO_2$ that was captured from the atmosphere is used for the production of synthetic hydrocarbon fuels from renewable energy sources, truly non-fossil fuels for the transportation sector can be obtained, that create no or very few net $CO_2$ emissions to the atmosphere.

Several DAC methods have recently been developed based on various technological approaches. For example, U.S. Pat. No. 8,163,066 B2 (Eisenberger) discloses carbon dioxide capture/regeneration structures and techniques; US 2009/0120288 A1 (Lackner et al.) discloses a method for removal of carbon dioxide from air; US 2012/0174778 A1 (Eisenberger) discloses a carbon dioxide capture/regeneration method using a vertical elevator; and WO2010022339 A2 (Alberta Ltd.) discloses a carbon dioxide capture method and facility.

One particular approach is based on a cyclic adsorption/desorption process on solid, chemically functionalized sorbent materials. For example, in WO2010/091831 (Eth Zurich) a structure based on amine functionalized solid sorbent materials together with a cyclic adsorption/desorption process using this material for the extraction of carbon dioxide from ambient air is disclosed.

Therein, the adsorption process takes place at ambient conditions at which air is streamed through the sorbent material and a portion of the $CO_2$ contained in the air is chemically bound at the amine functionalized surface of the sorbent. During the subsequent desorption, the material is heated to about 50-110° C. and the partial pressure of carbon dioxide surrounding the sorbent is reduced by applying a vacuum or exposing the sorbent to a purge gas flow. Thereby, the previously captured carbon dioxide is removed from the sorbent material and obtained in a concentrated form.

In WO2012/168346A1 (Empa Eidgenössische Materialprüfungs-Und Forschungsanstalt), a sorbent material based on amine functionalized cellulose is disclosed, which can be used for the above described process.

Generally, for adsorption-based gas separation processes, configurations of the sorbent material are desired which impose little pressure drop on the gas flow in order to minimize the energy required for gas pumping and at the same time achieve maximum contact between the sorbent and the gas stream in order to maximize the mass transfer rates of the components to be removed from the gas stream. Typical configurations include packed bed columns or fluidized beds with typical lengths of several ten centimeters to several meters, which typically impose pressure drops of several thousand Pascal up to several bars on the gas flow.

The requirement on the pressure drop can become even more severe, if trace components are removed from a gas stream. In particular, all DAC approaches have one major challenge in common which are the very large air volumes that have to be passed through any capture system in order to extract a certain amount of $CO_2$ from the air. The reason for this is the very low concentration of $CO_2$ in the atmospheric air, currently between 390 and 400 ppm, i.e., roughly 0.04%. Thus, in order to extract one metric ton of $CO_2$ from the atmosphere, at least about 1,400,000 cubic meters of air have to be passed through the capture system. This in turn means that economically feasible capture systems must have a very low pressure drop on the air flow passing through them. Otherwise the energy requirements for air pumping will render the system uneconomical. However, any low-pressure drop configuration should not compromise the mass transfer properties of the system.

While many materials that have promising properties for a DAC process are typically in a granular form, their arrangement in a conventional packed bed column or in a fluidized bed with a length of typically several ten centimeters to several meters will usually not be feasible, since the resulting pressure drops will exceed the tolerable limits by one or several orders of magnitude.

On the other hand, in the field of particle filters for gas streams, in particular soot particle filters for exhaust gases, channeled filter structures were developed, typically referred to as "wall flow" filters, see for example EP 0 766 993 A2 (Toyota Jidosha Kabushiki Kaisha). In these structures the gas flow enters the structure through inlet channels, passes porous walls, at which the soot particles are trapped, and exits the structure through outlet channels.

Monolithic structures comprising sorbent materials were also developed in the context of gas separation and adsorption, e.g. WO2010/027929 A1 (Alstom Technology Ltd), U.S. Pat. No. 8,202,350 B2 (SRI International).

SUMMARY

U.S. Pat. No. 9,751,039 B2 assigned to Climeworks AG (hereinafter "the '039 Climeworks publication") and U.S.

Pat. No. 10,427,086 assigned to Climeworks AG (herein after "the '086 Climeworks publication") relate to a structure of a particulate sorbent bed for gas separation by adsorption that can achieve both, a very low pressure drop on the gas flow passing through the structure and very high mass transfer rates between the gas phase and the surface of the sorbent material. The basic underlying principle of the structure of these publications is an arrangement in which the particles of the sorbent material form a very short packed bed, for example with a length of 0.5 to 2.5 cm (note that the length is also referred to herein as "thickness" when viewed from the direction of the gas flow passing therethrough), through which the gas stream to be separated is passed. However, such a bed arranged in a single layer would result in very large, technically and economically unfeasible geometries of the overall sorption system.

In comparison, embodiments of the present disclosure relate to a structure of a particulate sorbent bed for gas separation by adsorption that can achieve a very low pressure drop on the gas flow passing through the structure and very high mass transfer rates between the gas phase and the surface of the sorbent material for efficient desorption. The basic underlying principle of the structure according to some embodiments of the present disclosure is an arrangement in which the particles of the sorbent material form a packed bed with short-distance for gas to pass through, for example with a distance of 0.1 to 2.5 cm, and preferably, 0.1 to 0.5 cm, through which the gas stream to be separated is passed. In some examples, a flexible porous material is provided which contains the short-distance packed bed which enables small or variable particle sizes of the active material. In some examples, the flexible porous material has a first hydrophobicity which selectively excludes liquid components while desorption media (heat, steam) is applied. The flexible porous material enables construction of the short-distance packed bed in addition to moving any support structures external to the packed bed, as well as allowing the active material to be contained within a hydrophobic, flexible porous material or within a hydrophobic composite material that facilitates conformability. Other benefits and advantages of implementing the features according to the present disclosure are provided herein.

A gas separation unit for the separation of a first gas, typically carbon dioxide, from a mixture containing said first gas as well as further gases different from the first gas, typically the mixture being air or flue gases, is proposed for use in a cyclic adsorption/desorption process and further using a loose particulate sorbent material for gas adsorption.

In the '039 Climeworks publication, said particulate sorbent material is arranged in at least two stacked layers, and each layer comprises two sheets of a flexible fabric material which is gas permeable but impermeable to the loose particulate sorbent material, which sheets are either mounted on a stiff frame structure or which form the layer in a self-supporting way using spacers or distance elements between them, are arranged essentially parallel defining an inlet face of the layer and an outlet face of the layer, are arranged with a distance in the range of 0.5-2.5 cm, and are enclosing a cavity in which the particulate sorbent material is located. The proposed unit has a gas inlet side or gas inlet manifold through which an inflow of gas mixture enters the unit and a gas outlet side or gas outlet manifold through which a gas outflow exits the unit, the gas pathway between the inflow and the outflow being confined in the unit to pass through at least one layer. In other words the gas entering the unit in any case must pass through one of the layers and there is no bypass under normal adsorption operation, bypass may be allowed by corresponding valves for cleaning and/or desorption processes.

In the '039 Climeworks publication, said layers are arranged in the unit such that the inflow passes through the inlet face, subsequently through the particular sorbent material located in the cavity of the respective layer, subsequently to exit the respective layer through the outlet face (to form the gas outflow). Further the layers are arranged such that inlet faces of adjacent layers are facing each other enclosing gas inlet channels and such that outlet faces are facing each other enclosing gas outlet channels. The mean distance (being defined as the mean over the distances over the full surface facing faces) between inlet faces and/or outlet faces defining said channels, measured in a direction essentially perpendicular to a main gas inflow direction and a main gas outflow direction, respectively, is in the range of 0.5-5 cm. Furthermore the length of the inlet face and/or of the outlet face in a direction parallel to the main gas inflow direction and the main gas outflow direction, respectively, is at least ten times (or even 40, 50, 80 or 100 times) larger than distance between the sheets in the layer.

The '039 Climeworks publication discloses that prior art units (see e.g. WO2009/148872 A2 (Battelle Memorial Institute), U.S. Pat. No. 6,379,437 B1 (Valtion Teknillinen Tutkimuskeskus)) use particulate sorbent materials embedded into structured adsorbent beds through which the gas flow is passed through straight flow-through channels. In these adsorbent bed configurations the species to be removed from the gas stream by adsorption has to be transported from the gas stream to the adsorbent material by diffusion, essentially perpendicular to the flow direction of the gas stream. The gas flow in these devices is not forced to pass through corresponding sorbent material layers before exiting the device. However, if species are to be removed from the gas stream at very low concentrations (such as $CO_2$ in air) the concentration gradients from the gas stream to the sorbent bed are small which limits the achievable mass transfer rates and requires long residence times, which in turn can render the process uneconomical.

With the structure disclosed in the '039 Climeworks publication in which the gas flow is directed through and forced through the channels walls composed of the granular sorbent material, the mass transfer limitations by diffusion can be overcome and the mass transfer rates, e.g., of $CO_2$ from an air stream to the sorbent material surface, can be significantly increased with regards to prior art. At the same time, pressure drop across the structure of the '039 Climeworks publication can be kept low as opposed to conventional packed column bed configurations.

Since some prior art, e.g., WO2009/148872 A2 (Battelle Memorial Institute), relies on diffusion of the adsorbed species from the main gas flow into a sorbent material layer, the thickness of the sorbent material layers of these prior art structures is typically suggested to be very small, i.e., preferably 3 mm in order to minimize mass transfer limitations. However, the '039 Climeworks publication suggests that such thin sorbent material layers are expensive to manufacture and are delicate and not long-lasting and suggests that an advantage of the examples disclosed in the '039 Climeworks publication is the fact that structures therein that are more easily producible, i.e., structures comprising thicker sorbent material layers (e.g. 0.5 to 2.5 cm) than suggested in the other prior art, are employed in a way that the mass transfer of the species to be adsorbed to the surface of the sorbent material is not compromised (since the gas flow passes through the sorbent material layer), which would be the case if diffusion based, prior art structures would be implemented with thicker, more easily producible sorbent material layers.

The present disclosure improves this concept of the '039 Climeworks publication by configuring the layers of some embodiments to have external support features, thereby allowing for thin sorbent material layers to be produced in an economical way and to be filled easily without an interior structure interfering with the filling process. The external support features also enable the formation of thinner sorbent material layers than is suggested in the '039 Climeworks publication, e.g. 0.1 to 0.5 cm. Further advantages will be described infra.

Further prior art devices (e.g. WO2010/027929 A1 (Alstom Technology Ltd.), U.S. Pat. No. 8,202,350 B2 (SRI International)) utilize structures in which the gas flow can be guided through layers of porous sorbent materials but these structures are based on extruded monolithic structures which are essentially 2-dimensional structures extruded in a third dimension. In these structures, the sorbent material is in a monolithic structure, e.g., in a gel form or deposited on the channel walls, so it is not loose. Further, the structures are typically extruded from a single material and the extrusion process does not allow combination of arbitrary materials to build up the structures.

The '039 Climeworks publication suggests several advantages of the structures as used therein over other prior art extruded monolithic structures.

Firstly, according to the '039 Climeworks publication, structures based on extruded monoliths cannot represent more complex 3-dimensional structures such as a stack of individual layers with loose particular sorbent material confined by flexible fabric sheets. This in turn means that the prior art structures cannot represent the geometries of the structures of the '039 Climeworks publication, for example a heat transfer structure connected to tubing and being embedded into a sorbent material layer enclosed between two layers of a fabric material (see below).

In addition to the above, embodiments of the present disclosure further provide the advantage of increased thermal conductivity and heat transfer by implementing a thinner sorbent article than is disclosed in the '039 Climeworks publication. Embodiments of the present disclosure further provide the advantage of allowing the structures to represent such complex 3-dimensional structures without relying on any internal support (e.g., a part of a frame 7 defining the geometrical structure of a sorbent layer 5 and internally supporting the fabric material enclosing the sorbent material as shown in FIG. 2 of the '039 Climeworks publication), by implementing an external support structure which is entirely external to the layers of sorbent material and is capable of supporting any layer or bed of loose particulate adsorption material.

Secondly, according to the '039 Climeworks publication, the prior art structures cannot be easily built up from various different material combinations, as the structures of the '039 Climeworks publication, with the corresponding advantages suggested in the '039 Climeworks publication listed in detail below, such as optimized thermal mass/heat capacity, optimized thermal conductivity of a heat transfer structure, etc. In particular, incorporation of a flexible fabric material enclosing the sorbent layers, in contrast to prior art, allows for (i) using flexible and to a certain extend stretchable fabric sheets holding the sorbent material in the shape of a thin, uniform layer, even if the volume of the particle layer shrinks or expands to some extend during operation (e.g., through drying and wetting of the material); and (ii) tailoring the fabric sheets to be just impermeable to the sorbent material particles but at the same time to be very thin (thickness of 0.5 to 2.5 cm) and impose a very low pressure drop on the gas flow through them. In contrast, fixed, stiff channels walls of prior art monolithic structures (i) cannot adapt to a shrinking and/or expanding sorbent packing, and (ii) will typically either be thicker or have less porosity for the gas flow to pass through than optimized flexible fabric sheets since the former will require a more dense structure in order to maintain their stiff structure.

In addition to the above, embodiments of the present disclosure further provide the advantage of having a thinner sorbent material article than is disclosed in the '039 Climeworks publication (thickness of 0.1 to 0.5 cm) to facilitate increased thermal conductivity/heat transfer. The thinner article also can shorten the drying or wetting time of the material. The thinner sorbent material article may be provided with a region or layer of reduced porosity to not only make the article impermeable to the sorbent material particles but also impermeable to foreign particles from an external environment. In some examples, implementing the external support structure facilitates similar or improved thermal conductivity without the use of any internal structure for supporting the loose particulate adsorption material.

Thirdly, according to the '039 Climeworks publication, prior art monolithic structures are likely to be subject to a significant amount of flow by-passing the layers of sorbent material, leading to a reduced mass transfer rate during the adsorption process. This is due to the fact that at those locations at which sorbent material is in contact with rigid structures such as the walls of the monolith, small cavities in the sorbent material are likely to form (for example during the filling or coating process), which reduce the resistance on the air flow at these locations and in turn induce a by-pass flow through them. In the structure of the '039 Climeworks publication, the number of walls inside the packing of the sorbent material can be kept substantially smaller compared to prior art monolithic structures.

Fourthly, according to the '039 Climeworks publication, the proposed use of loose particulate adsorption material in combination with flexible fabric for bordering the layers and in combination with the stacked arrangement with specifically chosen layer thicknesses and channel widths allows providing for a very robust, low-pressure drop, easy to handle and low manufacturing cost device with high efficiency of the adsorption and desorption process, where its geometry can be specifically tailored to the process-specific needs. This is in contrast to monolithic structures where the sorbent material is provided not in loose form but in a solidified porous monolithic form, which structures are much more restricted through the manufacturing process, and, due to the fixed local arrangement of the sorbent material in the channels or at their walls, respectively, do not allow for easy manufacturing, easy cleaning, repowering etc. In particular, the stacked unit of the '039 Climeworks publication can be substantially arbitrarily extended into one direction perpendicular to the main direction of the gas flow (which is, the direction of stacking) without complicating the manufacturing process. This is in contrast to a prior art extruded monolithic structure, which requires larger die-plates if the dimensions perpendicular to the main direction of the gas flow are enlarged.

Moreover, the '039 Climeworks publication suggests further advantages of the structure therein over prior art extruded monolithic structures due to the above listed fundamental differences in their construction.

According to the '086 Climeworks publication, the orientation of such a stack can be such that the planes of the individual layers are essentially horizontal planes. Between the layers there are therefore in this case horizontal slots for the entry of the inflow of the gas mixture and horizontal slots for the outflow of the gas depleted in $CO_2$. Such a substantially horizontal stack configuration can be selected to avoid the formation of holes in the layers due to the motion of the sorbent material during operation. Such holes can lead to bypassing of a large portion of the main airflow as they can form a significantly lower pressure drop region.

The '086 Climeworks publication discloses that in some cases, it has been observed that also in such a substantially horizontal configuration, hole formation can occur and a more controlled formation of holes can be realized in a vertical orientation of the stack.

According to embodiments in the '086 Climeworks publication, the layers can be placed vertically—the complete stack is so to speak rotated 90° around the main horizontal axis of the whole unit. According to this embodiment, the at least two stacked layers with the particulate sorbent material, or preferably in case of more than two layers all the layers, each layer comprising two sheets of a flexible fabric material which is gas permeable but impermeable to the loose particulate sorbent material, are oriented vertically, i.e. such that the plane normals of the layers are oriented horizontally. In other words in this orientation between the layers there are vertical slots for the entry of the inflow of the gas mixture and vertical slots for the outflow of the gas depleted in $CO_2$. In this manner any relocation/motion of sorbent nevertheless leads to a homogenous bed due to the weight of the sorbent material and the corresponding downward motion of the particles which closes any formed holes in a self-ordering process. In order to avoid that formed holes at the upper edge of the layer lead to bypassing, a slat made preferably of aluminum can be affixed at the upper edge being oriented along the upper edge of the layer on the inflow and outflow face of the layer, in contact with the outer surface of the layer, covering and thereby blocking a portion of the layer—and any potentially formed holes—to inflow and thusly forcing all inflow through the sorbent material layer containing sufficient sorbent particles in this region. The width of the slat can be in the range of 1 to 15 cm, preferably 2 to 10 cm.

According to embodiments in the '086 Climeworks publication, intermediate rotated stack orientations are possible, where the plane normals are oriented in a plane perpendicular to the inflow direction, e.g. orientations where the slots for the entry of the inflow of the gas mixture and slots for the outflow of the gas depleted in $CO_2$ are between the horizontal or the vertical direction, e.g. at 45°.

In addition to the above, embodiments of the present disclosure further provide the advantage of containing the loose particulate adsorption material by implementing an external support structure with an internal volume in which the loose particulate sorbent material may be disposed. The external support structure may include a plurality of base portions and openings therebetween, as well as deflected portions or louvers for advantageously controlling a directionality of the inflow and the outflow through the external support structure, for example. Such controlled directionality may facilitate a controlled drying or wetting of the loose particulate adsorption material such that these particles may wet uniformly and dry uniformly to facilitate a more efficient cyclic process of adsorption and desorption, as well as allowing the particles to be used uniformly throughout such that they can be replaced all at once after being used for a predetermined amount of time, for example.

In some examples, the base portions and deflected portions of the external support structure are formed from a continuous sheet of rigid material. In some examples, the external support structure forms a cheese grate, louver, or fishnet configuration. In some examples, the plurality of base portions are separate components that are attached or affixed to each other. In some examples, the loose particulate sorbent material includes at least a first set of particulate with a first size and a second set of particulate with a second size smaller than the first size. In some examples, the first set occupies a first region within the internal volume, and the second set occupies a second region within the internal volume that is different from the first region. In some examples, the external support structure has a tapering configuration.

According to a first preferred embodiment of the proposed unit of the '039 Climeworks publication, the length of the inlet face and/or of the outlet face in a direction parallel to the main gas inflow direction and the main gas outflow direction, respectively, is at least 40 times larger than distance between the sheets in the layer.

According to yet another preferred embodiment of the '039 Climeworks publication, the flexible fabric material is woven or nonwoven textile material, preferably based on polymeric fibers or yarns, respectively, most preferably based on fibers or yarns, respectively based on PET and/or PE, or the flexible fabric material is made from a cellulose based, in particular paper material. The layers of the flexible fabric material have a preferred thickness of 25 to 500 μm.

Embodiments of the present disclosure improve upon this concept of the '039 Climeworks publication by providing a flexible nonwoven material, preferably based on polymeric materials, respectively, most preferably based on microporous polymeric materials such as ePTFE or ePE. The use of one or more of these materials offers multiples advantages over the '039 Climeworks publication which suggested the use of a cellulose-based, in particular, paper material. The nonwoven, microporous materials (e.g., nonwoven and microporous ePTFE or ePE) of the present disclosure may provide at least one of: 1) hydrophobicity, 2) reduction in porosity, and/or 3) a fabric material that is both inert and durable. For example, the reduction in porosity prevents particles of greater than a predetermined size from passing through the layers. The layers of the flexible nonwoven material have a combined total thickness of 25 to 500 μm, preferably between about 25 μm and about 50 μm, between about 50 μm and about 75 μm, between about 75 μm and about 100 μm, or any other suitable value or range therebetween, for example.

Preferentially, according to the '039 Climeworks publication, more than 5, preferably more than 10, most preferably more than 20 layers are either stacked essentially parallel to each other in the unit, preferably by using a stack of corresponding frames; and/or are stacked under relative inclination angles in the range of 0.2-15°, preferably in the range of 0.5-10°. In the latter case, the corresponding inlet channels can be arranged to be converging in the main gas inflow direction and the corresponding outlet channels widening in the main gas outflow direction. The inlet channels can in this case essentially be closed at their downstream ends by lateral edges of adjacent layers being in (direct) contact with each other and in that the outlet channels are closed at their upstream end by lateral edges of adjacent layers. In other words the layers are arranged, looking at the unit in a direction perpendicular to the gas flow and parallel to the plains of the layers, in a zigzag manner.

The layers of the '039 Climeworks publication can be essentially planar structures stacked essentially parallel to each other, or wherein the layers can be essentially cylindrical or oval structures, most preferably arranged concentrically to each other.

Spacers of the '039 Climeworks publication can be located within said layers for defining the distance between the faces of layer, the spacers preferably being rigid bar or rail structures, most preferably T, H, C, or Z-bar structures, or being provided by junctures and/or seams between the sheets.

At least one layer, preferably the majority of the layers, most preferably all layers of the '039 Climeworks publication can be provided with primary heat exchange elements, preferably in the form of tubing containing a heat exchange fluid, most preferably in combination with secondary heat exchange elements for increasing the heat transfer between the sorbent material and the heat exchange elements.

According to the '086 Climeworks publication, the primary heat exchange elements can be a plurality of meandering tubes for a heat exchange fluid provided within a stiff rectangular circumferential frame structure and within the cavity, wherein the plurality of tubes over the non-bent portions thereof are all being arranged essentially parallel to a first pair of mutually parallel metal profiles forming the stiff frame structure.

Said tubes in the '086 Climeworks publication can be in thermal contact with secondary heat exchange elements in the form of a plurality of sheets of metal which are arranged parallel to each other and which are arranged essentially perpendicular to a main plane of the stiff frame structure and perpendicular to said tubes (to the non-bent portions thereof), the tubes extend in a continuous manner between said first pair of mutually parallel metal profiles and the secondary heat exchange elements in the form of sheet of metal are provided with a plurality of holes through which the plurality of tubes penetrate.

The tubes of the primary heat exchange element in the '086 Climeworks publication are preferably metal tubes, preferably aluminum or copper tubes. These tubes can be provided with an inner diameter in the range of 3-20 mm, preferably in the range of 5-12 mm, and/or with an outer diameter in the range of 4-24 mm, preferably in the range of 6.2-14 mm.

The tubes of the primary heat exchange element in the '086 Climeworks publication are typically, where running parallel, spaced by a distance (x) in the range of 10-168 mm, preferably in the range of 15.5-98 mm.

The sheets of metal if forming the secondary heat exchange elements according to the '086 Climeworks publication have a thickness in the range of 0.1-0.4 mm, preferably in the range of 0.12-0.18 mm.

The sheets of metal if forming the secondary heat exchange elements according to the '086 Climeworks publication have a height (h), measured perpendicular to the running direction of the tubes in the range of 3-50 mm, preferably in the range of 8-22 mm.

The sheets of metal if forming the secondary heat exchange elements according to the '086 Climeworks publication have a length being less than 20 mm, preferably less than 5 mm shorter than the distance between the respective pair of metal profiles arranged pairwise mutually parallel forming said stiff rectangular circumferential frame structure.

Preferably the sheets of metal in the '086 Climeworks publication are made of aluminum.

Typically, the sheets of metal in the '086 Climeworks publication if forming the secondary heat exchange elements are spaced by a distance (d) in the range of 1-6 mm, preferably in the range of 3.5-5.5 mm.

According to the '086 Climeworks publication, as concerns the dimensioning of the tubes and the metal sheets the above mentioned values are an optimum compromise allowing for good interpenetration by the particulate sorbent material, also allowing filling of the structure in the manufacturing process, and on the other hand allowing for sufficient porosity for the air passing through the layer, and allowing for an efficient as possible heat transfer process for the heating and cooling steps in the cyclic temperature swing carbon dioxide capture process.

According to the '086 Climeworks publication, the tubing forming the primary heat exchange pipes can also have, at least in sections, a non-circular cross-section (flattened shape). Quite specifically, the first outer diameter of the cross section of the pipes in a direction perpendicular to the plane of the layer of the stiff frame structure can be at least twice as large as the second outer diameter of the cross section of the pipes in the longitudinal direction. By providing piping which is "slim" in the plane of the layer of the stiff frame structure the pipes appearing like upright partitioning walls in the cavity, an essentially planar surface is provided at the face of adjacent pipes, allowing for most efficient attachment of and heat exchange with secondary heat exchange elements in the form of heat exchange metal sheets and/or the sorbent as will be detailed as follows.

This design of the flattened pipes according to the '086 Climeworks publication results in two substantial advantages over heat exchange pipes with a circular cross section: First, the area that is available for gas flow through the planes of the sheets of flexible fabric material is much larger since a smaller portion of this flow cross-section area is blocked by the pipes. This results in reduced pressure drop on the gas flow. Second, the pipes can be spaced closer to each other compared to prior art designs with circular pipe cross sections while the area available for gas flow still remains larger compared to those prior art designs. This results in an optimized heat transfer design since the distances for heat transfer through the sorbent material between the flattened pipes is reduced.

Said flattened pipes in the '086 Climeworks publication can further be in thermal contact with sheets of metal forming the secondary heat exchange element and which are arranged essentially perpendicular to the main plane of the stiff frame structure, and which extend oscillating between pairwise adjacent flattened pipes, thereby contacting them for thermal contact. In other words these metal sheets are either wavy oscillating between adjacent flattened pipes and contacting the flat small-diameter surfaces, or zigzagging between adjacent flattened pipes and contacting the flat small-diameter surfaces.

As an alternative to the sheets of metal or in addition to these said flattened pipes can be held in place with spacers which are arranged essentially perpendicular to the main plane of the frame, and which at least extend between pairwise adjacent flattened pipes, as disclosed in the '086 Climeworks publication.

The primary heat exchange elements and/or the secondary heat exchange elements can also act as frame structure and/or sheets in the '039 Climeworks publication. The primary and/or secondary heat exchange elements can be integrated into the frames structure thereby stiffening them and preventing sagging. Further the primary and/or secondary heat exchange elements can be bonded with the fabric material to prevent bulging when filled with sorbent material and in certain combinations to stiffen the frame structures.

The primary heat exchange elements and/or the secondary heat exchange elements of the '039 Climeworks publication can furthermore be based on an expanded material, preferably on an expanded metal, for example a corrugated expanded metal.

The loose particular sorbent material of the '039 Climeworks publication and the '086 Climeworks publication is preferably an amine-modified particular material, preferably based on cellulose, more preferably based on a weak base ion exchange resin, specifically polystyrene matrix material modified with amine groups, specially primary amine groups, or based on amine-modified nanofibrilated cellulose, in each case preferably with an average particle diameter in the range of 60 to 1200 μm, for the adsorption of carbon dioxide.

In comparison, the loose particulate sorbent material of the present disclosure may be an amine-modified particular material with a particle size of 2-1200 μm, preferably with a particle size of 5-50 μm, for example, in order to reduce the total thickness of the sorbent material layer or the structure thereof, which provides the advantage of reducing the adsorption/desorption cycle time, as further explained herein.

The frame of the '039 Climeworks publication can be provided with holes into which the loose particular sorbent material is filled and the holes of which holes are closed after filling in the sorbent material.

The unit of the '039 Climeworks publication may furthermore comprise a surrounding enclosure or cage, preferably made of a flexible (bag like) or a stiff (frame cage like) material, which, apart from gas inlet openings for the inflow and gas outlet openings for the outflow is gastight, and which is preferably attached to a vacuum unit for the desorption process, wherein preferably inlet openings and/or outlet openings are provided with controllable lids or valves for changing between adsorption and desorption stages. This feature facilitates operation of the structure of the '039 Climeworks publication in a cyclic adsorption/desorption process where during adsorption air is flowing through the structure through said lids or valves and during desorption the structure is sealed towards the environment and can be heated up and/or exposed to reduced or elevated pressure and/or exposed to different atmospheres, such as a purging gas.

The sheets of each layer in the '039 Climeworks publication are preferably located at a distance in the range of 0.5-1.5 cm, and/or wherein the mean distance between adjacent inlet faces and/or outlet faces (i.e., the width of the channels), measured in a direction essentially perpendicular to a main gas inflow direction and the main gas outflow direction, respectively, is in the range of 0.5-1.5 cm.

Furthermore the '039 Climeworks publication relates to a use of such a unit for extracting carbon dioxide from air and/or flue gas from exhaust gases.

Further embodiments of the '039 Climeworks publication are laid down further below as well as in the dependent claims.

The stack formed by the multiple layers of sorbent material of the '039 Climeworks publication can have various geometrical forms, e.g., rectangular (FIG. 1, FIG. 6 of the '039 Climeworks publication), cubic, or cylindrical (FIG. 7 of the '039 Climeworks publication). The gas inlet side through which the gas flow enters the structure can either be formed by a gas inlet manifold or can be open to the environment. The gas outlet side through which the gas flow exits the structure can either be formed by a gas outlet manifold or can be open to the environment.

According to one embodiment of the '039 Climeworks publication, the two layers of flexible fabric material enclosing the particulate sorbent material are mounted on stiff frame structures (for example produced by injection molding of a plastic material) which form the geometrical shape of the sorbent layers. (FIG. 1 of the '039 Climeworks publication)

According to another embodiment of the '039 Climeworks publication, the two layers of preferably flexible fabric material form the layer of sorbent material without utilization of a stiff structure but rather by employing several spacers or distance pieces between the two layers of fabric material. Those spacers can be of various geometrical shapes and can be made of various materials. In one embodiment, the distance holders can be small plastic cylinders with the length of the thickness of the sorbent layer. In another embodiment the spacers can be made of yarn of filaments and the two layers of fabric can be hold together by stitching.

One advantage suggested by the '039 Climeworks publication of the examples disclosed therein is that by stacking the very thin sorbent layers (thickness of 0.5 to 2.5 cm) the particulate sorbent material can be arranged in a geometrically compact form, while the length of the flow path of the gas through the sorbent material is relatively small. The '039 Climeworks publication applies thereby the principle of arranging very large surface areas in the compact form of a stack that is known from wall flow-type monolithic structures to a structure that is build up from a particulate material.

In addition to the above, embodiments of the present disclosure further provide the advantage of making the sorbent article more compact and further reducing the length of the flow path of the gas through the sorbent material by implementing an even thinner material having a thickness between 0.1 to 0.5 cm, as disclosed herein. Additionally, the present disclosure further provides the advantage of a more controlled air path by providing deflected portions or louvers in the external support structure for controlling the directionality of the air path, which may facilitate a shorter flow path than is otherwise feasible, for example.

For example, according to the '039 Climeworks publication, if 1 $m^3$ of sorbent material disclosed therein are arranged in a single packed bed with a bed length of 1 cm, this will result in a bed cross section area of 100 $m^2$, e.g., 10 m×10 m. On the other hand, if the same amount of material is arranged in 100 stacked layers, each of 1 cm thickness and 1 $m^2$ area, with 1 cm wide inlet and outlet channels between them, this will result in overall stack dimensions of 1 m×1 m×2 m, which is much more compact and has therefore a much smaller footprint. At the same time, the stacked arrangement significantly facilitates gas distribution. While even distribution of a gas stream towards the bottom area of a 100 $m^2$ large bed will require excessive ducting, the ducting required to guide a gas flow towards the inlet of a 1 m×1 m×2 m stack will be relatively small. This consideration illustrates at the same time that—in order to benefit from the compactness of a stack arrangement—the length of the sorbent layers and the gas inlet and outlet channels in the main direction of the gas flow (parallel to the sorbent layers) needs to be significantly larger, for example at least 10 times larger, than the thickness of the sorbent layers, according to the '039 Climeworks publication.

Another advantage as suggested by the '039 Climeworks publication of the examples therein is that due to the fact that the structure is built up as a stack of individual layers (as opposed to other, prior art flow structures that are for example extruded or cast from a single material) the structure can be built from various materials and various material combinations. For instance, a frame defining the geometrical structure of the layers of sorbent material can be made from a stiff, mechanically stable, lightweight material, while the two layers of preferably flexible fabric material enclosing the sorbent material layer can be made from a different material with the desired permeability properties for the air flow and the sorbent material particles. For instance, while the material forming the geometry of the sorbent layers can be a stiff material, the material forming the two fabric layers enclosing the sorbent material layer can be a flexible material which can enable different forms of the sorbent material layer, e.g., a bag-like form with curved outer surfaces. It can further compensate for changes in volume of the sorbent material packing due to shrinking or expansion of the particles during the process as outlined above. This in turn allows for several different geometries of the sorbent material layer which could not be obtained with stiff layers enclosing the sorbent material. At the same time, a heat transfer structure that can be contained in the sorbent material layer can be made from yet another material with favorable thermal properties, e.g., a high thermal conductivity, according to the '039 Climeworks publication.

In addition to the above, embodiments of the present disclosure further provide the advantage of increasing the efficiency of the adsorption and desorption process by implementing thinner individual layers using the external support structure, where the external support structure may be rigid to provide support and is positioned entirely external to the individual layers. The external support structure may also be configured to control the directionality of the gas flow such as the air path and inflow/outflow through the layers, for improved efficiency of the adsorption and desorption process.

According to one aspect of the '039 Climeworks publication, material combinations that minimize the thermal mass of the overall structure can be used. The '039 Climeworks publication suggests that such a design is advantageous since it reduces the energy consumption, if the structure is used within a cyclic, temperature-swing process. According to one preferred embodiment of the '039 Climeworks publication, the structure disclosed therein is used for the extraction of $CO_2$ from atmospheric air. Within this preferred embodiment, the structure is operated in a cyclic adsorption/desorption process where during the adsorption step air is ventilated through the structure and a portion of the $CO_2$ contained in the air is bound at the surface of the sorbent material contained in the sorbent material layers of the structure. Under typical process conditions, the adsorption step takes 2 hours, in average about 40% of the $CO_2$ in the air stream is extracted and about 0.3 mol $CO_2$ are adsorbed per $dm^3$ of sorbent material. From these values, the air velocity $u_{air}$ through the sorbent layer can be determined as a linear function of the sorbent layer thickness d and is roughly:

$$u_{air}\ (m/s)=0.03\ m/(s*cm)*d\ (cm)$$

In addition to the above, embodiments of the present disclosure further provide the advantage of improving the cyclic, temperature-swing process by reducing the time required for each adsorption/desorption cycle (e.g., to shorter than 2 hours per cycle or shorter than 1 hour per cycle, according to some embodiments) using thinner sorbent material layers (with a thickness of 0.1 to 0.5 cm, for example), using a hydrophobic material to form the material layers, and/or using the external support structure that is provided with means (that is, deflected portions or louvers) for controlling the directionality of inflow and outflow through the layers as disclosed herein, for example.

At the same time, for a typical sorbent material the pressure drop through the sorbent layer Δp is roughly a linear function of the air velocity and the sorbent layer thickness as follows:

$$\Delta p=1.2\ kPa/cm/(m/s)*u_{air}\ (m/s)*d\ (cm)$$

Therefore, the total pressure drop increases with the square of the sorbent layer thickness. For a thickness of 1 cm, the resulting total pressure drop is around 36 Pa, while for a thickness of 5 cm it is around 900 Pa, which is already about one order of magnitude too large for an economic DAC application. On the lower limit, sorbent layer thicknesses well below 0.5 cm become very expensive to manufacture. This in turn implies that the relatively narrow range of the preferred sorbent layer thickness of 0.5 to 2.5 cm is an important aspect of the '039 Climeworks publication.

Further to the above, in embodiments of the present disclosure, sorbent layers with a thickness of about 0.1 to 0.5 cm, which is thinner than the preferred thickness of 0.5 to 2.5 cm as disclosed in the '039 Climeworks publication, are provided to reduce adsorption/desorption cycle time and increase the number of cycles which can be completed in a predetermined amount of time. The thinner sorbent layer may incorporate a particulate sorbent bed with smaller sorbent particles therein, in order to reduce the cycle time as well as to facilitate uniform wetting and drying of the sorbent particles. Such advantages can be provided with the same pressure drop through the sorbent layer Δp as disclosed in the '039 Climeworks publication, for example.

As presently disclosed herein, the sorbent layer thicknesses below 0.5 cm, for example between 0.1 cm and 0.5 cm, beneficially have thinner walls which facilitates inclusion of additional volume inside the container for sorbent material. Implementing thinner sorbent material layers in the range of between 0.1 cm and 0.5 cm, for example, facilitates reducing the pressure drop over the sorbent material layer. The thinner sorbent material layers are made possible because of the tighter microporous structure in the sorbent material, thereby allowing for use of smaller sorbent particles, resulting in a reduction in the thickness of the layers without increasing the manufacturing cost as alleged in the '039 Climeworks publication. In fact, having a thickness of greater than 2.0 cm can be disadvantageous due to the increased pressure drop between the two opposing surfaces of the sorbent material layer. For example, a thicker sorbent layer may require the use of a larger sorbent particle size (which will pack loosely and allow air to flow therethrough and thereby). A thinner structure may also allow for one or more of the following: (a) facilitating an increased diffusion of $CO_2$ into the structure, (b) allowing more panels of thin sorbent to be positioned within a volume, (c) optimizing the structure for a mass of sorbent and increasing the efficiency of cycling, and (d) reducing the diffusive resistance for same flow rate of air passing over the structure. These larger particles have less surface area and reduced kinetic potentials of smaller particles of the same material. Microporous materials (such as ePTFE and ePE) enable the use of smaller particle sizes and will allow for thinner sorbent layers with larger surface areas and improved performance. Endcaps of any suitable configuration may be provided or installed on the structure to facilitate the removal of the sorbent material layer from the external support structure even when the layer itself has a thickness of under 0.5 cm, for example.

The application of the structure disclosed in the '039 Climeworks publication for the extraction of $CO_2$ from atmospheric air is one preferred embodiment of the '039 Climeworks publication. The structure of the '039 Climeworks publication is used in other applications such as the separation of $CO_2$ from flue gases, exhaust gases, industrial waste gases or the separation of other components than $CO_2$ from these or other gas streams.

According to one embodiment of the '039 Climeworks publication, the gas inlet and outlet channels are formed by stiff frame structures (for example produced by injection molding of a plastic material) which form the geometrical shape of the sorbent layers, onto which further the two layers of flexible fabric material enclosing the sorbent material are mounted. One important functionality of the stiff frame structures in this embodiment is the fact that they provide enough surfaces (e.g. rods, bar or rail structures within the frame) to glue or weld the flexible fabric material to, which in turn provides sufficient tension to the flexible fabric material to hold the sorbent material in a layer with relatively uniform thickness. The stiff frame structures can contain spacers that fix the distance between two frame structures which at the same time is the width of the inlet and outlet channels between the two frame structures. The stiff frame structures can further contain structures that seal the inlet and outlet channels towards the outside of the structure (except for their inlet/outlet surfaces). The inlet and outlet channels can be formed by stacking the frames on top of each other.

According to one embodiment of the '039 Climeworks publication the layers of the particulate sorbent material are stacked in a zigzag manner as described above (FIG. 2 of the '039 Climeworks publication). The advantage of this embodiment as suggested in the '039 Climeworks publication is the fact that the gas velocity in the gas inlet and outlet channels is more uniform along the main flow direction of the gas flow than it is for the case of gas inlet and outlet channels with constant width. This is because the gas volume flow decreases along the gas inlet channels in the main flow direction, since portions of the gas stream exit the inlet channel through the sorbent material layer. At the same time, the volume flow increases along the gas outlet channels in the main flow direction, since portions of the gas stream enter the outlet channel from the sorbent material layer. This embodiment results in a more uniformly distributed pressure gradient across the sorbent material layer in the structure of the present invention and therefore more uniformly distributed flow through the sorbent material layer, which ensures most efficient utilization of the sorbent material during the adsorption process.

In addition to the above, embodiments of the present disclosure further provide the advantage implementing the deflected portions or louvers in external support to further improve the uniformity of flow direction. The louvers may have different sizes and deflection angles throughout the frame. Dimensions and angles are derived by fluid analysis of the gas flow stream into the system and through the sorbent material layer, thereby optimizing for performance.

According to a preferred embodiment of the '039 Climeworks publication, the structure comprises a primary heat transfer structure and preferably a secondary heat transfer structure which are preferably placed within or at the side of the sorbent material layer (FIG. 3 of the '039 Climeworks publication). The heat transfer structures can be made from a material with high thermal conductivity, for example a metal, for example copper or aluminum. For example, the secondary heat transfer structure can consist of one or several layers or sheets of a permeable structure placed inside the sorbent material. These sheets can for example consist of perforated metal, expanded metal, wire mesh, metal grid or grating. Further, the secondary heat transfer structure can consist of a honeycomb structure, for example an aluminum honeycomb structure.

One possible secondary heat transfer structure for use within the sorbent material layers of the '039 Climeworks publication and the '086 Climeworks publication is based on fins or metal sheets aligned preferably essentially perpendicularly to the planes of the particulate sorbent material layer. If the latter are essentially horizontally aligned, the fins are vertically aligned. If the particulate sorbent material layers are essentially vertical, the fins or metal sheets of the secondary heat transfer structure are oriented horizontally. In this concept, vertical fins forming the secondary heat transfer structure are mechanically bonded with the primary heat transfer structure comprising or consisting of preferably aluminum tubing.

The incorporation of vertical fins—perpendicular to the fabric material plane—as a secondary heat transfer structure in the sorbent material layers and frames is schematically shown in FIG. 20 of the '039 Climeworks publication. Firstly, as most fin and tube heat exchangers are heat transfer limited on the gas side, they have a very large surface area of fins which necessitates thin gaps between fins on the order of 1 mm. As has been determined by thermal simulations, the preferred conduction distance in a sorbent material used for DAC applications is about 3-8 mm or 5 mm resulting in a distance between heat transfer structures of preferably 4-15 mm, more preferably in the range of 5-12 mm or 10 mm, 5-12 mm or 10 mm spacing between fins of the secondary heat transfer structure represents a good and preferred compromise between the thermal mass of the heat transfer structure and the heat transfer effectiveness and makes these structures therefore suitable for DAC applications. Further, the typically used spacing between fins in the range of approximately 1 mm may represent a restriction in the effective air flow cross section which may produce air flow speeds and pressure drops which can be unsuitable for DAC applications. By increase the fin spacing of the secondary heat transfer structure to the above delimited range, the effective cross section area for airflow through the sorbent material layer can be increased, reducing the airflow speed and reducing the pressure drop over the sorbent material layer to levels which are feasible for DAC applications. This is can be an important requirement for some DAC applications.

Secondly, by incorporating fins as a secondary heat transfer structure in the frames, the thickness of the sorbent material layer of the '039 Climeworks publication can be increased because there is no heat transfer limitation in the vertical direction. In this fashion as long as the pressure drop through the sorbent material layer is maintained in an acceptable range, the sorbent material layer thickness can be increased thereby reducing the number of frames for a given stack height and the cost and thermal mass of the stack per unit sorbent material. The tubing diameter of the primary heat transfer structure can be thinner than the sorbent material layers as shown in FIG. 20 of the '039 Climeworks publication. In this configuration, the tubing does not bind with the fabric layer and form a multitude of separated sorbent cells in each frame. The positive consequence is that the frames can be filled with sorbent material through one hole at one corner because the sorbent can pass around the tubes. To support such a filling concept, the vertical fins of the secondary heat transfer structure (10) can be perforated (see FIG. 20*a* of the '039 Climeworks publication) to allow sorbent material to pass between and through them. Thin perforated metal sheets are e.g. known from the production of perforated metal honeycomb structures. Such a design represents a further improvement over the above described planar secondary heat transfer structure placed in the middle of the frame which normally limits the maximum sorbent material layer thickness to about 10 mm. Further, the current design requires multiple sorbent material filling ports.

Thirdly, due to the spacing of the fins of the secondary heat transfer structure, the fabric material of the '039 Climeworks publication can be bonded with said fins over short distances which prevents bulging under the weight of the filled sorbent. The positive consequence is that the inlet and outlet channels have a better defined and more regular geometry. This is in contrast to other designs, where the fabric material can be at most bonded every 100 mm—a distance over which bulging under the weight of sorbent material essentially cannot be avoided, potentially blocking the inlet/outlet channel. Further structural stability can be gained by aligning the fins along the longer edge of the frame and bonding them with the fabric material. In this fashion the fins of the secondary heat transfer structure act as a core with cross struts, which transfers loads to the tensioned fabric material. This improves the stiffness and stability of the frame significantly.

The production technique of fin and tube heat exchangers in the '039 Climeworks publication can involve placing tubing into holes in the fins and locally expanding the tubing such that plastic deformation occurs in the tubing and the fin thereby affixing the fins on the tubes. Typically one fin spans several passes of tubing. This is realized by placing the fins on multiple straight tubing, expanding the tubing and connecting said tubing segments with welded or brazed elbow connectors. In this manner a strong mechanical and good thermal connection is realized in a multi-pass fin and tube heat exchanger. The process is already industrially automated and can be also adapted for DAC applications.

An alternative process for the making of structures to be used in DAC is described in the following and shown in FIG. 21 of the '039 Climeworks publication. Groups of fins of the secondary heat transfer structure are fitted on the tube of the primary heat transfer structure as in the conventional production process with a spacing 'L' between groups (FIG. 21a of the '039 Climeworks publication). The conventional tubing expansion technique is applied to affix the fins on the tubing. Thereafter the tubes with the fitted fins can be bent into the form of the primary heat transfer structure desired in the conventional frame design (FIG. 21b of the '039 Climeworks publication). In the bent state, the fins are separated by a small gap which does not pose a significant penalty to heat transfer into the sorbent. Because the bends are free of fins, they can be placed into the frame profiles as per the current frame design. In this manner, the tube fin heat exchanger can be built from one continuous tube and require no welding or brazing processes.

Further, a thicker sorbent material layer of the '039 Climeworks publication requires thicker frame profiles which allow larger filling holes which speed up the filling of the sorbent material significantly. With 10 mm C-profile frames, the filling hole can be 6 mm and the resulting filling tube inner diameter can be 4 mm, which may represent a significant restriction to the flow of sorbent material during filling and a corresponding increase in sorbent material filling time. A 20 mm frame thickness could support the use of 16 mm filling holes with for example 14 mm inner diameters.

Moreover, the secondary heat transfer structure of the '039 Climeworks publication can consist of a granular material with good thermal conductivity that is mixed with the sorbent material.

The primary heat transfer structure of the '039 Climeworks publication, which can be contained in or be connected to the secondary heat exchange structure, can be tubing that can be flown through by a heat transfer fluid, for example water or a water/glycol mixture (FIG. 3, FIG. 4 of the '039 Climeworks publication). The tubing can for example be a bended copper or aluminum pipe or a rubber or plastic hose. Through said heat transfer fluid the heat transfer structures can be rapidly heated up or cooled down by an external heating or cooling source, such as tanks of hot or cold heat transfer fluid.

Said heat transfer structures incorporated in the structure facilitates operating the unit of the '039 Climeworks publication within a cyclic adsorption/desorption process comprising a thermal swing, since it allows for rapid heating and cooling of the particulate sorbent material between the individual steps of the adsorption/desorption cycle. The possibility to transfer heat from and to the heat transfer structures via a heat transfer fluid passing through said tubing provides an important interface to other processes or parts of a plant incorporating the unit of the '039 Climeworks publication, since it allows incorporating various heating and cooling sources that are typically available in the form of a stream of hot or cold fluid.

Preferably, the heat transfer structures incorporated in the structure of the '039 Climeworks publication are in good thermal contact with substantially all parts of the particulate sorbent material in the individual sorbent material layers so that the time for heating up and cooling down the sorbent material is kept to a minimum. Preferably, the heat transfer structures are built and incorporated into the structure of the '039 Climeworks publication in a way that substantially all of the sorbent material can be heated up or cooled down by 75 K within a time of less than 60 minutes, more preferably within a time of less than 20 minutes.

If the primary heat exchange structure of the '039 Climeworks publication consists of tubing contained in each layer, the ends of the tubes can be connected to cylindrical elements contained in each frame structure. When stacking the layers, these cylindrical elements can be connected to each other, preferably using O-rings, forming backbone lines to transfer the heat transfer fluid to and from the tubes in the individual layers. Those backbone lines formed from individual cylindrical elements can have diameter in the range of 1 to 5 cm. Further, the tubing of the primary heat exchange structure as well as the secondary heat exchange structure can be directly included in the frame structures during the injection molding process. According to a further embodiment of the '039 Climeworks publication, the primary heat transfer structure of each sorbent layer can be coupled with a feed and return distributor of heat transfer fluid which is itself connected to the heat transfer fluid feed and return lines. According to a further embodiment of the '039 Climeworks publication, a heat transfer structure placed within the sorbent material layer forms parts of or the complete geometrical shape of the layers of the particulate sorbent material and/or serves as support for the two layers of flexible fabric material enclosing the layer of sorbent material. For example, the heat transfer structure can be made of corrugated expanded metal where the bottom and top peaks of the corrugations serve as mounting surfaces for the fabric material (FIG. 5 of the '039 Climeworks publication). As another example, the heat transfer structure can be made of an aluminum honeycomb structure with the same thickness as the sorbent material. The two layers of fabric material can be attached to this honeycomb structure, for example by gluing or welding. An advantage of this embodiment as suggested in the '039 Climeworks publication is that the amount of material required to form the exemplary structure of the '039 Climeworks publication is minimized, since the heat transfer structure fulfills two functions (heat transfer and support of the fabric layers) at the same time. This in turn results in a minimized thermal mass of the structure of this embodiment, resulting in reduced energy consumption for heating up the structure, according to the '039 Climeworks publication.

In addition to the above, the present disclosure further provides the advantage of further reducing the amount of material required to form the structure, particularly the sorbent material layer disposed in the structure, by implementing a thinner sorbent material layer having a thickness of below 0.5 cm (e.g., from 0.1 cm to 0.5 cm) as compared to the sorbent layers of the '039 Climeworks publication which have a preferred sorbent layer thickness of 0.5 to 2.5 cm, for example.

According to one embodiment of the '039 Climeworks publication the sorbent material layers have a rectangular shape, for example a quadratic shape with 1 m edge length and 1 cm thickness, and the stack formed by the layers has a rectangular block shaped form, for example 1 m×1 m×1 m (FIG. 6 of the '039 Climeworks publication).

According to another embodiment of the '039 Climeworks publication the sorbent material layers have the shape of a disc with a center hole, for example with a diameter of the discs of 1.5 m and a diameter of the center hole of 0.6 m, and the stack formed by the layers has a cylindrical shape, for example of 1.5 m diameter and 2.5 m length (FIG. 7 of the '039 Climeworks publication). In this embodiment, a gas inlet manifold is formed by the stacked center holes and a gas outlet manifold can have the form of an annulus located around the cylindrical stack.

According to yet another embodiment of the '039 Climeworks publication the sorbent material layers have the shape of concentric annuluses and the stack formed by the layers has a cylindrical shape, for example of 1.5 m diameter and 2.5 m length (FIG. 8 of the '039 Climeworks publication).

According to one embodiment of the '039 Climeworks publication, the flexible fabric material layers enclosing the sorbent material layer perform at the same time the function of a particle filter holding back particles, e.g., dust particles, in the inlet gas stream from the sorbent material. The '039 Climeworks publication suggests that this embodiment can be advantageous for applications in which filtering of the inlet gas stream would be necessary to protect the sorbent material, for example for the case $CO_2$ adsorption from atmospheric air. In this embodiment, consequently, no additional filtering structure would be required. Due to the very high surface area of the fabric sheets and the relatively low flow velocity through them (see above), the pressure built-up on the sheets due to dust loading is relatively small.

In addition to the above, embodiments of the present disclosure further provide the advantage of holding back even smaller particles than is possible in the '039 Climeworks publication by implementing nonwoven, microporous materials (e.g., nonwoven and microporous ePTFE or ePE) in the sorbent material layer which reduces the porosity of the layer in order to prevent foreign particles of a predetermined size from passing entirely through the layer. The hydrophobic materials of the present disclosure may also facilitate preventing liquid water from entering the material layer while allowing water vapor to pass therethrough.

According to one aspect of the '039 Climeworks publication, the pressure drop of the gas flow through the gas inlet and outlet channels enclosed between the inlet faces and outlet faces of the sorbent material layers can be significantly smaller (preferably at least 5 times smaller, more preferably at least 10 times smaller) than the respective pressure drop of the gas flow through the sorbent material layers. The '039 Climeworks publication suggests that the advantage of this aspect is a more uniformly distributed pressure gradient across the sorbent material layers and therefore more uniformly distributed flow through the sorbent material layer, which ensures most efficient utilization of the sorbent material during the adsorption process.

In addition to the above, embodiments the present disclosure further provide the advantage of improving the uniformity of flow direction by controlling the directionality of inflow and outflow through the sorbent material layer using deflected portions or louvers provided at the external support structure, for example.

According to one embodiment of the '039 Climeworks publication, at least some of the elements (e.g. stiffeners/rods) of a stiff frame structure supporting the two layers of fabric material which are located inside the sorbent layer have the shape of a H, C or Z-profile or a similar shape. The '039 Climeworks publication suggests that this example has the advantage that by-pass flows by-passing the bulk layer of sorbent material, which are likely to occur at edges contained in the sorbent layer, can be reduced due to the fact that the path of a potential by-pass flow is significantly longer than it would be for the case of straight elements in the sorbent layer (FIG. 9 of the '039 Climeworks publication).

In addition to the above, the present disclosure further provides the advantage of reducing a thickness of the sorbent material layer to below 0.5 cm (e.g., from 0.1 cm to 0.5 cm, which is thinner than the thickness of from 0.5 cm to 2.5 cm as disclosed in the '039 Climeworks publication) by implementing an external support structure that is disposed entirely externally to the sorbent material layer (instead of the support being located inside the sorbent layer as do the stiffeners/rods of the '039 Climeworks publication) which may include the deflected portions or louvers provided to control the directionality of the gas flow passing through the external support structure, for example. Advantageously, having no internal frame structure in the present disclosure (such as the H, C or Z profile members as disclosed in the '039 Climeworks publication) beneficially reduces the number of edges contained in the sorbent layer, where "by-pass flows by-passing the bulk layer of sorbent material" are likely to take place, disclosed in the '039 Climeworks publication, which causes formation of leak paths. Reducing the number of edges beneficially reduces likelihood of possible leak paths occurring within the structure. While the '039 Climeworks publication attempts to minimize this detrimental effect by utilizing interior structures with longer pathways, the concept of the external support of the present disclosure eliminates this issue completely.

According to one embodiment of the '039 Climeworks publication, the sorbent material layers and their enclosing fabric material layers are built the way that the sorbent material can be filled into the layer through one or several holes, preferably at the edges of the sorbent material layer. Within this embodiment, the elements (e.g. stiffeners/rods)

of a stiff frame structure supporting the two layers of fabric material which are located inside the sorbent layer and can potentially form individual cells within the sorbent material layer have one or several holes through which the particulate sorbent material, which preferably has good flowability properties, can pass between the cells during the filling process. Also, if the heat transfer structure is made from a honeycomb structure, the walls of the individual cells of the honeycomb structure can comprise holes to interconnect the cells and facilitate filling the structure with the particulate sorbent material.

In comparison, in embodiments of the present disclosure, the external support structure of the sorbent material layer may be built or configured such that the structure of the sorbent material layer can be filled with the sorbent material particles through one or several holes, preferably at the edges of the structure, or filled from the ends, by offering a hinged or removeable endcap. The external support structure of the layer provides a significant advantage over the '039 Climeworks publication by eliminating the need for thicker layers and interior stiffeners to be implemented. Having interior stiffeners in the layer as disclosed in the '039 Climeworks publication would require the sorbent particles to pass around and through into differing regions within the sorbent layer.

According to one aspect of the '039 Climeworks publication, a method of producing the sorbent material layers consists in filling the particulate sorbent material into the layer enclosed between the two layers of fabric material through one or several holes, preferably at the edges of the sorbent material layer, preferably by utilizing pressurized air for the filling process.

In comparison, in embodiments of the present disclosure, the particulate sorbent material may be filled from the hinged or removable endcap of the external support structure. It should be understood that easily removing sorbent material (for eventual replacement thereof) is an important aspect of a sorbent bed structure as disclosed herein. The hinged or removable endcaps may allow the material to be poured out, for example by tipping the module or structure. Since there are no interior obstructions inside the external support structure as disclosed herein, the sorbent material can be readily removed and replaced or distributed within the module or structure with relative ease and efficiency.

According to one embodiment of the '039 Climeworks publication, an enclosure or cage enclosing the stack of the layers of sorbent material is supported by said stack to carry vacuum forces imposed on the container from the outside under certain process conditions.

According to one embodiment of the '039 Climeworks publication, lids or valves opening and sealing the gas inlet side or the gas inlet manifold and the gas outlet side or the gas outlet manifold can be opened over at least 50%, preferably at least 75%, more preferably at least 90% of the frontal area of the stack (viewed in the direction of the gas flow).

One aspect of the '039 Climeworks publication comprises a cyclic adsorption/desorption process to remove components from a gas stream that uses the unit described in the foregoing. In one preferred embodiment of the '039 Climeworks publication, the unit is used for a process to remove $CO_2$ from air using an amine-based sorbent material.

In a typical cyclic adsorption/desorption process using such a unit according to the '039 Climeworks publication, the adsorption can take place at ambient conditions, e.g., in a temperature range of −30-40° C. and at 0.7 to 1.3 bar absolute pressure. After the adsorption of carbon dioxide or carbon dioxide and water vapor the sorbent material can be regenerated or desorbed by heating it up to e.g. 50-120° C. and reducing the partial pressure of $CO_2$ around the sorbent material by reducing the absolute pressure to, e.g., 1-250 $mbar_{abs}$, i.e., apply a vacuum, and/or exposing the sorbent material to a purge gas flow. If the desorption is achieved by heating the sorbent and applying a vacuum, the overall cyclic process is referred to as temperature-vacuum swing (TVS) process. If the desorption is achieved by heating the sorbent and exposing it to a purge gas flow, the overall cyclic process is referred to as temperature-concentration swing (TCS) process.

In one preferred embodiment of the '039 Climeworks publication, the structure is used for a TVS process removing $CO_2$ from ambient air.

BRIEF DESCRIPTION OF THE DRAWINGS

Preferred embodiments of the disclosure are described in the following with reference to the drawings, which are for the purpose of illustrating the present preferred embodiments of the disclosure and not for the purpose of limiting the same. In the drawings, FIG. 1 (prior art) shows a cross section of the principle geometrical structure as known in the art including the layers of particulate sorbent material, each enclosed between two layers of a preferably flexible fabric material, arranged in the form of a stack to form gas inlet and outlet channels as found in the '039 Climeworks publication.

DETAILED DESCRIPTION

Definitions and Terminology

Figures 1, 1A:
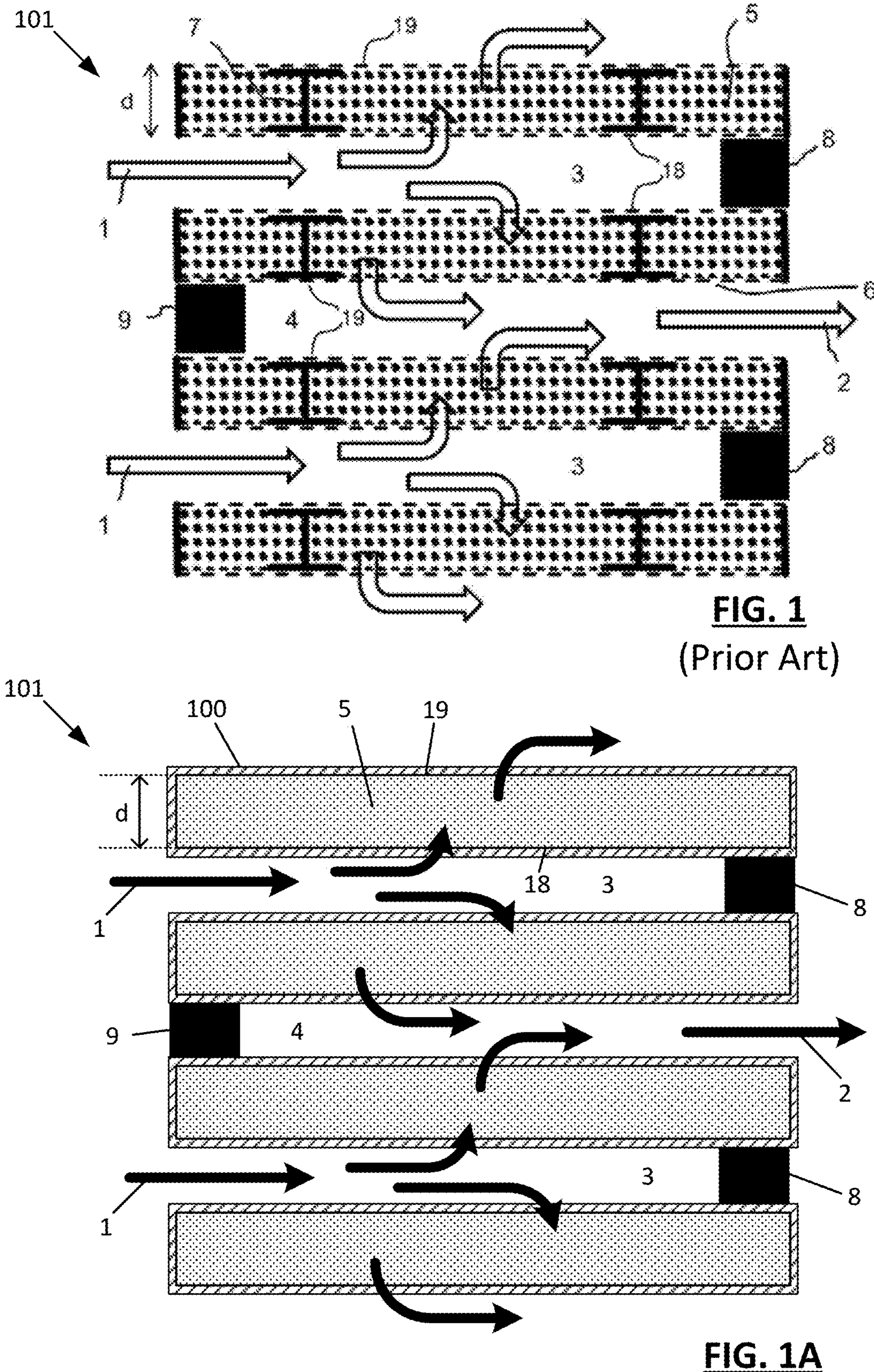
FIG. 1A shows a cross section of the principle geometrical structure of another embodiment of a sorbent article implementing an external support structure according to examples disclosed herein.

This disclosure is not meant to be read in a restrictive manner. For example, the terminology used in the application should be read broadly in the context of the meaning those in the field would attribute such terminology.

With respect to terminology of inexactitude, the terms "about" and "approximately" may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error, differences in measurement and/or manufacturing equipment calibration, human error in reading and/or setting measurements, minor adjustments made to optimize performance and/or structural parameters in view of differences in measurements associated with other components, particular implementation scenarios, imprecise adjustment and/or manipulation of objects by a person or machine, and/or the like, for example. In the event it is determined that individuals having ordinary skill in the relevant arts would not readily ascertain values for such reasonably small differences, the terms "about" and "approximately" can be understood to mean plus or minus 10% of the stated value.

The term "fibril" as used herein describes an elongated piece of material such as a polymer, where the length and width are substantially different from each other. For example, a fibril may resemble a piece of string or fiber, where the width (or thickness) is much shorter or smaller than the length.

The term "node" as used herein describes a connection point of at least two fibrils, where the connection may be defined as a location where the two fibrils come into contact with each other, permanently or temporarily. In some examples, a node may also be used to describe a larger volume of material than a fibril and where a fibril originates or terminates with no clear continuation of the same fibril through the node. In some examples, a node has a greater width but a smaller length than the fibril.

As used herein, "nodes" and "fibrils" may be used to describe objects that are usually, but not necessarily, connected or interconnected, and have a microscopic size, for example. A "microscopic" object may be defined as an object with at least one dimension (width, length, or height) that is substantially small such that the object or the detail of the object is not visible to the naked eye or difficult, if not impossible, to observe without the aid of a microscope (including but not limited to a scanning electron microscope or SEM, for example) or any suitable type of magnification device.

Example 1. Working Example of the '039 Climeworks Publication in the Form of a Rectangular Stack According to one working example as disclosed in the '039 Climeworks publication, the structure is composed of rectangular layers of sorbent material stacked on top of each other to form a rectangular block shaped stack comprising inlet channels, outlet channels and the sorbent layers. In this example, the fabrication and assembly of this example is described to illustrate the applicability of this invention in the form of a useful product for $CO_2$ extraction from ambient air.

Figure 10:
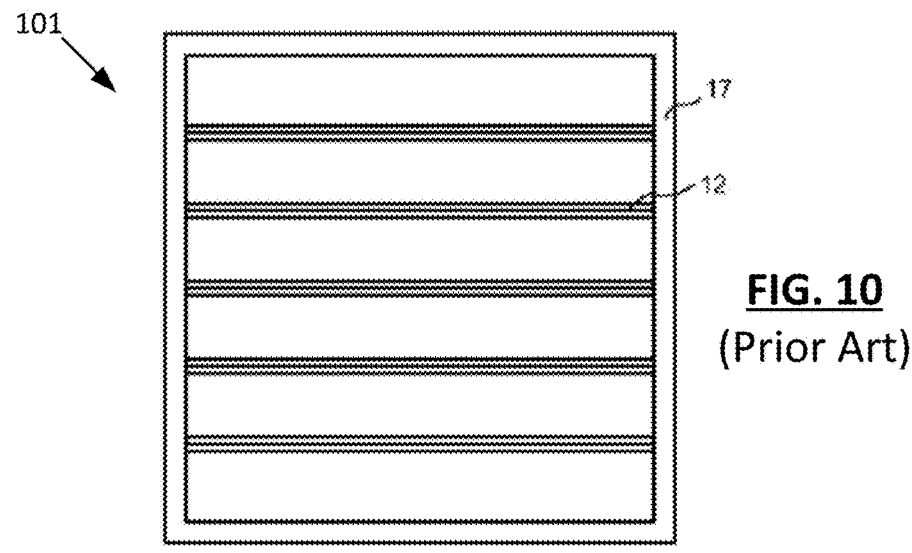
FIG. 10 (prior art) shows a top view of a single sorbent material layer frame as found in the '039 Climeworks publication.

The individual sorbent material layers of the '039 Climeworks publication are formed by stiff frame structures, each comprising a rectangular frame with 0.5 m×0.6 m edge length and a height of 1 cm, made of stainless steel profiles. A top-view of such a single frame is shown in FIG. 10 of the '039 Climeworks publication, a respective cross section in FIG. 11 of the '039 Climeworks publication. The fabrication and assembly of the overall structure comprises the following steps:

1. The frame structures are fabricated by welding stainless steel profiles (e.g. for high-volume production, frame structures with the same functionality can for also be made by injection molding of a plastic material or aluminum, which can significantly reduce the production costs);
2. Into the frames aluminum wire mesh and a rubber tube containing a heat transfer fluid is inserted to ensure good heat transfer;
3. A layer of non-woven fabric material is glued on each side (top and bottom) of the frame structure using a two-component adhesive.
4. A sorbent material based on amine modified cellulose fibers is produced according to a scaled-up version of the procedure disclosed in WO2012168346A1:
   a. Isolation of cellulose nanofibers from refined fibrous beech wood pulp suspension (see "1. Isolation of cellulose nanofibers" in WO2012168346A1);
   b. Adding a solution of hydrolyzed 3-aminoproplymethyldiethoxysilane to a nanofiber suspension having a dry mass content of 3.2%;
   c. Homogenizing and stirring the solution for 2 h;
   d. Freezing the solution batch-wise in copper forms in liquid nitrogen;
   e. Freeze drying the frozen mixture for 48 hours;
   f. Treating the dried material at 120° C. in an oven under an argon atmosphere;
   g. Compressing and grating the material to obtain a granular sorbent material with average particles size of around 400 μm;
5. The sorbent material is filled into the frame structure through a hole which is closed afterwards;
6. A stable layer of sorbent material layer is obtained. The thickness varies between 1 and 1.5 cm;
7. In total, 26 frames are stacked on top of each other while distance pieces form the inlet and outlet channels;
8. The stack is mounted inside a rectangular vacuum chamber with internal dimensions of 0.55 m×0.55 m×0.65 m with an inlet and an outlet opening for the air flow;
9. A pneumatically actuated butterfly valve is connected to each of the openings to seal and open the chamber towards the environment;
10. The inlet opening is connected to a fan to produce the air flow during adsorption. Further, the chamber is connected to a vacuum pump to reduce the pressure during desorption and to a thermostat to heat and cool the stack during the individual cycle steps;

According to the '039 Climeworks publication, within the stack of this example, a total surface area of the sorbent material layers toward the gas inlet channels of about 8 $m^2$ is accommodated. While the design air flow through the chamber is as high as 800 $m^3$ per hour, the average velocity of the air flow through the sorbent layers is as little as 0.028 m/s. This ensures a very little pressure drop (see Example 2 of the '039 Climeworks publication below).

Figures 6, 6A:
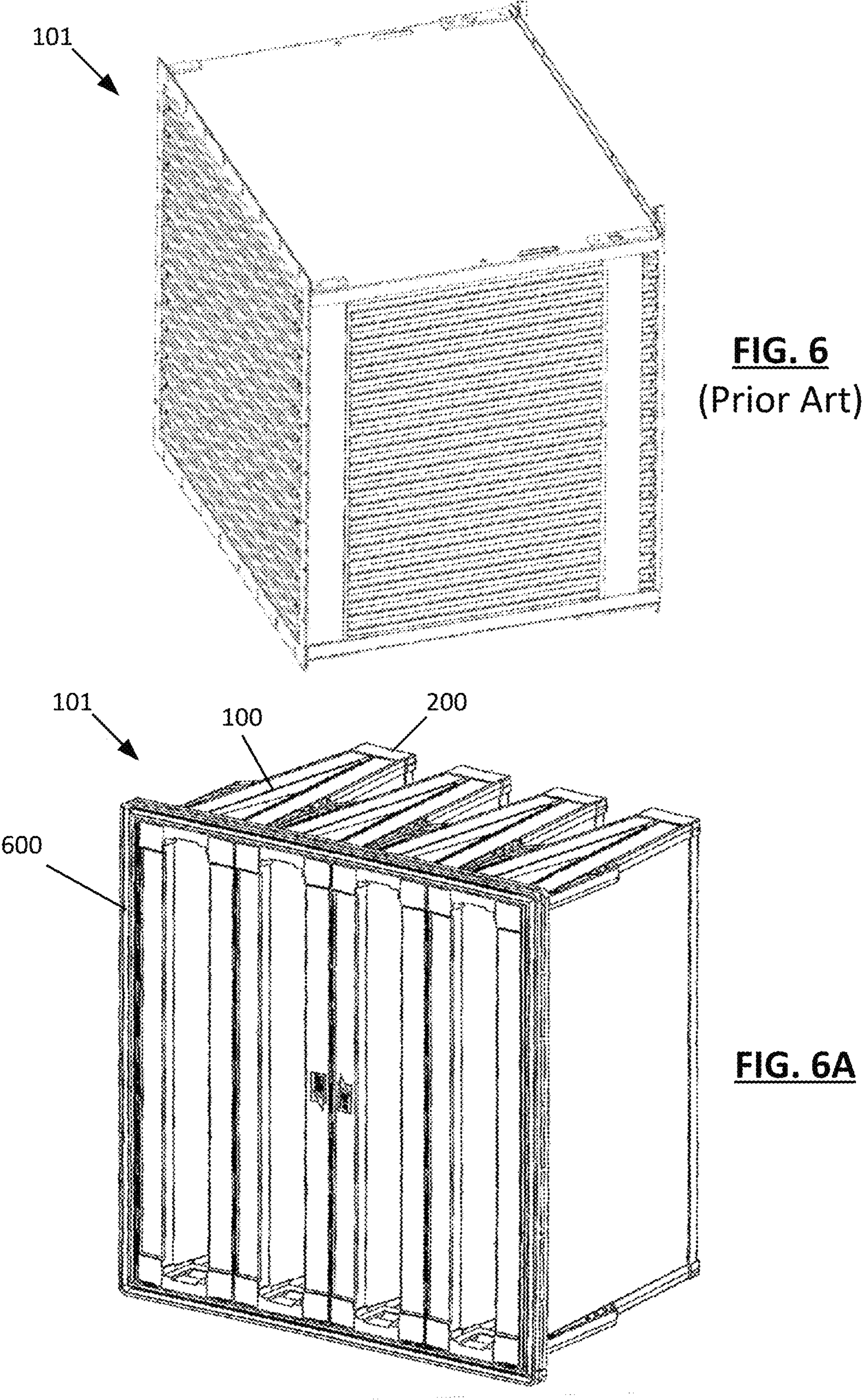
FIG. 6 (prior art) shows a cross section of one example as known in the art in which the sorbent material layers have a rectangular shape and the stack formed by the layers has a rectangular block shaped form as found in the '039 Climeworks publication.
FIG. 6A shows another embodiment of the sorbent article where the layers of particulate sorbent material are supported by an external support structure and arranged in a "zigzag" configuration according to examples disclosed herein.
Figures 7, 8, 9:
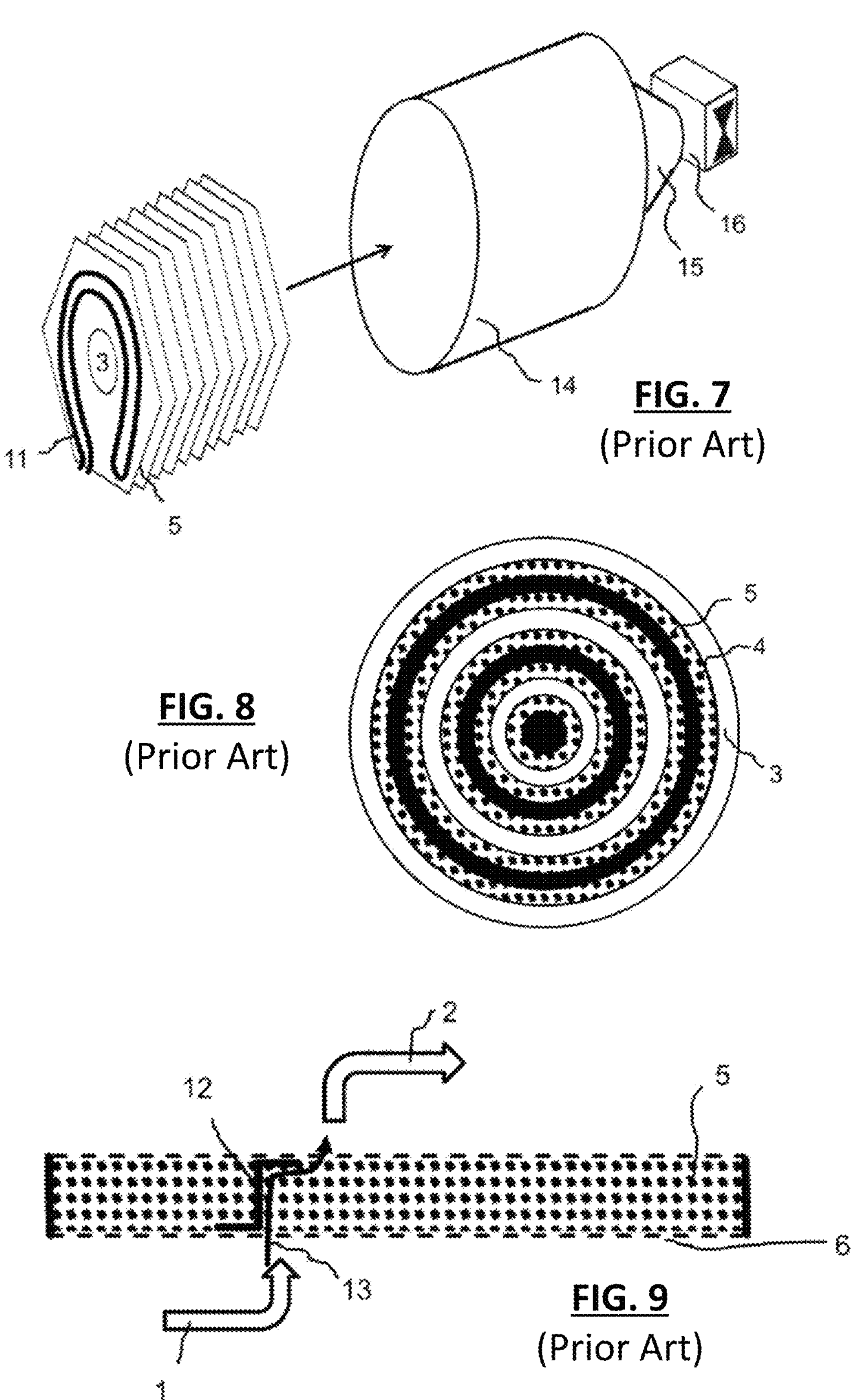
FIG. 7 (prior art) shows an exploded view of one example as known in the art in which the sorbent material layers have a hexagonal shape with a center hole and the stack formed by the layers is enclosed in a cylindrical container as found in the '039 Climeworks publication.
FIG. 8 (prior art) shows a cross section of one example as known in the art in which the sorbent material layers have the shape of concentric annuluses and the stack formed by the layers has a cylindrical shape as found in the '039 Climeworks publication.
FIG. 9 (prior art) shows a cross section of one sorbent material layer in which elements of a stiff frame structure located inside the sorbent layer have the shape of a Z-profile, elongating the path length of potential by-pass flows as found in the '039 Climeworks publication.
Figure 11:
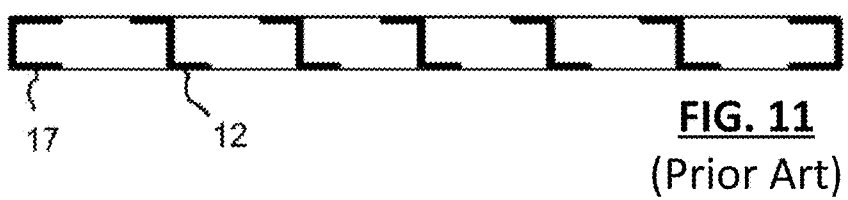
FIG. 11 (prior art) shows a cross section of a single sorbent material layer frame as found in the '039 Climeworks publication.
Figure 12:
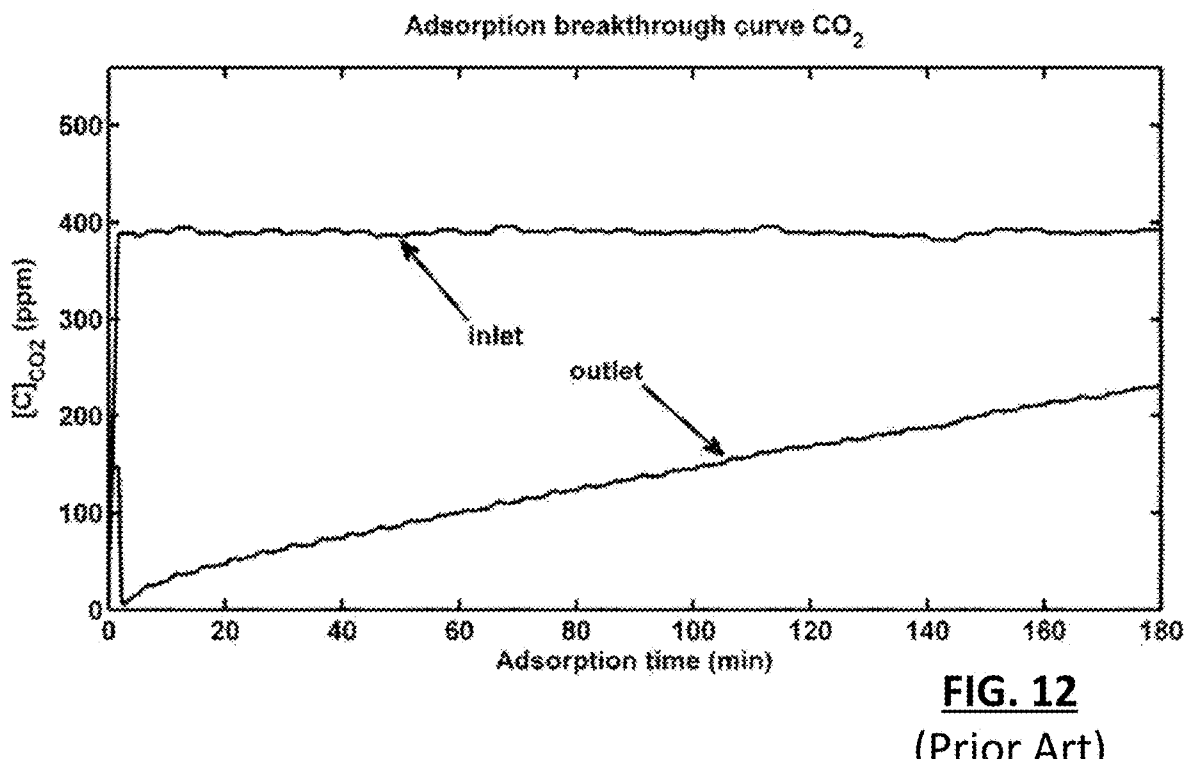
FIG. 12 (prior art) shows the adsorption breakthrough curve of an example as known in the art as found in the '039 Climeworks publication.

In FIG. 1 of the '039 Climeworks publication, a principle schematic of the embodiment of this example is shown. In FIG. 6 of the '039 Climeworks publication, a 3-D view of the stack comprising 26 sorbent material layers is shown. In FIG. 10 of the '039 Climeworks publication, a top view of one of the frame structures composed of C-profiles 17 and Z-profiles 12 is shown. In FIG. 11 of the '039 Climeworks publication, a cross section through the frame structure is shown.

Example 2. Determination of the Pressure Drop Through a Stack of Sorbent Layers According to the '039 Climeworks publication, the pressure drop imposed on an air flow passing through a structure essentially fabricated according to the description of Example 1 of the '039 Climeworks publication is experimentally determined for different flow rates. To this end, both butterfly valves are opened and a variable speed fan is attached to the inlet opening producing different air flow rates through the stack. The flow rate is measured with an in-pipe velocity head meter and the pressure drop over the structure is measured using a differential pressure sensor. The observed pressure drop for various volume flow rates is shown in the following table:

| Volume flow ($m^3/h$) | Pressure drop (Pa) |
|---|---|
| 200 | 16 |
| 400 | 31 |
| 600 | 58 |
| 800 | 98 |

According to the '039 Climeworks publication, up to the design flow rate of 800 $m^3/h$, which is required to capture around 1 kg of $CO_2$ from air per cycle (see Example 3 of the '039 Climeworks publication,), the pressure drop stays below 100 Pa. If the average pressure drop during the adsorption process is 100 Pa, the required pumping work to capture one ton of $CO_2$ from atmospheric air is around 80 kWh (assuming that on average 70% of the $CO_2$ is captured from the air stream and a fan efficiency of 70%). This energy consumption would correspond to electricity costs for air ventilation of US$8 per ton of $CO_2$ (assuming an electricity price of US$0.1 per kWh), which is in an acceptable range. However, if the pressure drop was as high as 500 Pa, the corresponding electricity costs of US$40 for air ventilation would exceed the tolerable limits for an economic process.

The '039 Climeworks publication suggests that the above shows an advantage of the structure of the examples disclosed therein over conventional arrangements of particulate sorbent materials such as packed beds or fluidized beds, which are much longer than the sorbent packing of the '039 Climeworks publication and which typically introduce pressure drops of several thousand Pascals up to several bars.

In addition to the above, embodiments of the present disclosure further provide the advantage of a more compact configuration for the packed beds of particulate sorbent materials by implementing the external support structure with an internal volume into which the particulate sorbent materials can be disposed, such that the materials can be supported while reducing the thickness of the packed beds (or sorbent layer) because the thickness is defined by the external support structure.

Example 3. Performance of Example 1 within a Cyclic Adsorption/Desorption Process According to the '039 Climeworks publication, a structure essentially fabricated according to the description of Example 1 of the '039 Climeworks publication is used for a cyclic temperature-vacuum swing adsorption/desorption process to extract $CO_2$ from ambient air. One cycle of the process takes about 6 hours and comprises the steps adsorption (3 hours) and desorption (3 hours).

During the adsorption step in the '039 Climeworks publication, according to Example 2 of the '039 Climeworks publication above, the butterfly valves are opened and air is blown through the structure by a variable speed fan, while the flow rate is recorded. Further, the $CO_2$ content of the air flow and its relative humidity are measured before and after the vacuum chamber using an infrared detector. The relative humidity during the adsorption process is relatively constant between 35% and 40%. The air flow is 750 to 800 $m^3/h$. The $CO_2$ concentration before and after the chamber ("adsorption breakthrough curves") during adsorption are shown in FIG. 10 of the '039 Climeworks publication.

According to the '039 Climeworks publication, initially, during the first minutes of the adsorption process, the $CO_2$ concentration at the outlet of the chamber drops down to almost 0 ppm. This demonstrates the very good performance of the structure of this embodiment, since the vanishing $CO_2$ concentration indicates that substantially all of the air flow passing through the structure effectively passes through the sorbent material layers and does not by-pass them. If there had been a substantial by-pass blow, this by-pass flow, which would still contain about 400 ppm $CO_2$, would have mixed with the portion of the flow that passes through the sorbent material layer and would have increased the $CO_2$ concentration at the chamber outlet.

The '039 Climeworks publication suggests that this behavior of the system is substantially superior to the behavior that was observed in experiments with a short packed bed of the sorbent material of 1 cm length in a conventional, 4 cm diameter stainless steel column, in which the outlet $CO_2$ concentration never reached values as low as observed in this example, presumably due to flow by-passing since the bed was not fixed between two layers of fabric and by-passing could occur along the column walls.

In particular, the '039 Climeworks publication suggests that this demonstrates that the structure disclosed in the examples disclosed therein allows creating embodiments based on 3-D structures and embodiments comprising different materials, which exhibit advantageous behavior during operation and which cannot be created from prior-art extruded 2-D structures.

In addition to the above, embodiments of the present disclosure further provide the advantage of more compact 3-D structures for the packed beds of particulate sorbent materials by implementing the external support structure with an internal volume into which the particulate sorbent materials can be disposed. Beneficially, the thickness of the 3-D structure can be reduced to below 0.5 cm (e.g., 0.1-0.5 cm which is thinner than the 1 cm thickness or length of the sorbent material as referred to above in the '039 Climeworks publication) since the thickness is defined by the external support structure.

Further, the '039 Climeworks publication suggests that this example illustrates that with the proposed structure, extraction of a substantial portion of the $CO_2$ contained in a stream of atmospheric air using a particulate amine-modified sorbent material is possible at a pressure drop below 100 Pa with a structure that can be manufactured with reasonable effort.

Figure 13:
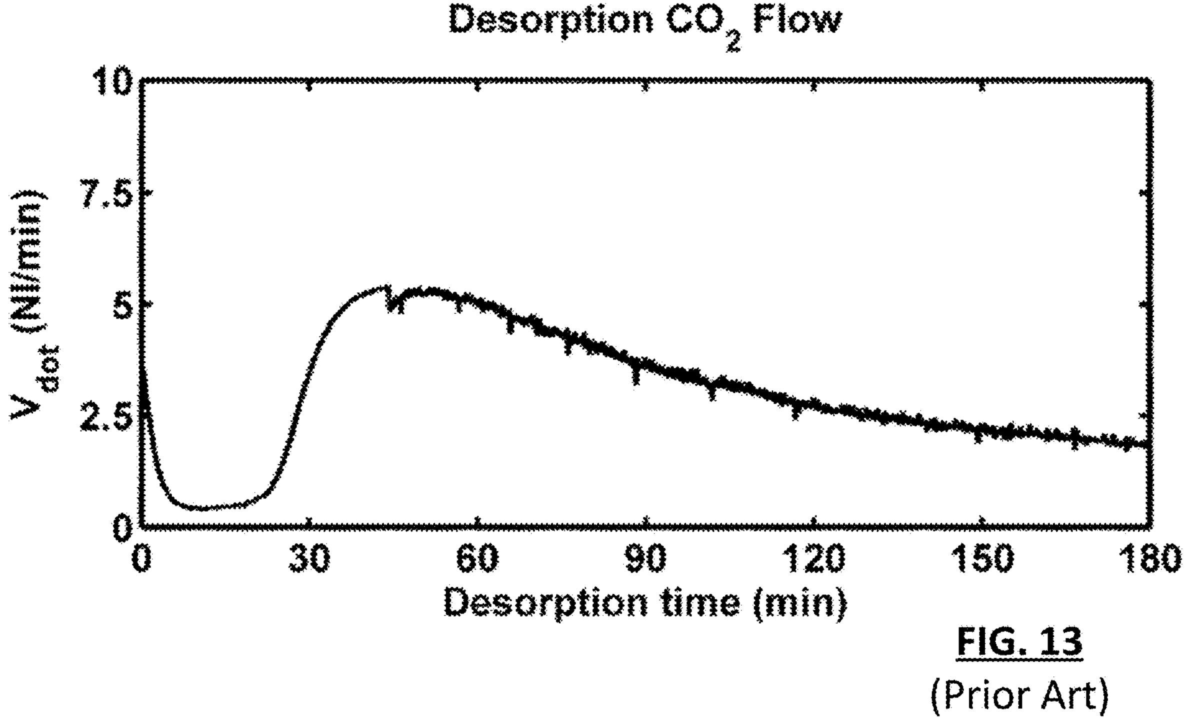
FIG. 13 (prior art) shows the $CO_2$ desorption flow during the desorption step of a process for extracting $CO_2$ from atmospheric air as found in the '039 Climeworks publication.
Figure 14:
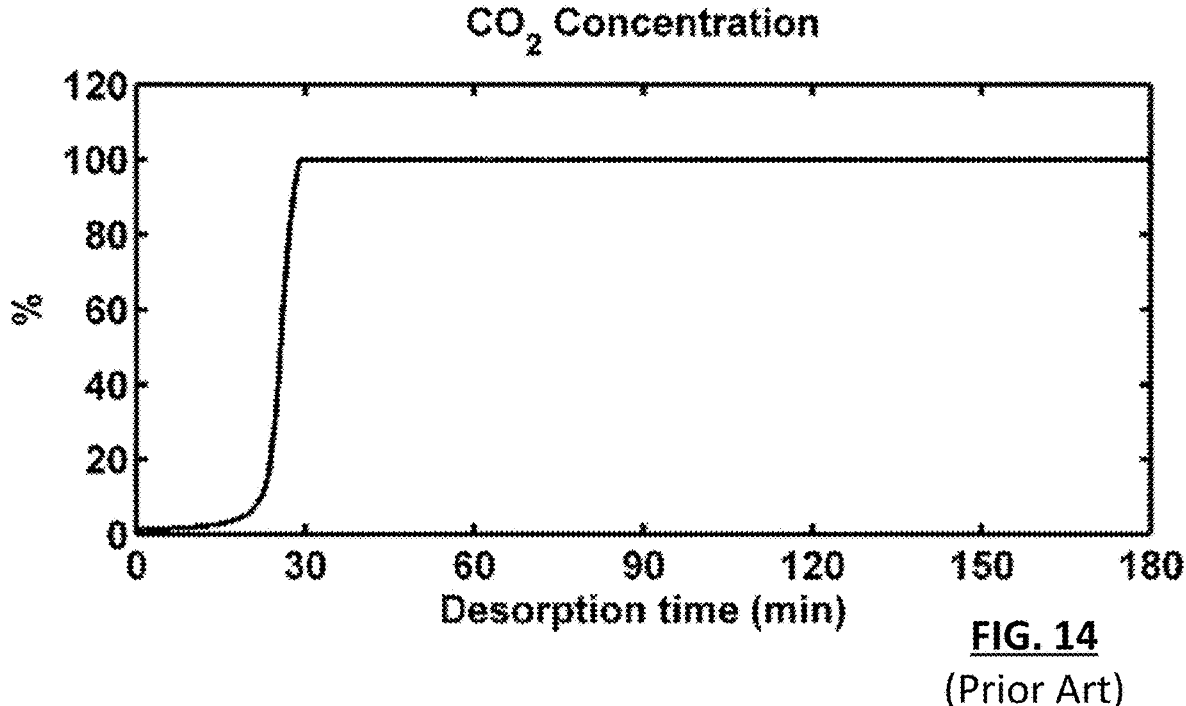
FIG. 14 (prior art) shows the $CO_2$ concentration in the desorption stream during the desorption step of a process for extracting $CO_2$ from atmospheric air as found in the '039 Climeworks publication.

During the subsequent desorption step in the '039 Climeworks publication, the vacuum chamber is evacuated to about 100 $mbar_{abs}$ and the stack is subsequently heated up to about 85° C. by circulating hot water through the plastic tubes. Thereafter, the $CO_2$ desorbing from the sorbent material is constantly pumped off the chamber by the vacuum pump. The mass flow rate of the $CO_2$ leaving the vacuum pump is measured using a calorimetric mass flow meter, see FIG. 13 of the '039 Climeworks publication. The $CO_2$ concentration is also measured using an infrared sensor, see FIG. 14 of the '039 Climeworks publication. It is observed that after the air that is initially still contained in the system is purged out, the $CO_2$ concentration reaches the saturation limit of the sensor after about 30 min desorption time, indicating that the obtained $CO_2$ concentration is at least >99%. During the complete desorption step in the '039 Climeworks publication, about 1 kg of $CO_2$ are recovered. Thereby, this example further illustrates that the structure of the '039 Climeworks publication was successfully applied to extract $CO_2$ with a purity of >99% from atmospheric air.

Example 4. Example with Triangular Gas Inlet and Outlet Channels

Figure 2:
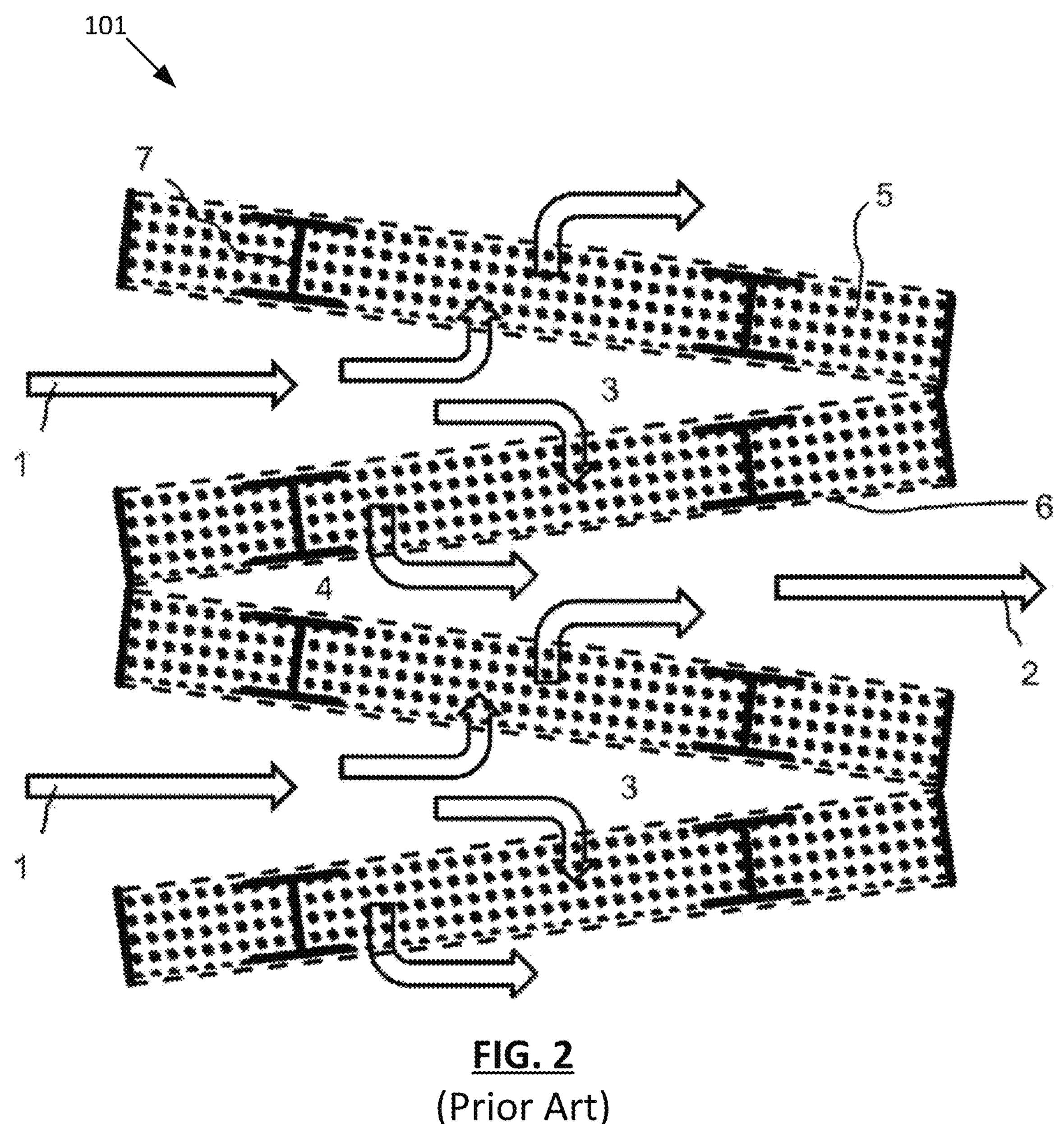
FIG. 2 (prior art) shows a cross section of an example as known in the art according to FIG. 1 in which the layers of particulate sorbent material are arranged in a "zigzag" configuration as found in the '039 Climeworks publication.

Another structure is fabricated according to the '039 Climeworks publication, in which the gas inlet and outlet channels between the sorbent material layers have a triangular cross section. To this end, 20 frame structures each defining a 2 cm thick sorbent material layer are produced by injection molding of a thermoplastic material. During the injection molding process, a heat transfer structure composed of an aluminum tube and an aluminum honeycomb structure with a cell width of ½ inch, in which four of six side walls of each cell contain a center hole of 4 mm diameter, is integrated within the frame structure. Each frame further comprises triangular edges on its top defining the distance between two stacked frames and thereby the shape of the gas inlet and outlet channels. After the molding process, a woven fabric material made from a mixture of PET and PE fibers is glued on both sides of the frame and the frame is filled with sorbent material analog to the filling process described in Example 1 of the '039 Climeworks publication. During the filling process, the sorbent material passes through the network of the cells of the aluminum honeycomb structure via the holes in the side walls of the honeycomb cells. The 20 frame structures are thereupon stacked on top of each other to form a stack with a cross section as schematically shown in FIG. 2 of the '039 Climeworks publication.

Example 5. Utilization for a Flue Gas $CO_2$ Capture Process

According to the '039 Climeworks publication, a stack of sorbent material layers contained in a vacuum chamber similar to the stack described in Example 1 of the '039 Climeworks publication is used to capture the $CO_2$ contained in the flue gas stream of a natural gas powered combined heat and power internal combustion engine.

According to the '039 Climeworks publication, in this case, the $CO_2$ concentration in the gas stream passing through the structure is approximately 6%. The gas volume flow during adsorption is substantially lower, i.e., in the range of 20 to 30 $m^3/h$. The adsorption process takes 0.5 h, on average 90% of the $CO_2$ contained in the gas stream are extracted.

According to the '039 Climeworks publication, the desorption process takes 1 h, during which the $CO_2$ is removed from the sorbent material by heating it to 95° C. Three of the units (one unit composed of one stack contained in a vacuum chamber) are operated in tandem operation, so that at each time, one stack is in adsorption mode and two stacks are in desorption mode and $CO_2$ can be continuously captured from the flue gas stream.

Example 6. Effect of Heat Exchange Structure Placed Inside the Sorbent Material

According to the '039 Climeworks publication, in order to demonstrate the effectiveness of a heat transfer structure incorporated within the sorbent material layer in an experiment, a packed bed of 100 g of sorbent material (see Example 1 of the '039 Climeworks publication) is placed in a rectangular packed bed aluminum reactor with a cross section of 60 mm×60 mm. After 3 hours of adsorption during which 20 l/min of air at 60% relative humidity are streamed through the reactor, the sample is desorbed by evacuating the reactor to 100 $mbar_{abs}$ by a vacuum pump and heating the reactor walls through a water-filled jacked to 90° C. The temperature in the center of the bed is recorded during the desorption process. For this experiment, it takes 221 minutes to reach a temperature of 80° C. in the bed center.

Subsequently, according to the '039 Climeworks publication, the experiment is repeated with 6 g of a ¾ inch cell width aluminum honeycomb structure placed in the sorbent material bed to increase heat transfer. For this experiment, it takes 79 minutes to reach a temperature of 80° C. in the bed center.

The '039 Climeworks publication submits that this observation demonstrates the effectiveness of a heat transfer structure included in the sorbent material bed, resulting in significantly shorter times to heat up the sorbent material bed during the desorption step, which in turn reduces the overall cycle time and thereby the overall cost of the adsorption process.

The '039 Climeworks publication submits that this example further illustrates another advantage of the structure disclosed in the examples disclosed therein over other prior art structures, since 3-D structures increasing the heat transfer included within the sorbent material layers, such as an aluminum honeycomb, cannot be easily incorporated into prior art, extruded 2-D structures.

In addition to the above, the present disclosure further provides the advantage of having a reduced sorbent layer thickness as well as a controlled directionality of the air flow therethrough by implementing the external support structure as disclosed herein. Furthermore, the lack of internal support structure (such as the aforementioned honeycomb structure of the '039 Climeworks publication) in the sorbent layer provides the additional benefit of having no internal structures which may impede the emptying and refilling process of the sorbent layer, for example.

Example 7. Example in the Form of a Rectangular Stack, Describing the Possible Dimensions of Frames and Stack and Stack Assembly Considering the requirements on pressure drop, an inlet and outlet channel length of 1 m was defined with a maximum sorbent material layer thickness of 1 cm and an inlet channel height of 1 cm, according to the '039 Climeworks publication. For constructive reason the vacuum chamber in which the adsorber structure is housed was defined to contain between 500 and 1000 kg of sorbent material. The resulting width of the frames was found to be 1.45 m. The frames are stacked on one another in the 'zig-zag' fashion with an angle of 2° between planar surface. In this fashion, the dead volume (i.e. volume of the stack not occupied by sorbent material) is decreased by 40% compared to a stack with parallel channels and the same inlet channel height. The reduction of dead volume increases the cost efficiency and process efficiency by packing more sorbent material into a given volume and thereby producing more $CO_2$ from a given facility. The resulting stack height is 1.47 m with 88 sorbent material frames.

Figure 15:
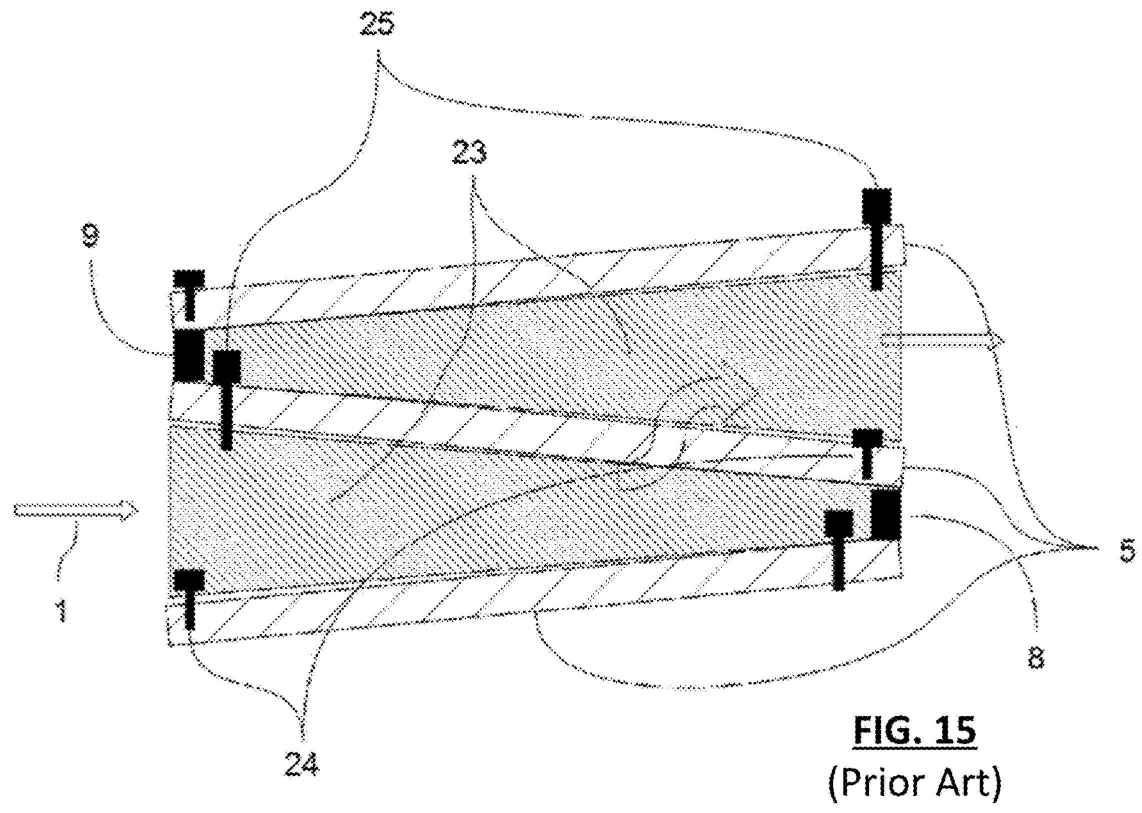
FIG. 15 (prior art) shows the example of the 'zig-zag' stack viewed perpendicular to the air flow direction showing mounting screws, wedges and sealing components as found in the '039 Climeworks publication.

In FIG. 15 of the '039 Climeworks publication, the frames 5 are shown being separated by wedge formed spacers 23, which are glued to the frames along the 1 m edges. These wedge spacers serve to produce the angle of the channels and seal the channels on the sides. Each wedge spacer is oriented on the head of a screw 24 affixed to the frame at the thick end. Each spacer is also affixed to the neighboring frame with screws 25 passing through the neighboring frame and attaching into the next lower wedge spacer. The wedge spacers are glued on the frames with double sided tape to provide a homogenous bond. The sealing strips 8, 9 seal off the channels and form thus the inlet and outlet channels respectively through which the airflow 1 must pass. This assembly solution allows for high modularity and adaptability of the stack in contrast to extracted monoliths or welded structures used in the prior art. Single or groups of frames can be added, removed or replaced economically and without affecting the performance of the stack as a whole.

Figure 16:
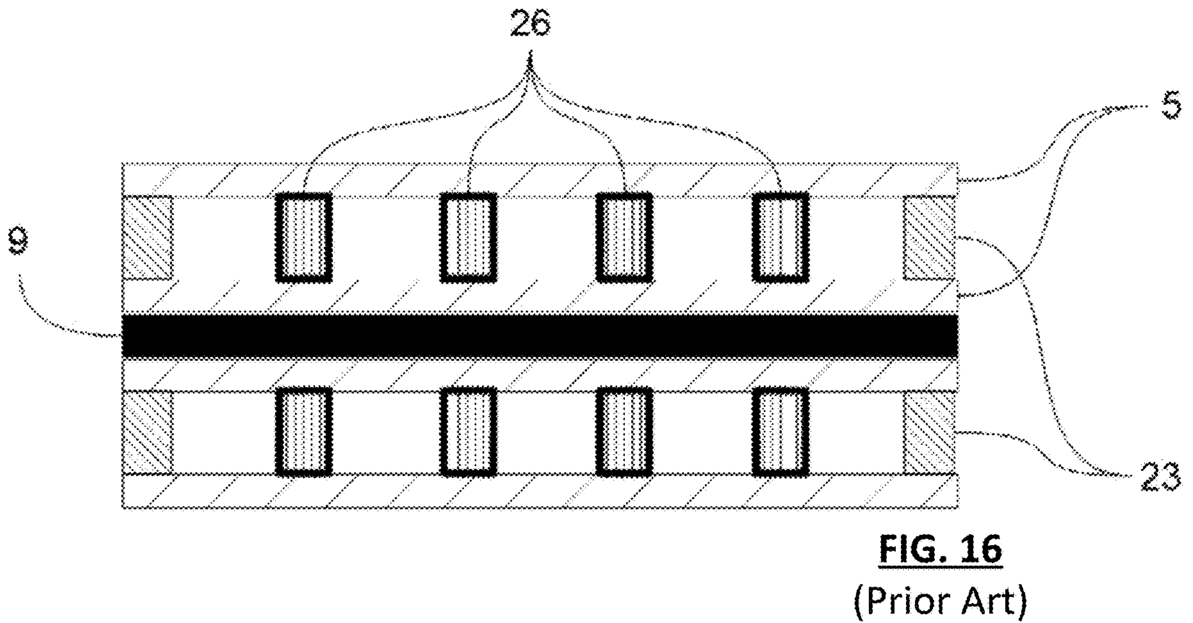
FIG. 16 (prior art) shows the stack viewed parallel to the air flow direction with wedges between frames to maintain channel geometry under load as found in the '039 Climeworks publication.

In FIG. 16 of the '039 Climeworks publication the stack is shown from the orientation of the inlet channel. The wedges 26 placed on the primary heat transfer structure, also support the inlet channel profiles to prevent sagging and maintain the desired width of the inlet channel. In order to assure a consistent height of the stack of 88 frames the overall height of each stacked component needs to be within acceptable tolerances. Additionally, the bonds between the fabric material and frames and the wedges and sealing strips need to be consistent and homogenous. For example, a 0.5 mm tolerance on the thickness of a glue bead on each frame produces a total shift in the position and height of the 88 frame stack of 4.4 cm which jeopardizes the connection with the heat transfer fluid system as described in Example 10 of the '039 Climeworks publication. To this end, double sided tape with 0.22 mm thickness is used. The tape offers consistent bond thickness and strength, can withstand the temperatures imposed by the desorption process of up to 120° C., facilitates repairs and overhauls and shortens assembly time compared to glue.

According to the '039 Climeworks publication, the same principle of the stack layout and assembly described in this example can be applied to various other stack geometries, for example, but not limited to smaller stacks consisting of less frames, different frame dimensions, and a non-angular stacking layout, i.e. a stack in which the frames are essentially parallel to each other with no angle between the surfaces, i.e. no 'zig-zag' structure.

Example 8. Low Thermal Mass Frames

A reduction of the thermal mass of the frames per mass of contained sorbent material reduces the overall energy demand of the desorption process and is a critical parameter in the design of DAC systems. As the desorption process takes place in a vacuum structure which carries the vacuum forces, the frames themselves must only carry their own weight, the weight of the sorbent material, the weight of the heat transfer structures, and assure the desired geometry of the inlet and outlet channels and the sealing faces. According to the '039 Climeworks publication, an example of such a frame was constructed with four aluminum C profiles with 10×10 mm outer dimensions and 8×8 mm inner dimensions, connected with edge brackets to form the rectangular form. The primary heat transfer structure is formed by 10 passes of 8 mm OD aluminum tubing which is placed into the C profiles and which pass at two places through the C profiles to allow connection with water distributors. In this manner, the stability of the primary heat transfer structure is assured without additional frame components. The aluminum tubes (primary heat transfer structure) thereby make up a significant contribution to the overall stiffness of the frame. The secondary heat transfer structure is formed of expanded aluminum sheet metal, which is formed to the primary heat transfer structure as in FIG. 5 of the '039 Climeworks publication and glued in place. The fabric material is bonded between the C profiles at the edges of the frame forming the closed, air permeable volume in which the sorbent material can be filled. In order to prevent bulging when filled with sorbent material, the fabric material is tensioned and glued to the tubing of the primary heat transfer structure and the edge profiles of the frame. Thereby cells are formed with dimensions of 1 m×0.1 m in which the sorbent material is filled. Each cell is equipped with a sealable hole in the C profile at one corner to allow sorbent to be filled.

According to the '039 Climeworks publication, in the feasibility of a frame design, the thermal mass of the components which must be thermally cycled during the cyclic adsorption-desorption process is a decisive factor. The contributions of each element and the total thermal mass of the frame per unit mass of contained sorbent material are detailed in the following table. The contained sorbent mass is 7.25 kg.

| Frame component | Mass (kg) | Material | Specific Thermal Mass (kJ/K/kg sorbent) |
|---|---|---|---|
| C Profiles & Struts | 0.37 | Aluminum (Profiles) | 0.046 |
| Wedge spacers and sealing strips | 0.158 | Ultramide (PA) | 0.037 |
| Primary heat transfer structure | 1.07 | Aluminum (Tubing) | 0.132 |
| Secondary heat transfer structure | 1.31 | Aluminum (Expanded metal) | 0.162 |
| Total | 2.908 | | 0.377 |

According to the '039 Climeworks publication, an example sorbent suitable for $CO_2$ capture from ambient air has a specific heat capacity of 1.4 kJ/K/kg sorbent with a specific heat of desorption of $CO_2$ and water of 211 kJ/kg sorbent material. In a typical desorption process the sorbent material must be heated from the adsorption temperature of 20° C. to 100° C. The total thermal energy demand in this typical desorption process can be determined to be 323 kJ/kg sorbent material. The thermal energy demand of the frames in this scenario is 30.2 kJ/kg sorbent material or 9.3% of the total thermal energy demand.

Example 9. Heat Transfer Structure and its Dimensioning

Figure 17:
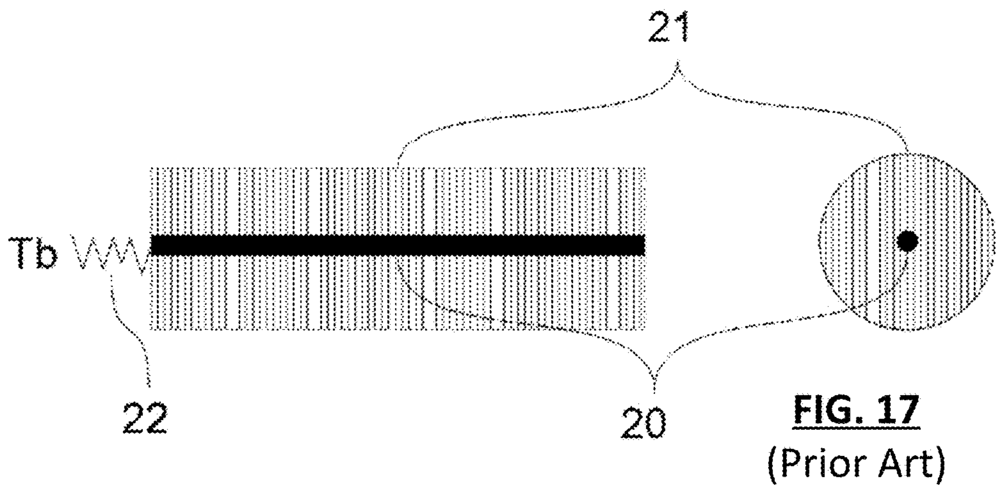
FIG. 17 (prior art) shows schematically the thermal model used for dimensioning the primary and secondary heat transfer structures as found in the '039 Climeworks publication.

Heat transfer through a representative unit cell of a secondary heat transfer structure and sorbent material was investigated with numerical simulations in the '039 Climeworks publication. A representative unit cell composed of a heat transfer structure concentric with a sorbent cell was investigated as shown in FIG. 17 of the '039 Climeworks publication. A temperature boundary condition was applied at one end of the heat transfer structure separated from the unit cell by a thermal resistance representing the connection between the primary and secondary heat transfer structures. Various effects of the thermal connection, material and geometry were investigated. Of common engineering materials, aluminum was determined to be the most favorable for the chosen parameters due to its high thermal conductivity, low density and corrosion resistance. For the desired sorbent material and the desired duration of the desorption process, it was found that a cell with 50 mm length and 10 mm sorbent cell diameter can be heated sufficiently with a secondary heat transfer structure of 1.7 mm diameter. Such geometry yields a specific weight of heat transfer structure of 0.2 kg/kg sorbent material which is more than the 0.06 kg/kg sorbent material described in Example 6. These structures offer a high thermal conductivity in the planar directions, are easily formable, and allow for effective bonding with the primary heat transfer structure.

The 50 mm unit cell length translates into the spacing of the primary heat transfer structure in the form of bent aluminum tubing. Over the 1.5 m width of the frames, there are therefore 10 passes of aluminum tubing. This solution represents a good compromise between the density of heating, structural stability, material demand and thermal mass of the frames.

Figure 5:
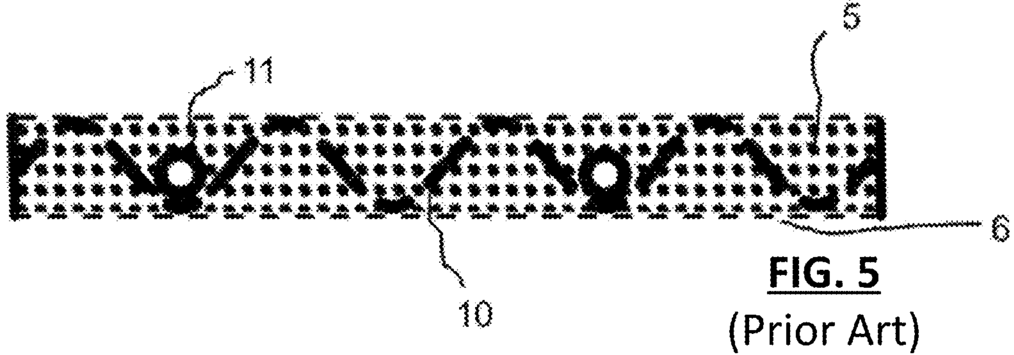
FIG. 5 (prior art) shows a heat transfer structure of a corrugated shape, placed within the sorbent material layer, where the bottom and top peaks of the corrugations serve as mounting surfaces for the fabric material enclosing the sorbent material as found in the '039 Climeworks publication.
Figures 19, 20:
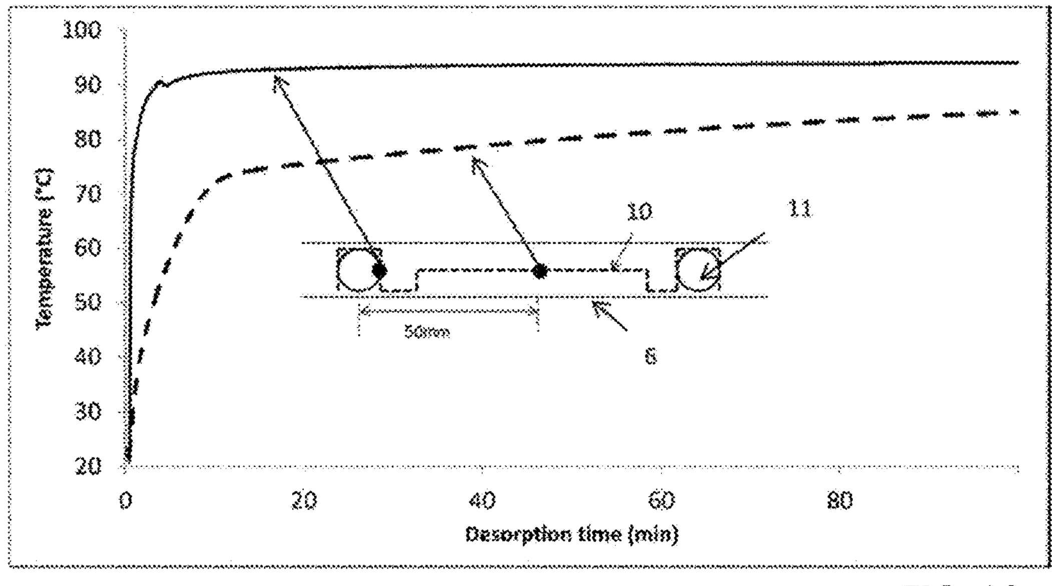
FIG. 19 (prior art) shows the temperature profiles of primary and expanded metal secondary heat transfer structures in a desorption process as found in the '039 Climeworks publication.
FIG. 20 (prior art) shows a heat transfer structure with fins for improved heat transfer, wherein in a) a view along the tubing of the primary exchange system and in b) the lateral view along the fin as found in the '039 Climeworks publication.
Figure 21:
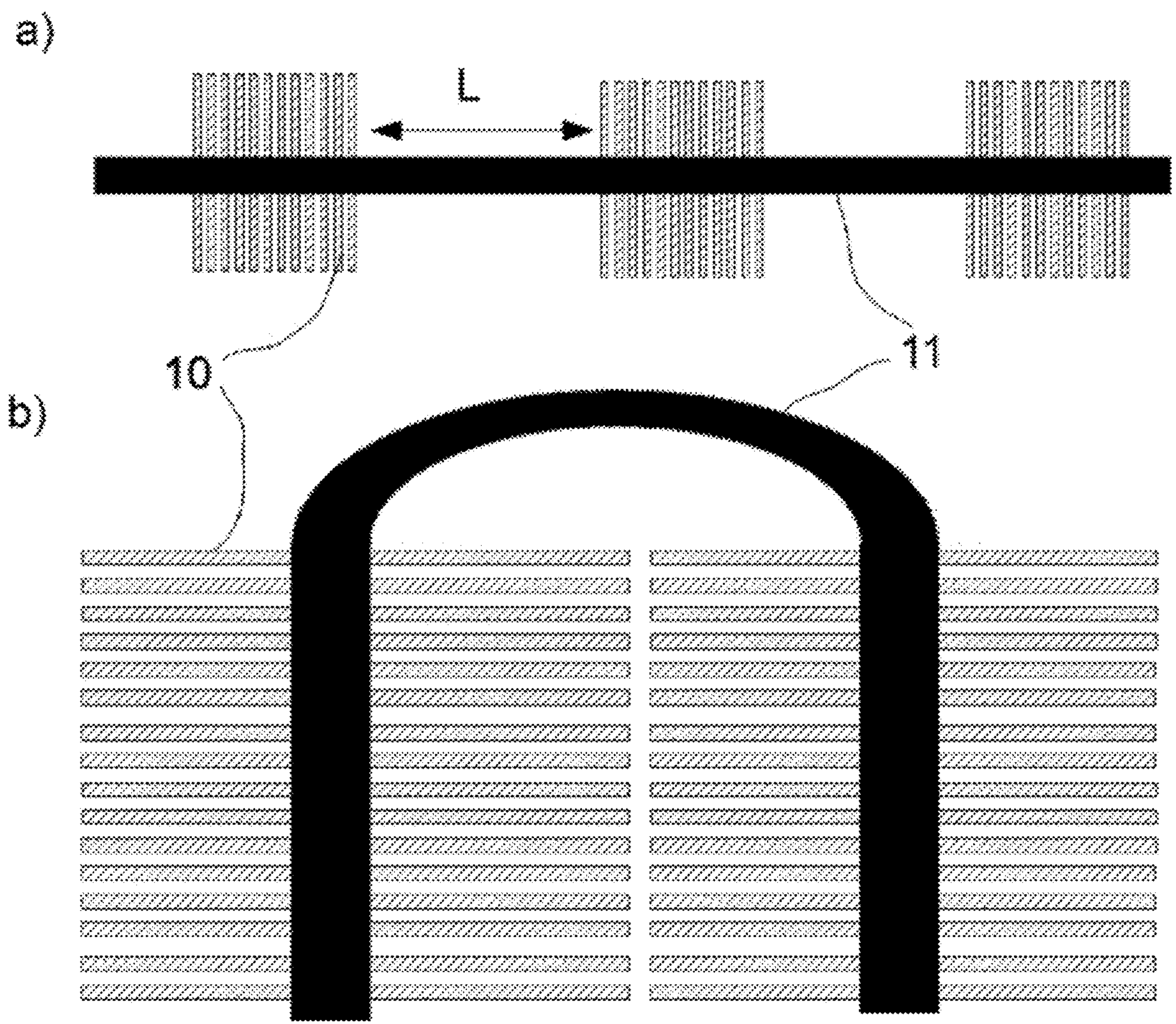
FIG. 21 (prior art) shows a production process illustration, wherein in a) the structure before bending as illustrated and in b) the final bent structure as found in the '039 Climeworks publication.

The selected aluminum expanded metal of the secondary heat transfer structure is firstly formed around the primary heat transfer structure to increase the contact area consistent with the form shown in FIG. 5 of the '039 Climeworks publication. Further, the secondary heat transfer structure can be bonded with the primary structure with high thermal conductivity glues, or aluminum brazing. Shown in FIG. 19 of the '039 Climeworks publication, are the temperature curves for a desorption process in a frame equipped with an expanded metal secondary heat transfer structure soldered to the tubing of the primary heat transfer structure. In this example a relatively low heat transfer fluid feed temperature of 93.6° C. flowed in the primary heat transfer structure. The temperature profiles of the surface of the tubing and at the middle of the expanded metal between the tubing show that within the desorption time of 90 minutes, the sorbent achieves a temperature of 85° C.

Example 10. Connection with Process Equipment

Figure 18:
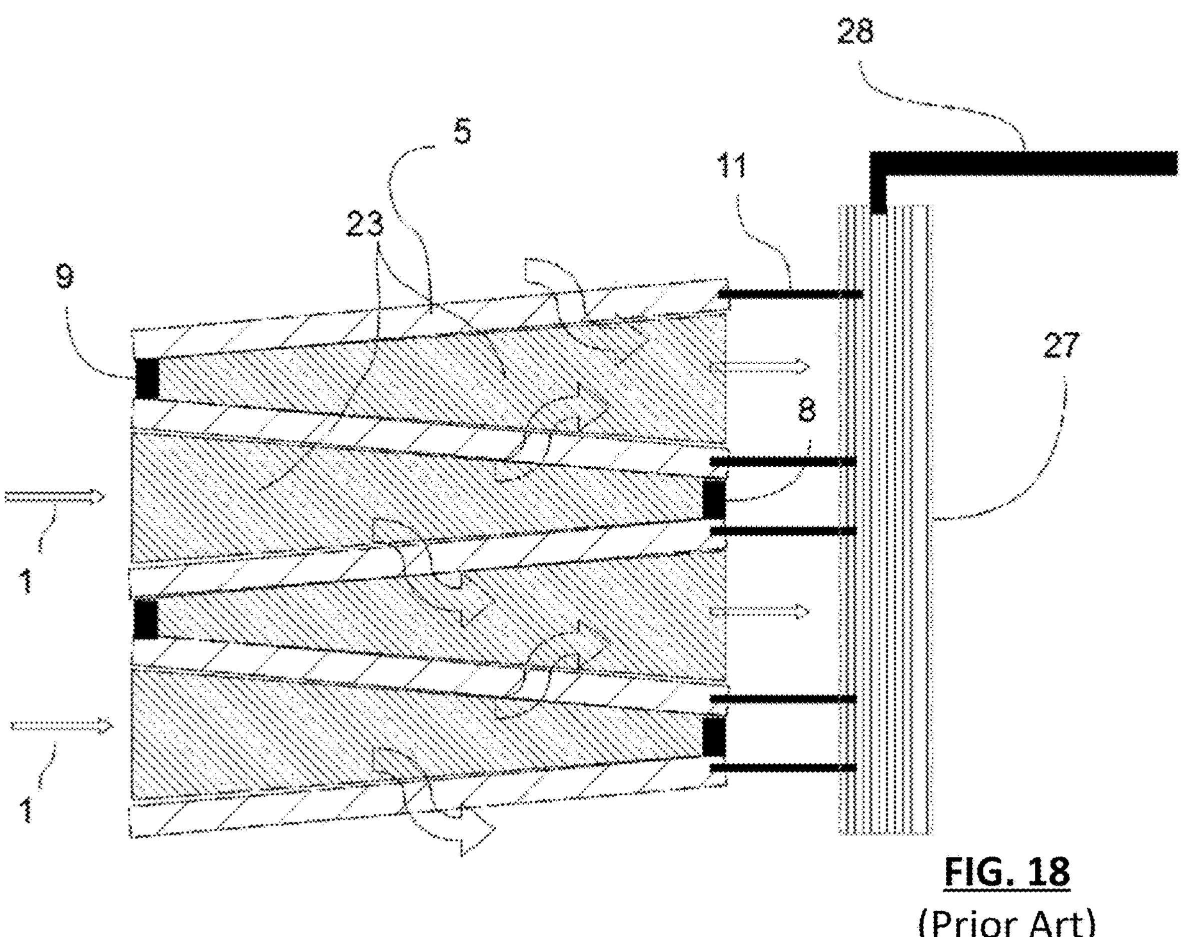
FIG. 18 (prior art) shows the integration of the heat transfer fluid distributor at the return line into the 'zig-zag' stack as found in the '039 Climeworks publication.

The stack is to be connected with a heat transfer fluid system. This is accomplished with a heat transfer fluid distributor which engages into the primary heat transfer structure at each frame as shown in FIG. 18 of the '039 Climeworks publication. By using a heat transfer fluid distributor with a larger flow cross section than the flow cross section of the primary heat transfer structure, the frames are set hydraulically in parallel and therefore see the same inlet temperatures and heat transfer fluid flow rates, which assures homogenous heating and cooling behavior. Because the heat transfer fluid distributor must engage with the free ends of the tubing of the primary heat transfer structure, the vertical position of individual frames must be well controlled. This is supported by using double sided tape with tight thickness tolerances for bonding frame components as was described in Example 7 of the '039 Climeworks publication. The heat transfer fluid distributor is made of aluminum in order to avoid corrosion when combined with the aluminum primary heat transfer structure. The heat transfer fluid supply line of the frame inlet distributor is placed at the lowest point and, the heat transfer fluid return line of the frame outlet distributor is placed at the highest point. In this fashion the system can be effectively purged of air.

Example 11. Thermal Mass of Frames Using Fin and Tube Heat Transfer Structure in a DAC Application The thermal masses of a possible fin and tube heat transfer structure in a frame are determined for a 20 mm thick sorbent material layer. This is compared with a conventional frame construction with 10 mm sorbent material layer thickness. As a reference the mass and thermal mass of a 10 mm frame with planar expanded aluminum metal heat transfer structure according to the current design is calculated in the following table:

| Frame component | Mass (kg) | Material | Specific Thermal Mass (kJ/K/kg Sorbent |
|---|---|---|---|
| C Profiles & Struts | 0.37 | Aluminum (Profiles) | 0.046 |
| Wedge spacers and sealing strips | 0.158 | Ultramide (PA) | 0.037 |
| Primary HEX | 1.07 | Aluminum (Tubing) | 0.132 |
| Secondary HEX (fins) | 1.31 | Aluminum (Expanded metal) | 0.162 |
| Frame Mass | 2.908 | | 0.377 |
| Sorbent mass | 7.25 | | |
| Ratio (kg Frame/kg Sorbent) | 0.411 | | |

A 20 mm frame with fin secondary heat transfer structure will have a doubled mass for the frame C profiles due to the doubled height. The wedge spacers 23, 26 and sealing strips 9, 8 remain the same (although their overall quantity in the stack is reduced), the primary heat exchanger structure retains the same mass as the length and diameter of the tube 11 are retained. The secondary heat transfer structure sees the main change. The results are shown in the following table for a frame with a 20 mm thick sorbent material layer with 14.1 kg sorbent material.

The following assumptions are made:

Frame width=1.5 m with 1 mm profile thickness

Frame length=1.0 m with 1 mm profile thickness

Primary HEX volume (as in a 10 mm sorbent layer) =3.964e-4 $m^3$

Secondary HEX 100 fins with 10 mm spacing aligned with 1.5 m edge, 20 mm high, 0.5 mm thick with 50% of surface area perforated=7.5e-4 $m^3$ Mass secondary HEX=7.5e-4 $m^3$×2700 kg/$m^3$=2.025 kg Total volume for sorbent in frame=0.0282 $m^3$ Sorbent material mass=sorbent density (500 kg/$m^3$)*total volume=14.1 kg

| Frame component | Mass (kg) | Material | Specific Thermal Mass (kJ/K/kg Sorbent) |
|---|---|---|---|
| C Profiles & Struts | 0.74 | Aluminum (Profiles) | 0.047 |
| Wedge spacers and sealing strips | 0.158 | Ultramide (PA) | 0.019 |
| Primary HEX | 1.07 | Aluminum (Tubing) | 0.068 |
| Secondary HEX (fins) | 2.025 | Aluminum (Expanded metal) | 0.129 |
| Frame Mass | 3.993 | | 0.263 |
| Sorbent mass | 14.1 | | |
| Ratio (kg Frame/kg Sorbent) | 0.283 | | |

It is seen through this example that a fin and tube heat transfer structure which allows an increase in the sorbent material layer to 20 mm lowers the thermal mass per unit sorbent material of each frame by 30%. The gain is mainly seen because the primary heat transfer structure and the wedge spacers and sealing strips do not scale with the sorbent material layer thickness.

External Support Configurations

FIG. 1A shows a sorbent article 101 as shown from the above, which incorporates a plurality of external support structures 100 disposed side-by-side with respect to each other. Each external support structure 100 encloses therein a sorbent material layer 5 to form a module (sorbent article module) to be implemented in the sorbent article 101. The external support structure 100 is configured such that it has sufficient rigidity to contain and support the particles which may form the sorbent material layer 5 as well as to define the shape and configuration of the layer 5, as well as to maintain the integrity of the layer 5, without relying on an internal support component such as the internal supporting frame component 7 as shown in FIG. 1.

Figure 2A:
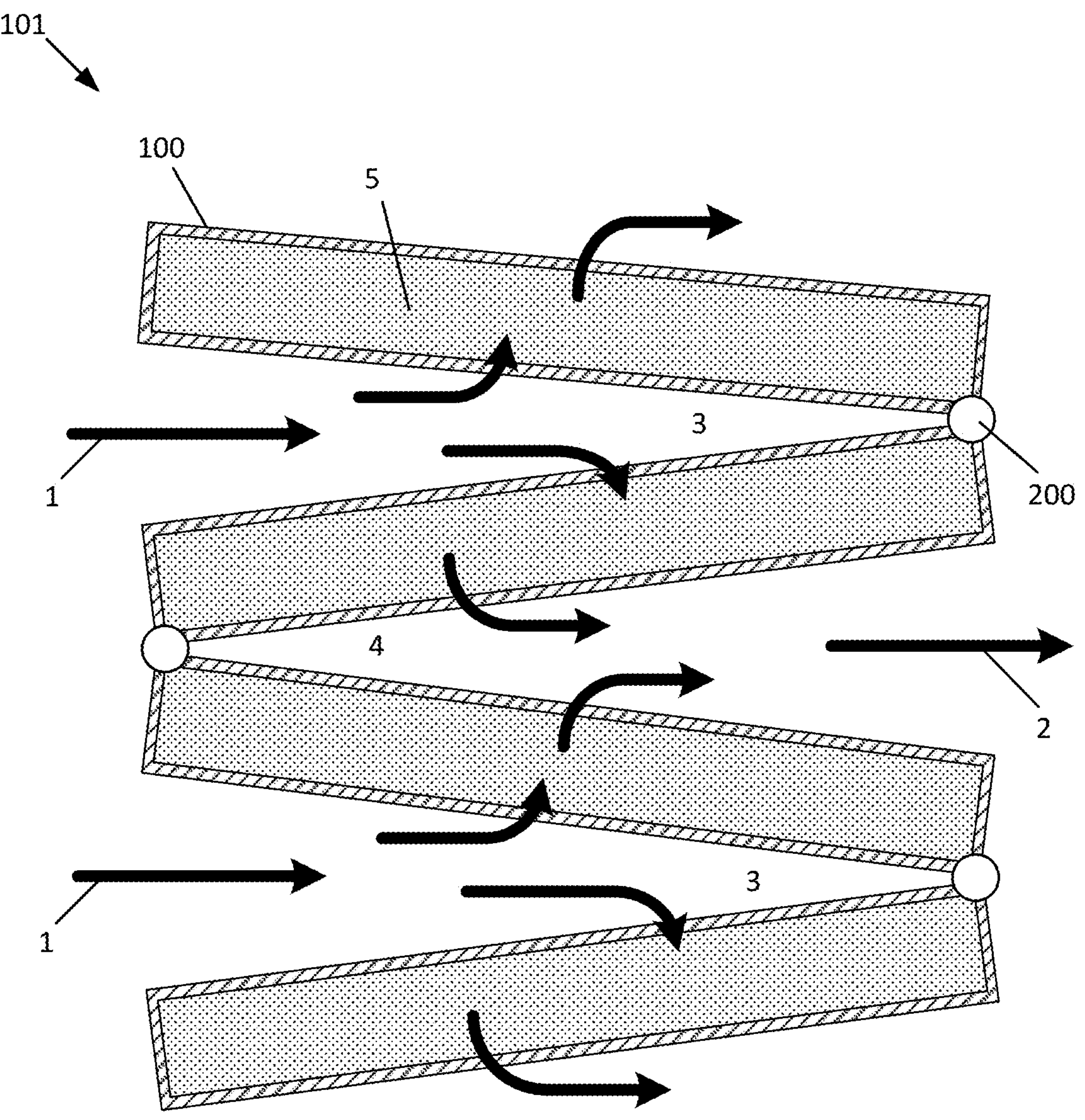
FIG. 2A shows a cross section of the embodiment according to FIG. 1A in which the layers of particulate sorbent material are arranged in a "zigzag" configuration.
Figure 3:
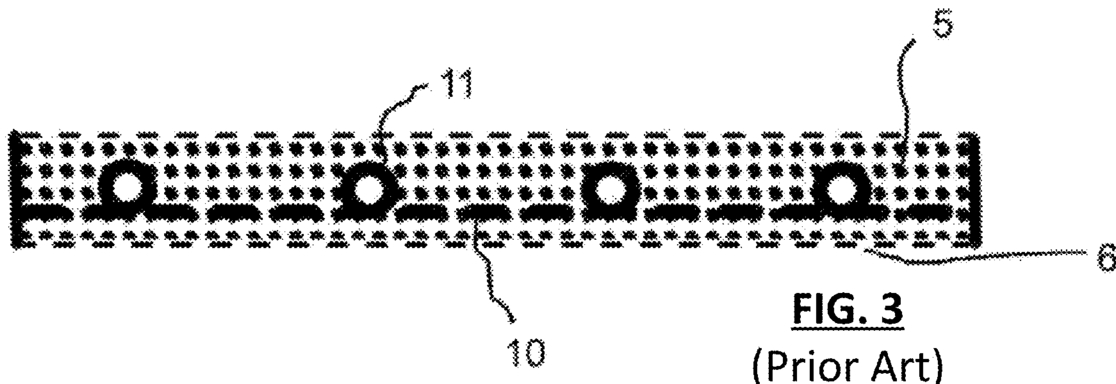
FIG. 3 (prior art) shows a cross section of a heat transfer structure placed within the sorbent material layer connected to tubing that can be flown through by a heat transfer fluid as found in the '039 Climeworks publication.
Figure 4:
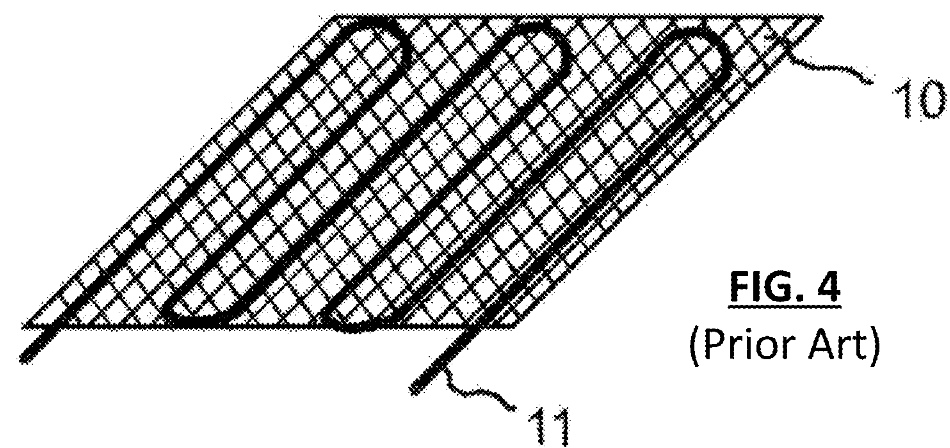
FIG. 4 (prior art) shows a 3-D view of one embodiment of a heat transfer structure in the form of a sheet of expanded metal connected to tubing that can be flown through by a heat transfer fluid as found in the '039 Climeworks publication.

FIG. 2A illustrates the plurality of external support structures 100 as seen from the top of the sorbent article 101. The external support structures 100 are connected to each other via connection sites or components 200 to flexibly change the separation of each external support structure 100 with respect to the adjacent external support structure 100.

FIG. 6A shows the sorbent article 101 where the plurality of external support structures 100 are positioned side-by-side with respect to each other, instead of being stacked on top of each other as shown in FIG. 6. The connection components 200 (for example means of attachment or affixing the external support structures 100 together) maintain the external support structures 100 in a zigzag or V-shaped configuration, with each external support structure 100 positioned vertically to receive airflow as shown in FIG. 2A. Also shown is a header member 600 which may be provided so that the external support structures 100 are supportably and sealably interconnected to the header member 600 to facilitate handling of the sorbent article 101 as a single unit, for example during installation and/or replacement of the sorbent article 101 or any component thereof.

Figure 22:
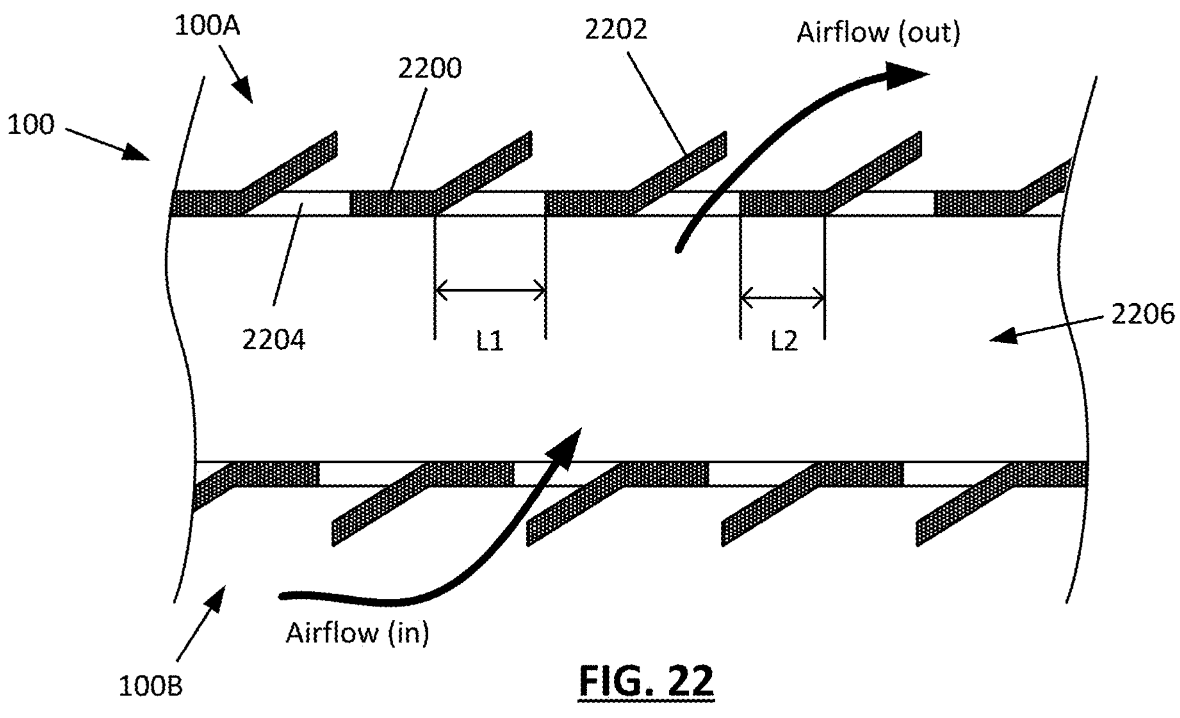
FIG. 22 shows a cross-sectional view of a sorbent article with an external support structure according to examples disclosed herein.

FIG. 22 shows an example of a portion of the external support structure 100. In this example, each external support structure has a first portion 100A and a second portion 1001B which opposes the first portion 100A. Each of these portions 100A, 1001B may be structured similarly with each other or differently from each other, as further explained below. Each portion 100A, 1001B includes a plurality of base portions 2200, deflected portions 2202, and openings 2204 formed between a base portion 2200 and a deflected portion 2202. These portions 100A, 100B define an internal volume 2206 therebetween in which the particles forming the sorbent material layer 5 are housed or enclosed. The openings 2204 have a length L1 while the base portions 2200 have a length L2. L1 may be defined as the distance between two adjacent base portions 2200, and L2 may be defined as the distance between two adjacent openings 2204. The deflected portions 2202 control the direction of airflow into and out of the inner volume 2206, as shown by the two bold arrows.

In some examples, the lengths L1 and L2 are not identical throughout the external support structure 100 and may vary between various base portions 2200 and deflected portions 2202. For example, the deflected portions 2202 may be designed to gather more air (larger openings and greater angle of deflection) at locations of the external support structure 100 which may be receiving less airflow. In some examples, other variables may include the size of openings 2204, the spacing between deflected portions 2202, the number of deflected portions 2202 being formed, the angle of deflection in the deflected portions 2202 with respect to the base portions 2200, etc., and each of these variables may be controlled to increase or decrease airflow, change the directionality of airflow, and/or otherwise control the flow into and out of the external support structure 100 as suitable.

Figure 23A:
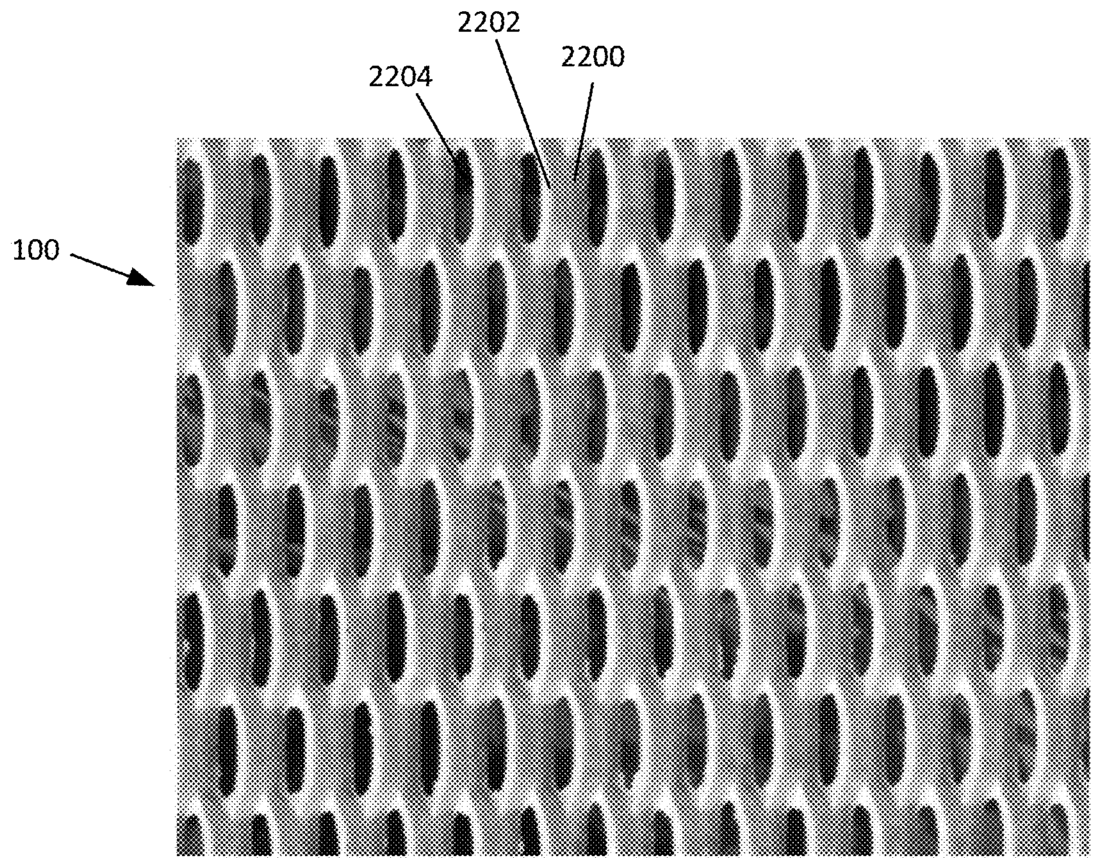
FIGS. 23A through 23C show different examples of the external support structure according to examples disclosed herein (the photographic images are to scale)
Figures 23B, 23C:
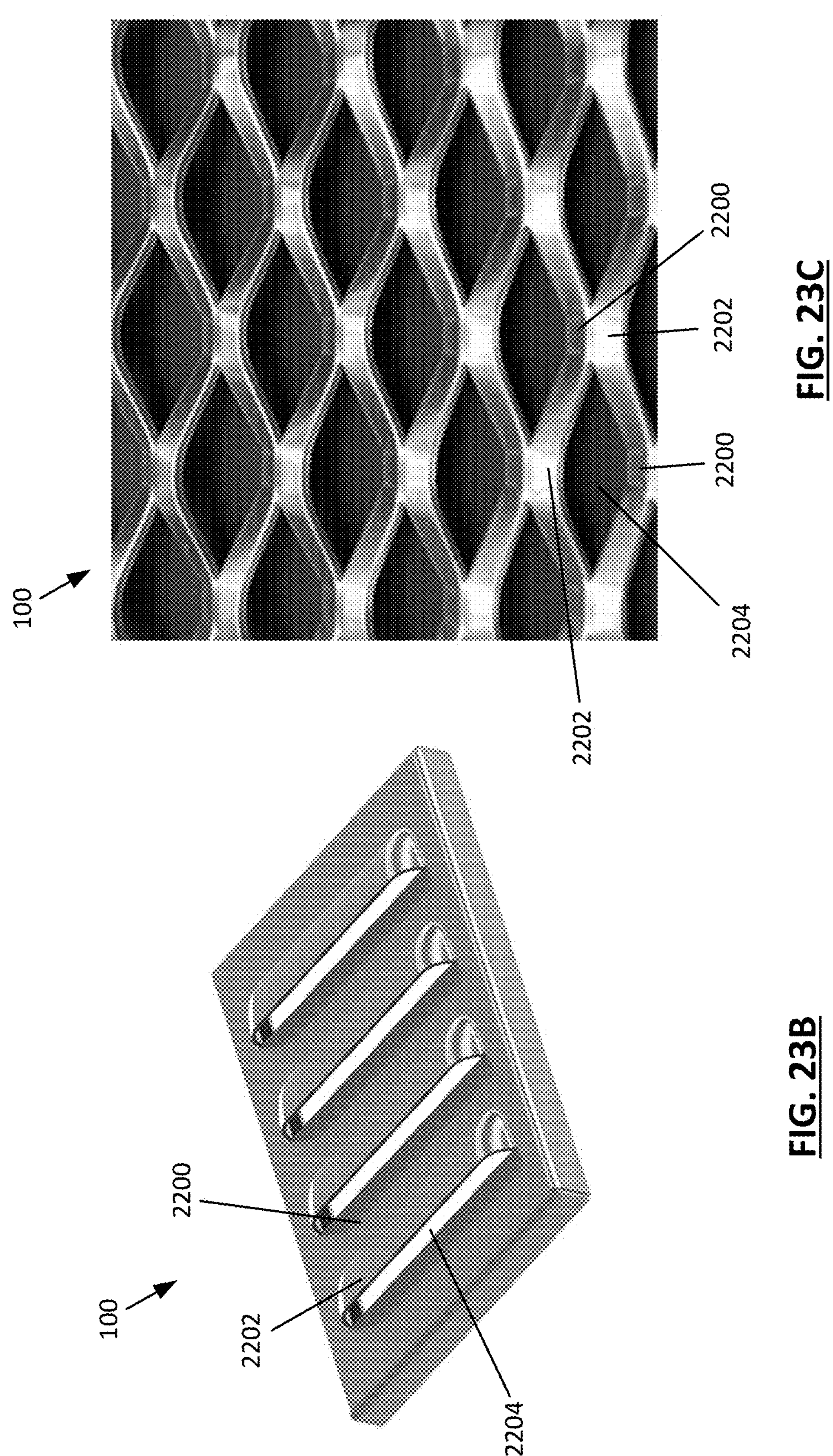

FIGS. 23A through 23C show different configurations of the external support structure 100, or more specifically a single portion (100A or 1001B) of the support structure. For example, FIG. 23A shows the external support structure 100 in a "cheese grate" design where a continuous sheet of rigid material (forming the base portion 2200) such as a polymer composite, metal, or plastic (as well as any other suitable material as known in the art) where openings 2204 are formed by puncturing the surface of the sheet or base portion 2200, and portions of the sheet are permanently deformed so as to be deflected or raised with respect to the base portion 2200 to form the deflected portions 2202.

In FIG. 23B, the external support structure 100 is shown in a "louver" design that is defined as a continuous sheet of rigid material forming the base portion 2200 in which a plurality of slits are cut in parallel such that portions of the base portion 2200 proximal to the slits are permanently deformed so as to be deflected or raised with respect to the base portion 2200 to form the deflected portions 2202.

In FIG. 23C, the external support structure 100 is shown in a "fishnet" design that is defined as a continuous sheet of rigid material forming the base portion 2200 in which a plurality of slits are formed in a parallel arrangement, after which the two opposing ends of the sheet are pulled apart via a tensile load from an external source. The tensile force causes the deflected portions 2202 to buckle out of the plane originally defining the sheet such that a plurality of openings are formed between each deflected portion 2202 and an adjacent base portion 2200 from which the deflected portion 2202 departed in response to the application of the tensile force to the sheet.

Figures 24A, 24B, 24C, 24D:
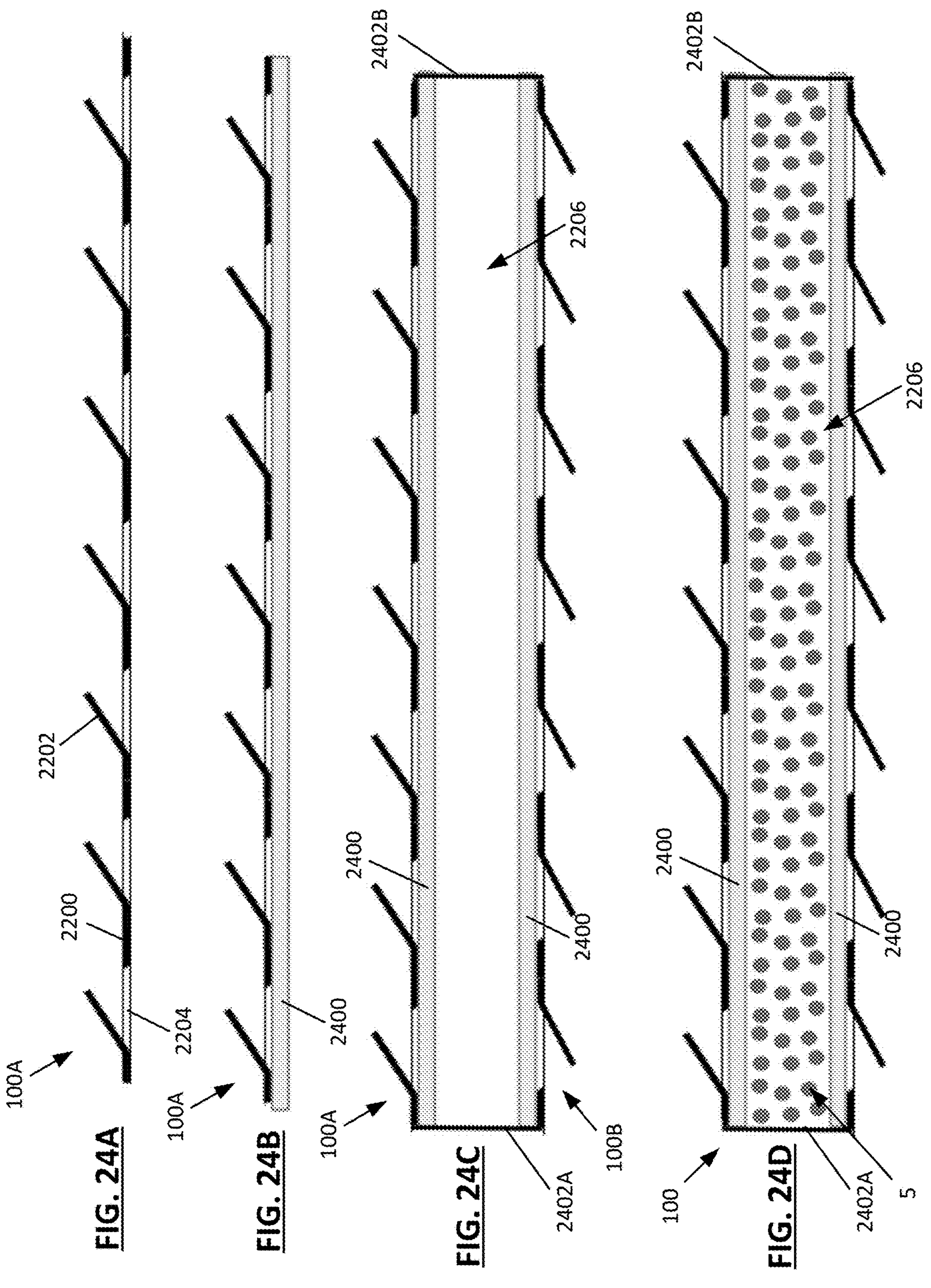
FIGS. 24A through 24D show a process of assembling a sorbent article with an external support structure according to examples disclosed herein.

FIGS. 24A through 24D show a process of assembling or forming the external support structure 100 according to examples disclosed herein. FIG. 24A shows an initial state of a first portion 100A which may be formed from a single continuous sheet of rigid material as explained above, after the deflected portions 2202 and the openings 2204 are formed with respect to the base portion 2200. In FIG. 24B, a layer of porous laminate material 2400 is disposed at an inner surface (that is, the surface that would be facing the internal volume 2206 when the external support structure 100 is fully assembled) of the base portion 2200 to cover the entire inner surface of the base portion 2200. The porous laminate material may be a flexible porous material and may be gas permeable but impermeable to the loose particulate sorbent material of the sorbent material layer 5 and formed using any suitable porous polymer including but not limited to expanded polyethylene (ePE) and expanded polytetrafluoroethylene (ePTFE), for example.

In FIG. 24C, the first portion 100A and the second portion 100B (which went through a similar process as the first portion 100A in FIGS. 24A and 24B) are positioned with respect to each other such that the porous laminate material layer 2400 of each portion faces the porous laminate material layer 2400 of the other portion in a mirroring (but reversed) alignment. It is to be understood that, although the first and second portions 100A, 100B have identical structures in the example as shown, differing structures or combinations of structures may be used for these portions in other examples. Once the first portion 100A and the second portion 100B are properly aligned, the two opposing ends of these portions are coupled together using endcaps 2402. Although only two endcaps 2402A and 2402B are illustrated, additional endcaps may also be implemented, as suitable, to create a container which defines the inner volume 2206 of the external support structure 100. The endcaps 2402 are removable to allow filling of the sorbent particles which form the sorbent material layer 5, enclosed within the endcaps 2402 and the porous laminate material layers 2400 as shown in FIG. 24D. The pores of the porous laminate material layers 2400 are smaller than the size of the sorbent particles to retain such particles within the inner volume 2206 but also capable of simultaneously allowing airflow passing into the openings 2204 of the second portion 100B of the external support structure 100 and out of the openings 2204 of the first portion 100A (for example, as shown in FIG. 22). The removable endcaps 2402 also allow emptying and refilling the sorbent particles of the sorbent material layer 5. In this configuration, there are no internal structures to impede the emptying and refilling processes.

Figure 25:
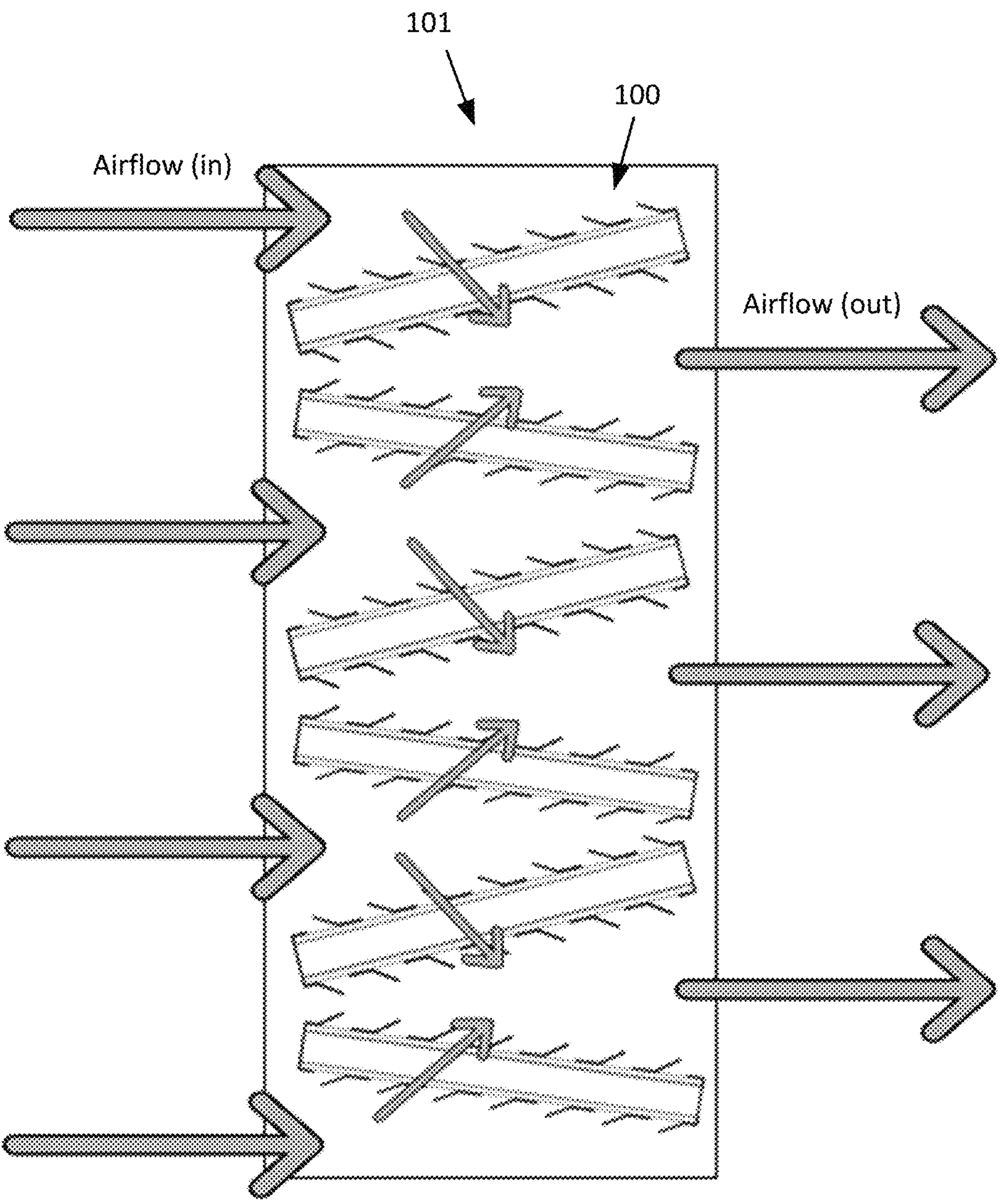
FIG. 25 shows a cross-sectional view of a sorbent article with an external support structure arranged in a "zigzag" configuration according to examples disclosed herein.

FIG. 25 illustrates the external support structures 100 as seen from the top of the sorbent article 101. The airflows (in and out) through the sorbent article 101 (and also through the individual external support structures 100) are shown, such that the airflows are controlled by the angle and shape of the deflected portions 2202 as explained above.

Figure 26:
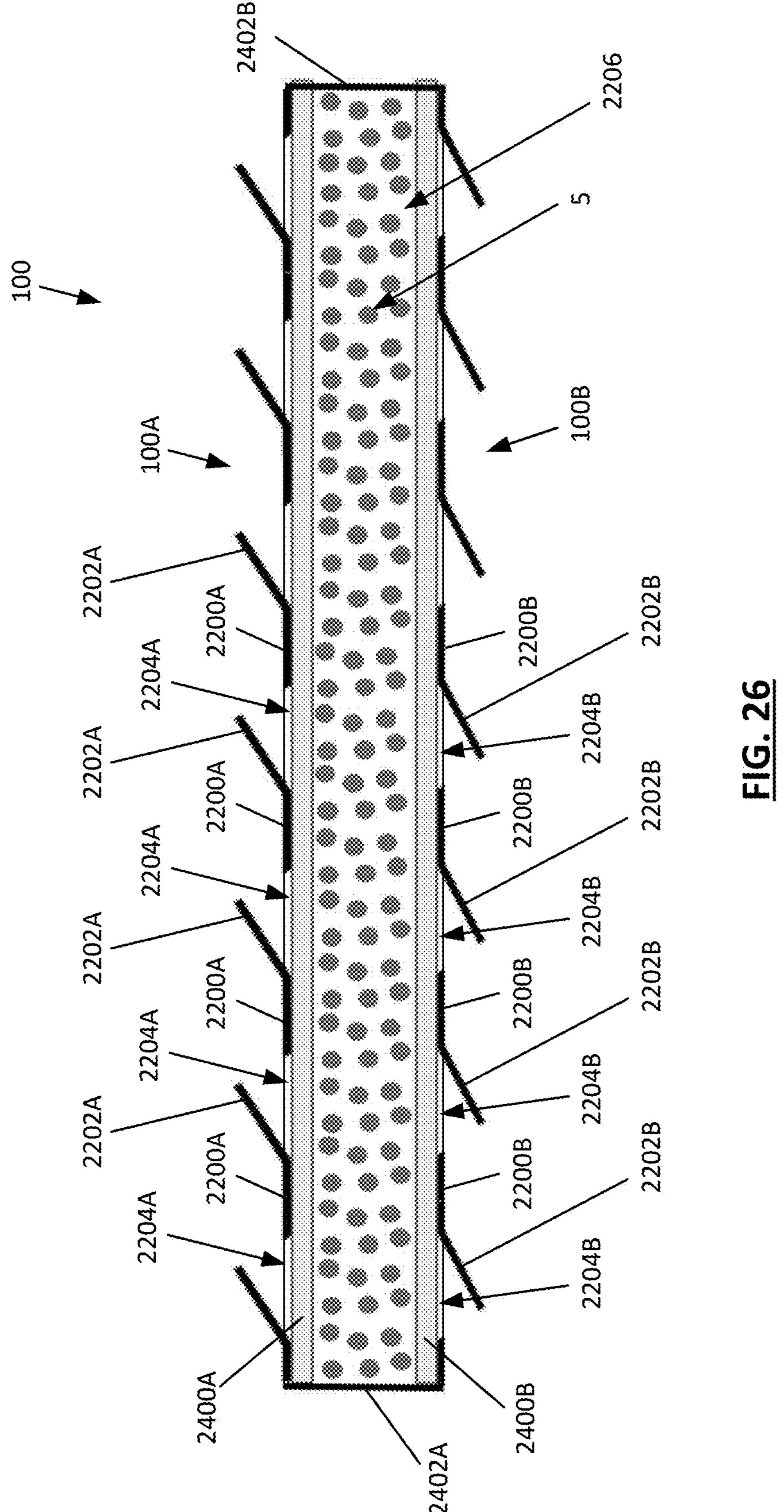
FIG. 26 shows a cross-sectional view of a sorbent article with an external support structure having a plurality of external support components attached to a porous fabric layer according to examples disclosed herein.

FIG. 26 shows an example of the external support structure 100 including a first portion 100A and a second portion 1001B. The first portion 100A includes a plurality of base portions 2200A. The base portions 2200A are either made from a single continuous sheet of material or made from multiple separate components that are attached or affixed to each other to form the first portion 100A of the external support structure 100. The first portion 100A also includes a first porous laminate material layer 2400A attached thereto. The second portion 1001B includes a plurality of base portions 2200B. The base portions 2200B are either made from a single continuous sheet of material or made from multiple separate components that are attached or affixed to each other to form the second portion 1001B of the external support structure 100. The second portion 1001B also includes a second porous laminate material layer 2400B attached thereto. The particles forming the sorbent material layer 5 may be housed between the first portion 100A and the second portion 1001B, within the internal volume 2206 defined by the porous laminate material layers 2400A, 2400B and the endcaps 2402A, 2402B.

Figures 27A, 27B:
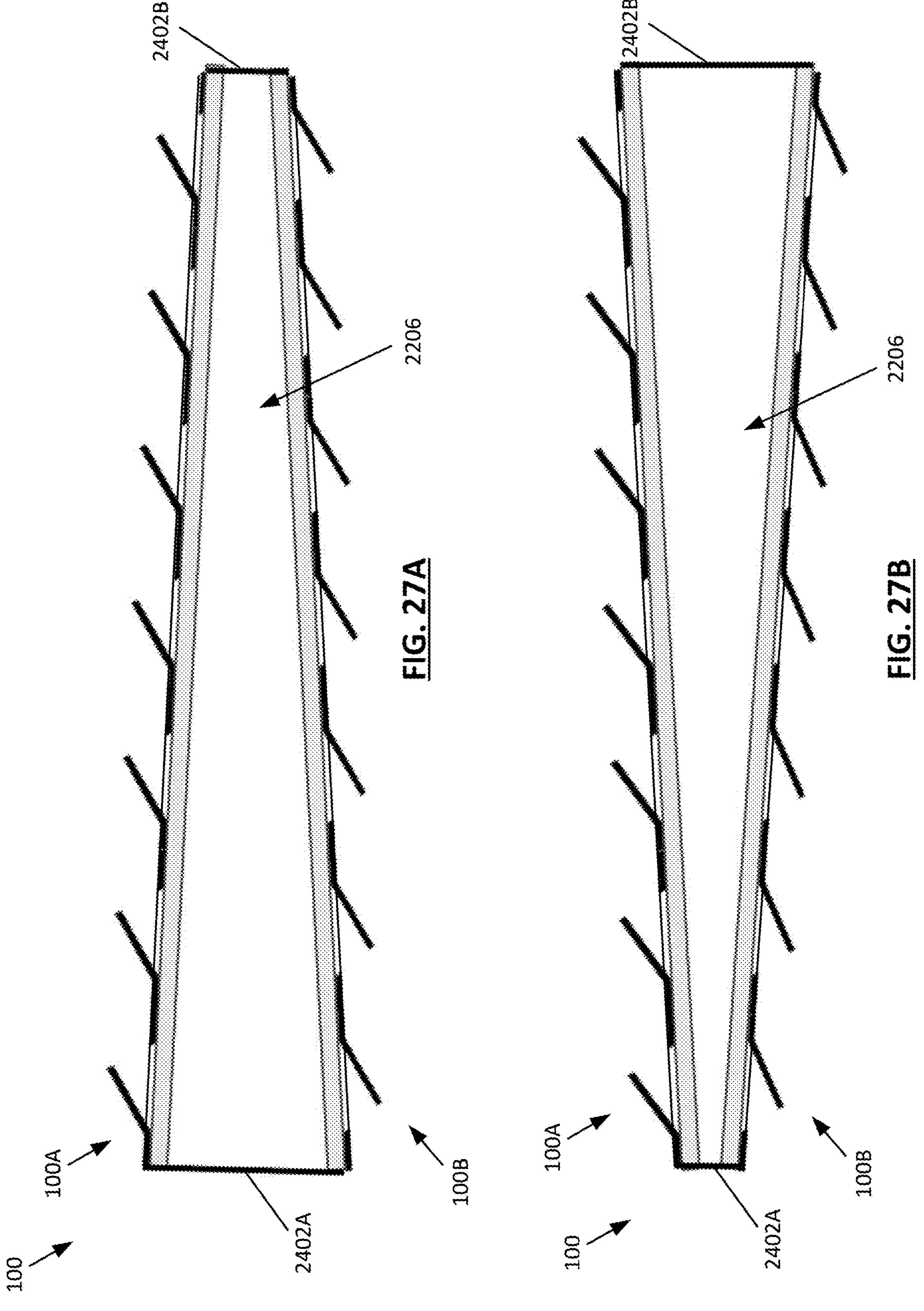
FIGS. 27A and 27B show cross-sectional views of an external support structure having a varying internal thickness of sorbent article according to examples disclosed herein.

FIGS. 27A and 27B show examples of the external support structure 100 when the endcaps 2402A, 2402B have different lengths. For example, in FIG. 27A, the endcap 2402A is longer in length than the endcap 2402B, and in FIG. 27B, the endcap 2402A is shorter in length than the endcap 2402B, both defining a trapezoidal cross-section for the internal volume 2206.

Figure 28A:
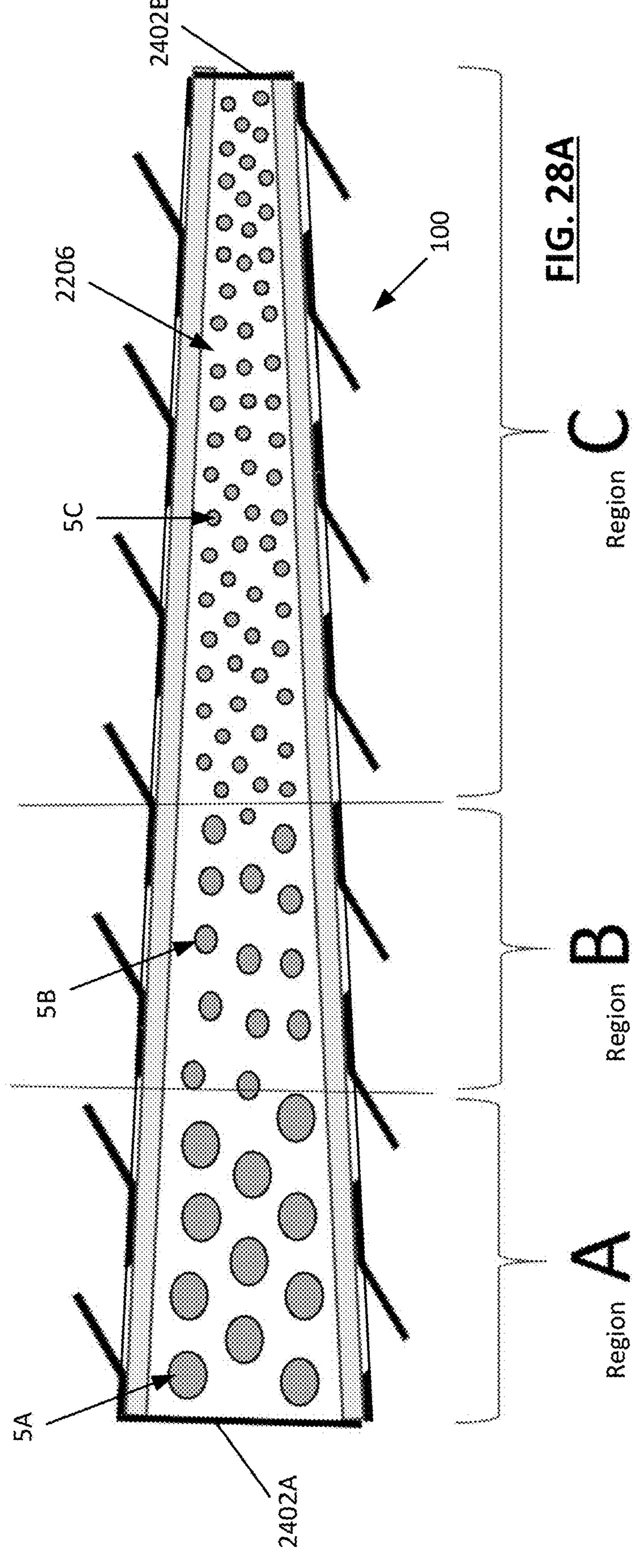
FIGS. 28A and 28B show cross-sectional views of a sorbent article with regions with sorbent particles of varying sizes according to examples disclosed herein.
Figure 28B:
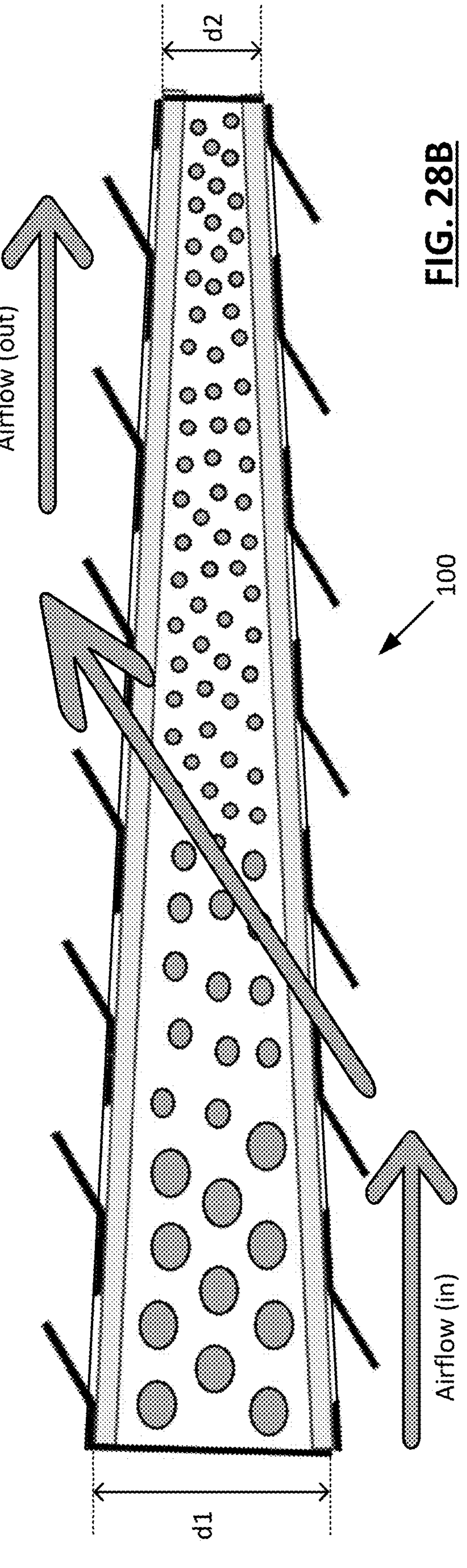

FIGS. 28A and 28B show an example of how the particles forming the sorbent material layer 5 may vary depending on the region in which they are located inside the internal volume 2206 of the external support structure 100. As such, the loose particulate sorbent material may include at least a first set of particulate with a first size and a second set of particulate with a second size smaller than the first size, and in some examples, a third set of particulate with a third size smaller than the second size. Specifically, the example shows three different sizes for the particles, with particles 5A (first set) being the largest in size, particles 5B (second set) being smaller than particles 5A, and particles 5C (third set) being smaller than particles 5A and 5B. The particles 5A occupy region A, the particles 5B occupy region B, and the particles 5C occupy region C within the internal volume 2206, and region A is located proximal to the longer endcap 2402A while region C is located proximal to the shorter endcap 2402B, with region B located therebetween.

Beneficially, the different sizes of the sorbent particles allows for a more flexible control of the airflow through the internal volume 2206. For example, region A with larger-sized particles 5A allows for a smaller change in pressure (AP) as the airflow passes from one side of the external support structure 100 to the other side, i.e. between the airflow (in) and airflow (out) as shown in FIG. 28B. The flow path is also longer within region A due to the larger cross-sectional thickness “d1” of the sorbent material layer 5 within region A, but the larger particle size and lower density facilitate reducing the flow resistance therein. For example, region C has the thinnest cross-sectional thickness “d2” of the sorbent material layer 5, which allows for smaller particles to be included to facilitate higher packing density of particles therein. The external support structure 100 may therefore taper from one end (with thickness d1) to the other end (with thickness d2), assuming a tapering configuration.

Although the geometry of the individual particles, the size of the individual particles, and the packing density of the particles may vary from one region to another, it is understood that these parameters can be controlled such that the flow characteristics through two or more regions can be relatively similar. Advantageously, forming such regions with different parameters allows for greater freedom and flexibility in the designs and properties of the sorbent material layer 5 and also facilitates proper engineering of each component within the sorbent article 101 to minimize “dead zones” or non-homogenous use of sorbent material. Using sorbent material homogenously allows for all the sorbent particles to degrade equally and consistently, making it easier to identify when to replace the sorbent article 101 without wasting still-usable sorbent particles when the entire sorbent article 101 is replaced.

Figure 29:
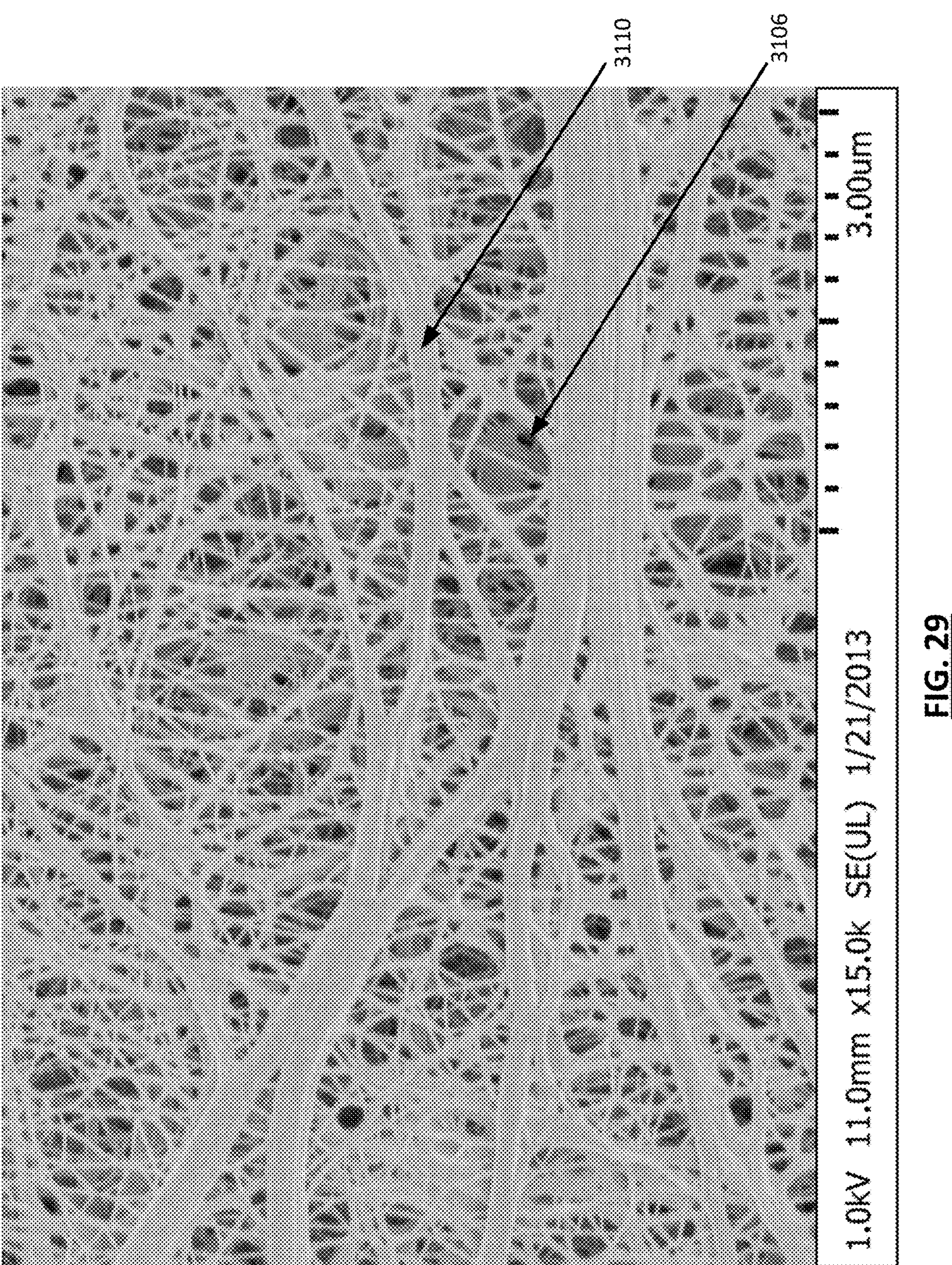
FIG. 29 is an SEM image of an expanded polyethylene (ePE) article implemented as a porous fabric layer according to examples disclosed herein (the image is to the scale noted in the figure)
Figure 30:
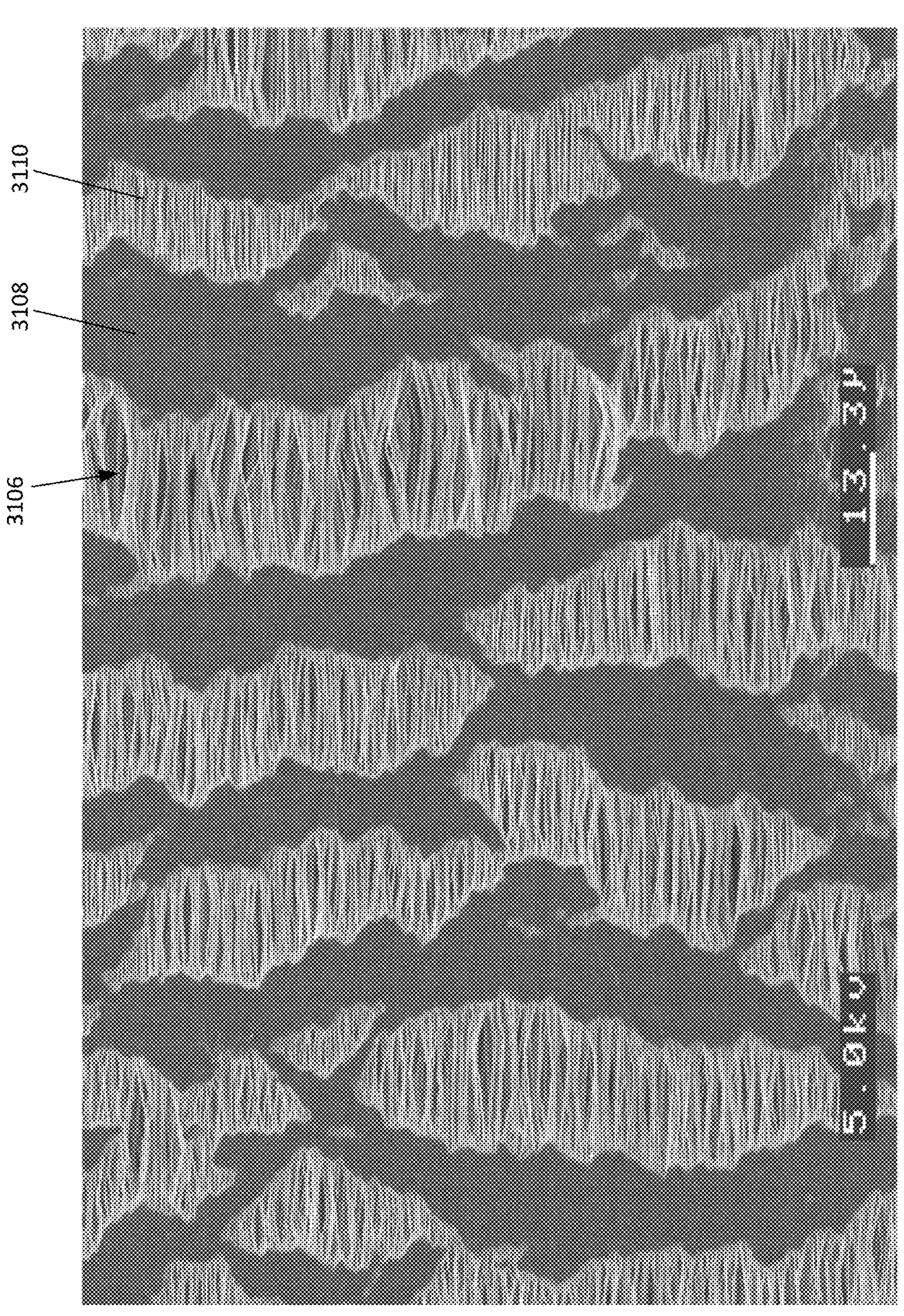
FIG. 30 is an SEM image of a top view of an expanded polytetrafluoroethylene (ePTFE) article implemented as a porous fabric layer according to examples disclosed herein (the image is to scale)

FIGS. 29 and 30 show SEM images of the structure of the porous laminate material layer 2400 according to some examples using different materials. Nodes 3108, fibrils 3110, and pores, openings, or spacings 3106, as further explained herein, are shown. FIG. 29 shows ePE as the material being used for the porous laminate material layer 2400. Displayed at the bottom of FIG. 29 is: “1.0 kV 11.0 mm×15.0 k SE(UL) Jan. 21, 2013,” and the distance between two subsequent lines as shown at the bottom right hand corner represents 3.00 μm. FIG. 30 shows ePTFE as the material being used for the porous laminate material layer 2400. In some examples, the material used for the porous laminate material layer 2400 is hydrophobic in order to prohibit liquid water from entering the internal volume 2206. In some examples, the material is also microporous with sufficiently small pore size(s) in order to facilitate air flow therethrough while retaining the sorbent particles forming the sorbent material layer 5 within the internal volume 2206. In some examples, the material is tolerant of repeated heating and cooling cycles and has sufficient durability (for example, more durable than the sorbent particles of the sorbent material layer 5) such that the porous laminate material layer 2400 requires replacement less frequently.

The sorbent article 101 as disclosed herein is more efficient than prior art design due to the modules (that is, the external support structures 100 containing therein loose particulate sorbent material for gas adsorption) being able to be refilled and not just discarded after a single use. The replaceability and reusability of the sorbent article 101 provides a more environmentally friendly design as well as improving cost efficiency on the long run. The freedom in design also allows for a complete and total use of all the loose particulate sorbent material in the sorbent article 101. Furthermore, using the current structure, thinner beds or panels of particulate sorbent material for gas adsorption can be fabricated with a thickness of less than about 5 mm, 4 mm, 3 mm, 2 mm, 1 mm, 0.5 mm, 0.3 mm, or any other suitable range or value therebetween. Implementing thinner sorbent material layers in the aforementioned ranges facilitates the reduction of pressure drop over the sorbent material layer. The lack of interior support in the exterior support structure 100 also facilitates easier filling and refilling of particulate sorbent material for gas adsorption therewithin, and differently sized particles may be layered inside the exterior support structure 100 when filling or refilling. Furthermore, the base portions 2200, deflected portions 2202, and openings 2204 can be adjusted or varied throughout the exterior support structure 100 for different purposes, including but not limited to: stiffening large panels, preventing large objects or animals from entering, and accounting for areas of high flow or low flow through or within the internal volume 2206 of the exterior support structure 100, for example.

FIGS. 31A, 31B, 32A, and 32B show cross-sectional views of a sorbent material layer 3100 (for example, to be used as the sorbent material layer 5) which includes a first side 3102 and a second side 3104 through which airflow may pass.

Figure 31A:
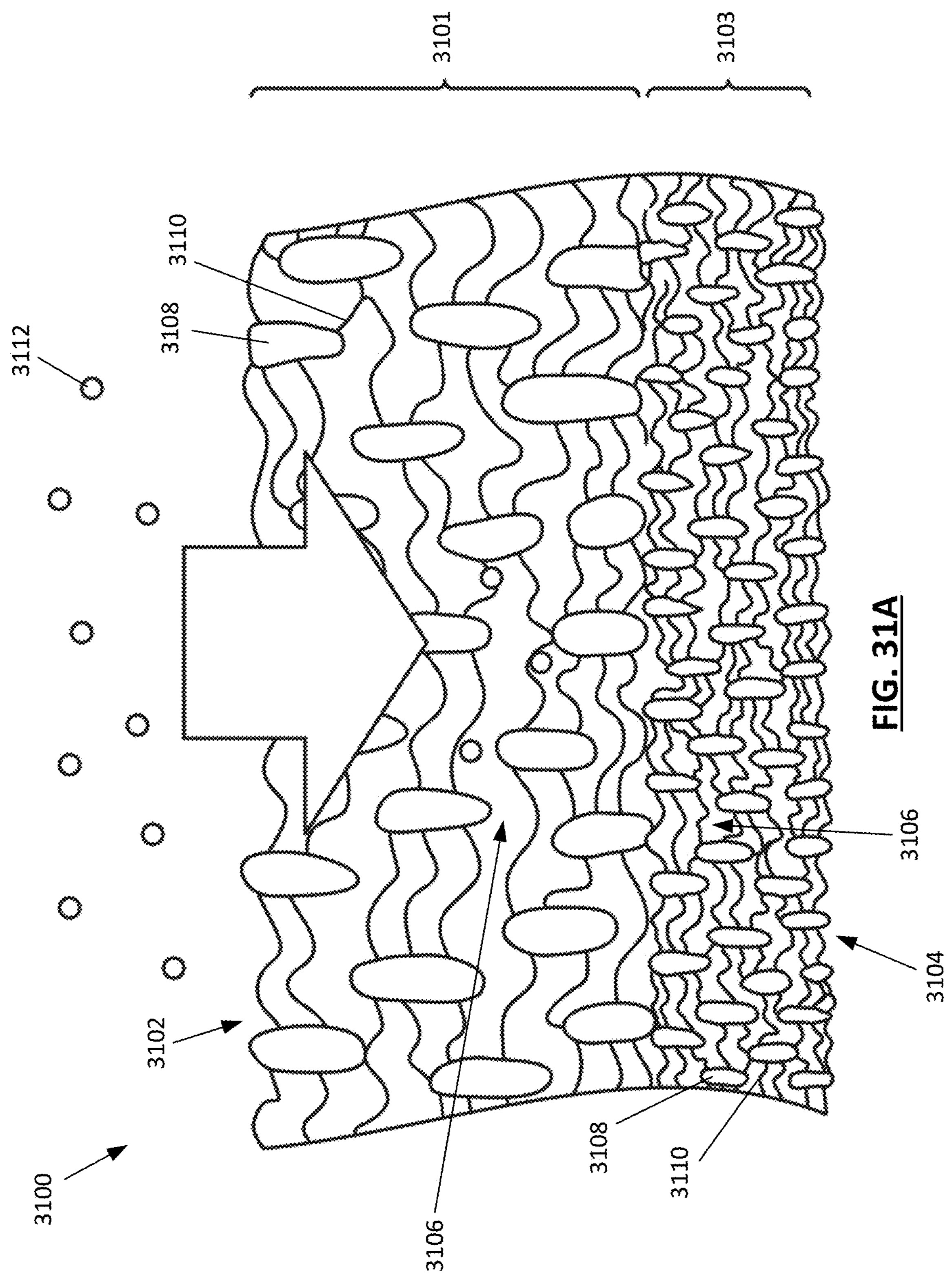
FIGS. 31A and 31B are cross-sectional diagrams of a sorbent material layer comprising a plurality of nodes and fibrils in an interwoven network.

In FIG. 31A, the sorbent material layer 3100 includes two portions: a first portion 3101 with larger pore sizes that defines the first side 3102 and a second portion 3103 with smaller pore sizes that defines the second side 3104. The two portions are adjacent each other such that the second side 3104 is more sealed with respect to the more open first side 3102. Each side has a plurality of pores, openings, or spacings 3106 into which foreign particles 3112 of certain sizes may enter (as shown by the white arrow) but are prevented from passing through to the other side. For example, particles whose passage through the layer is prevented may have a dimension greater than about 10 μm, greater than about 20 μm, greater than about 30 μm, greater than about 40 μm, greater than about 50 μm, or any other suitable range or value therebetween.

For example, in FIG. 31A, the shapes and sizes of the pores 3106 in each of the different portions 3101 and 3103 may be defined by a plurality of nodes 3108 and fibrils 3110 which may connect two or more nodes together, such that the nodes 3108 and fibrils 3110 prevent the foreign particles 3112 greater than a certain size from passing through the layer 3100. For example, the foreign particles 3112 entering the first portion 3101 may be prevented from entering the second portion 3103, thereby prevented from passing through the sorbent material layer 3100. The foreign particles 3112 may be trapped inside the pores 3106 of the first portion 3101 or released to the external environment through the first side 3102 from where they entered. The nodes 3108 and fibrils 3110 may be contained within the frame or external support structure 100 (not shown).

The nodes and fibrils as referred to herein may be parts of a non-woven microporous material having interconnected nodes and fibrils that operate together to prevent foreign particles of certain sizes from passing through the layer 3100, while still allowing airflow to pass therethrough. Preventing such particles from passing through preserves the purity of contained particles, as well as preventing sorbent particles from leaving through the layer of a packaging, preventing foreign particles from entering through the layer into the packaging, and maintaining purity even when the structure is bent and moved.

Figure 31B:
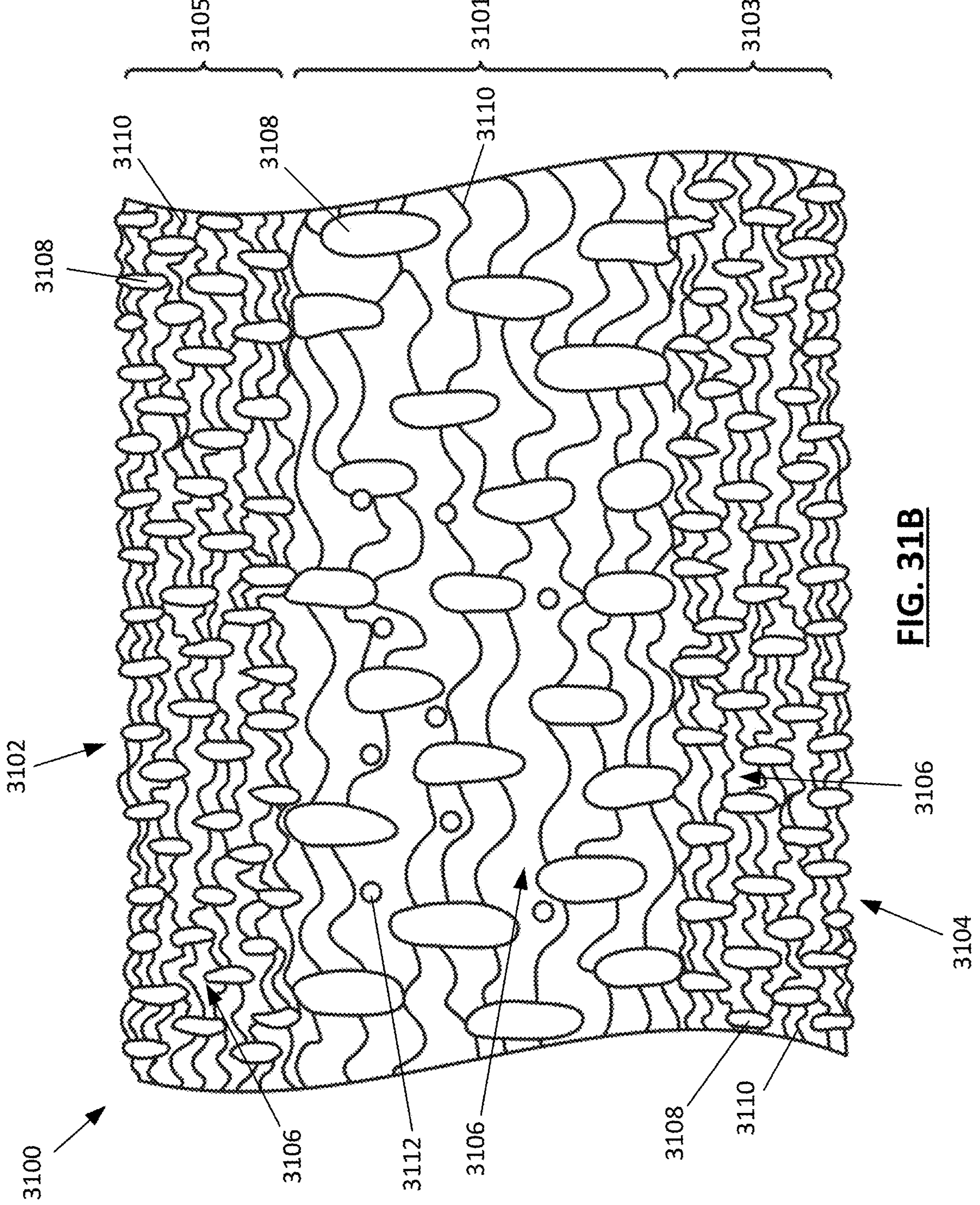

For example, in FIG. 31B, the sorbent material layer 3100 may be provided with an additional portion, a third portion 3105, which has smaller pore sizes than the first portion 3101, thereby sandwiching the first portion 3101 between two portions (3103 and 3105) having smaller pore sizes than the first portion 3101. The third portion 3105 also has pores, openings, or spacings 3106, as well as the nodes 3108 and fibrils 3110. In such configuration, the first side 3102 is defined by the third portion 3105, and the second side 3104 is defined by the second portion 3103, such that the foreign particles 3112 which may have entered the sorbent material layer 3100 from one side would be trapped and/or immobilized within the pores 3106 of the first portion 3101 and prevented from passing through to the other side.

In some examples, the particles entrapped within the pores 3106 of the first portion 3101 may be sorbent particles, in order to preserve the purity of contained sorbent particles as explained above. The sorbent particles may be provided into the pores 3106 of the first portion 3101, after which the second portion 3103 and the third portion 3105 are subsequently formed on the two opposing sides, trapping the particles therein. The sorbent particles may be provided in a dry particle form, entrained with a forced flow (e.g., in the direction shown by the white arrow of FIG. 31A) and introduced through the more open first side 3102 before becoming trapped against the more sealed, second side 3104 and between the nodes and the fibrils of the first portion 3101 of the sorbent material layer 3100, thereby retaining the sorbent material within the pores 3106 of the first portion 3101.

Figures 32A, 32B:
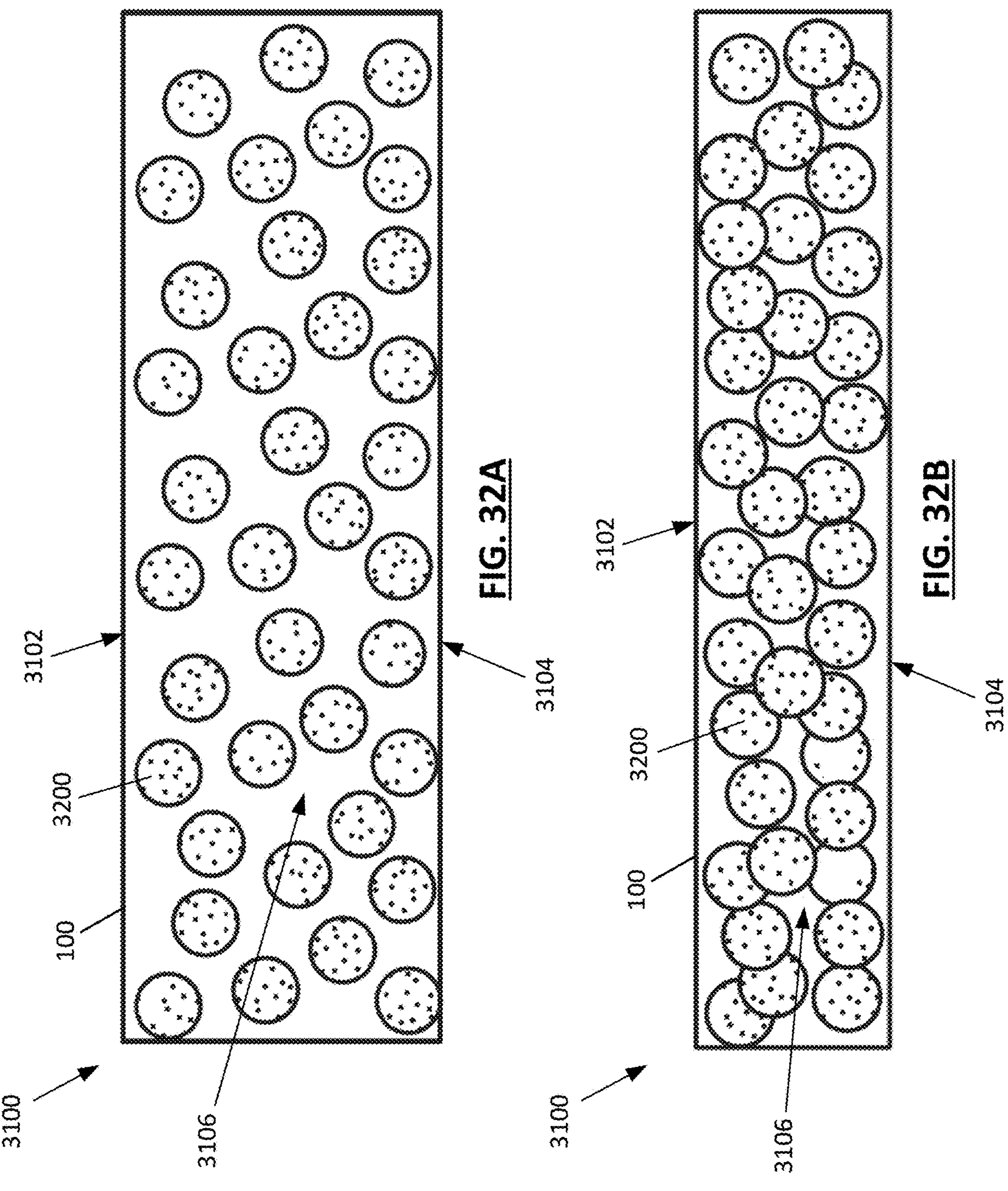
FIGS. 32A and 32B are cross-sectional diagrams of a sorbent material layer comprising a plurality of individual sorbent particles in a tightly packed bed.

For example, in FIGS. 32A and 32B, the shapes and sizes of the pores 3106 may be defined by a plurality of individual particles 3200 of a sorbent material. The sorbent particles 3200 may be contained within the frame or external support structure 100 in order to maintain a packed bed, where the particles 3200 are tightly packed in order to prevent foreign particles (not shown) from passing through the layer 3100, while still allowing airflow to pass therethrough. The frame 100 may be compressible to form a more compressed packed bed as shown in FIG. 32B as compared to a less compressed (or more expanded) packed bed as shown in FIG. 32A. A more compressed or compacted packed bed may result in a lower void fraction (defining the pores 3106 therein) than a less compressed or compacted (or more expanded) packed bed, as well as a lowered accessibility for the gases. A void fraction is a relative ratio of a volume of void space of a region to an entire volume of said region. As a result, the initial kinetics of the gas adsorbing to the sorbent material layer 3100 may be faster due to the shorter diffusion distance in FIG. 32B as compared to FIG. 32A, but the time for equilibrium of $CO_2$ adsorption in the sorbent material layer 3100 of FIG. 32B will increase relative to that of FIG. 32A.

Figure 33:
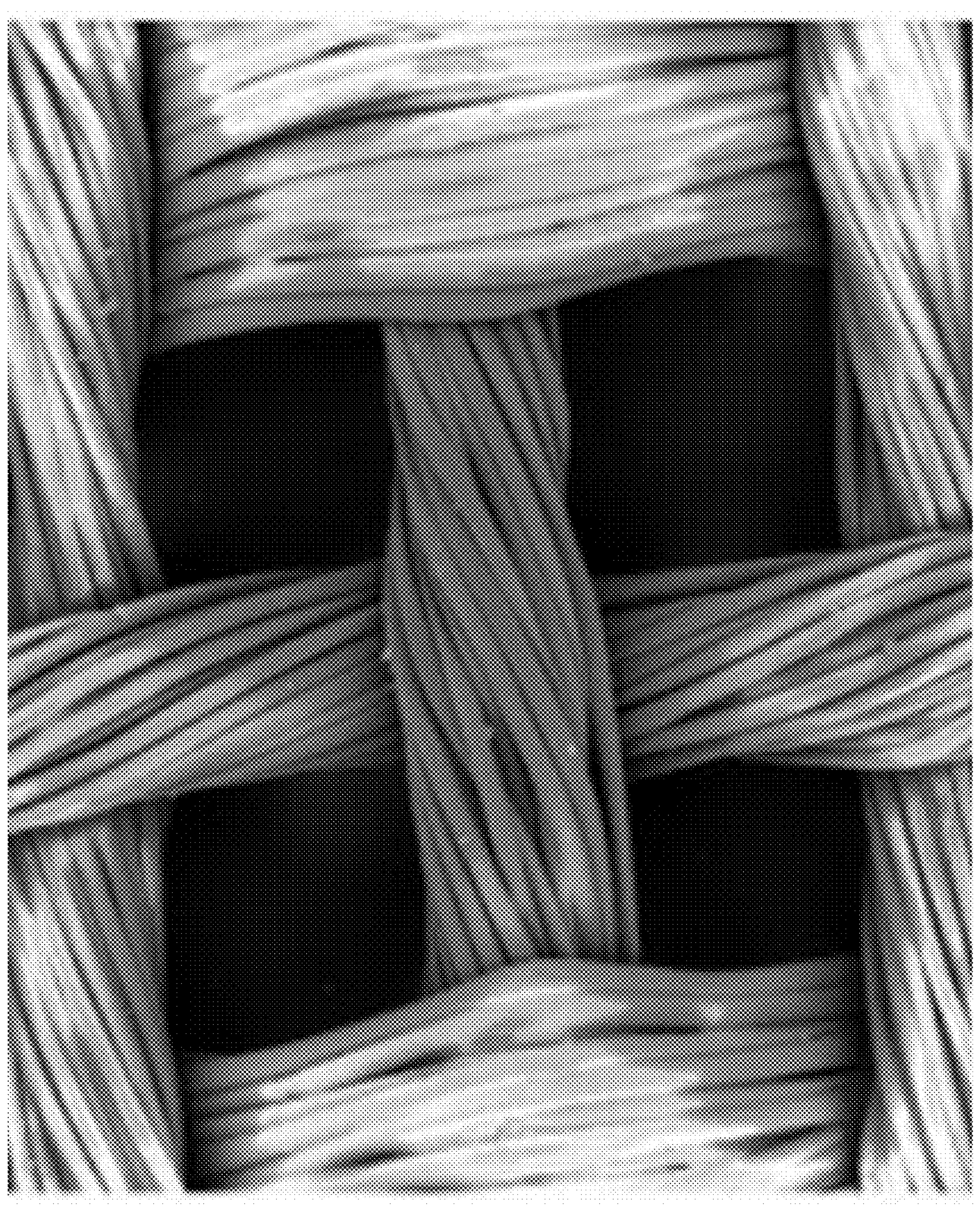
FIG. 33 is an SEM image of a top view of a woven fabric with openings formed between each "thread" of fabric (the image is to scale)
Figure 34:
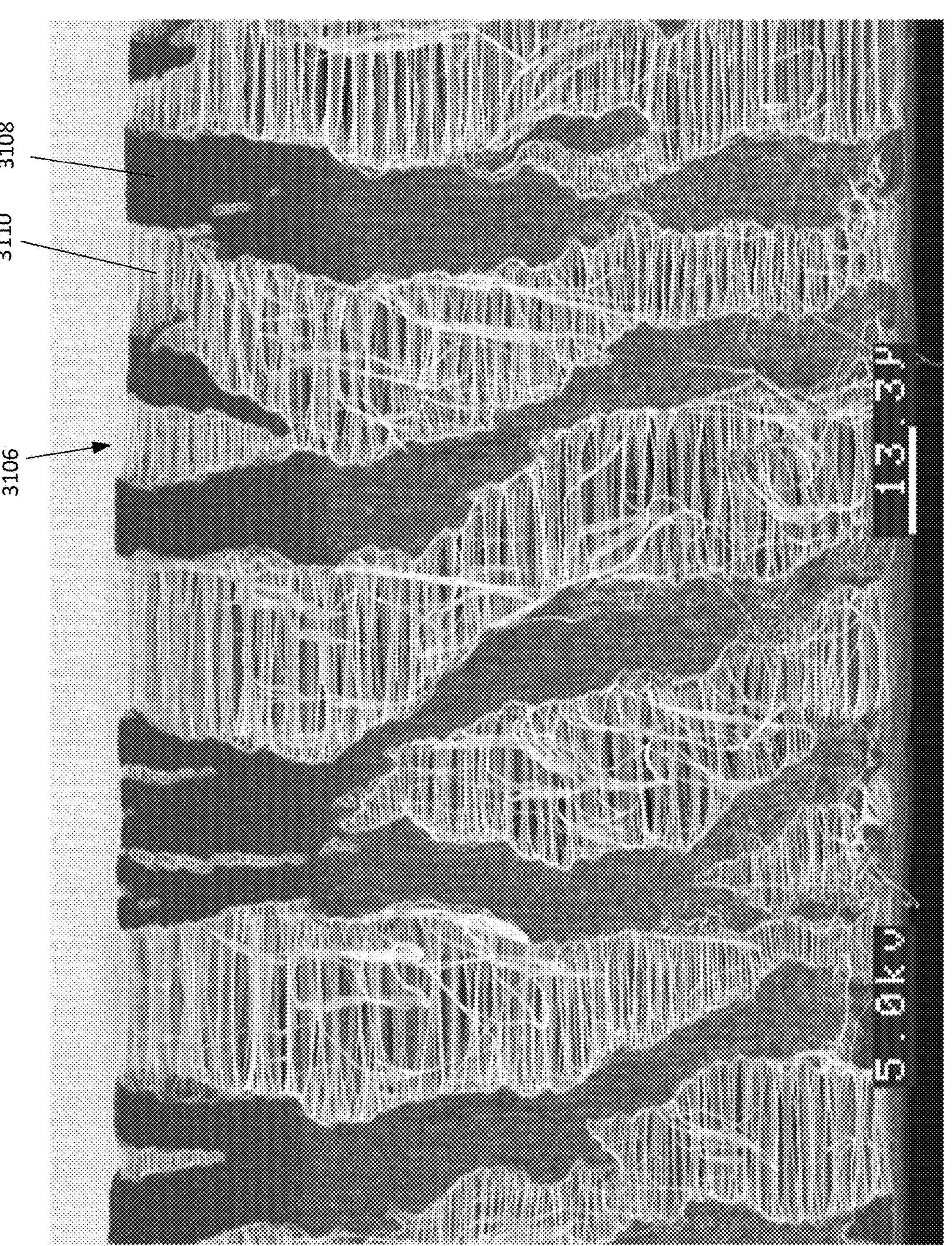
FIG. 34 is an SEM image of a cross-sectional view of the ePTFE article of FIG. 30 (the image is to scale)

FIG. 33 is an SEM image of a woven fabric with openings formed between each "thread" of fabric. Due to the size of such openings, foreign particles may enter through the fabric and the internal particles may leave the fabric through these openings. FIG. 34 is an SEM image of a cross-sectional view of a non-woven microporous material (as compared to a top view shown in FIG. 30), for example the material forming the sorbent material layer 3100 as shown in FIGS. 31A and 31B, showing the nodes 3108, fibrils 3110, and the pores, openings, or spacings 3106 formed therebetween. Shown at the bottom of both FIGS. 30 and 34 is: "5.0 kv 13.3ρ." In some examples, the fabric of FIG. 33 and the non-woven material of FIG. 34 may have the same or similar rates of airflow, AP measurements, and/or void fraction measurements. The flow through the fabric may be due to the large through-void features, and the flow through the non-woven material may be due to the large number of small but interconnected void features (e.g., the internal pores, openings, or spacings).

Figure 35:
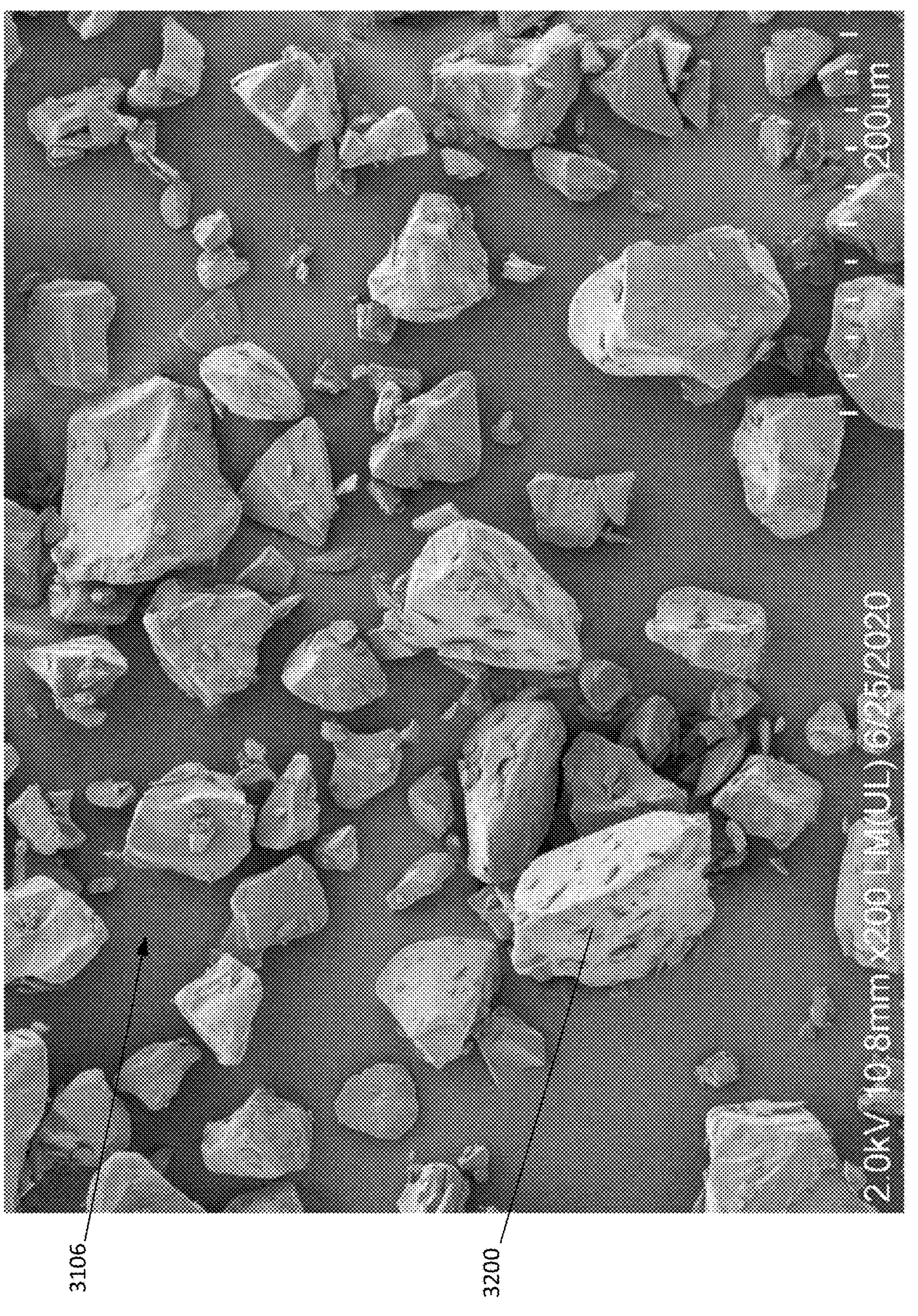
FIG. 35 is an SEM image of a top view of microporous material particles according to examples disclosed herein (the image is to the scale noted in the figure)
Figure 36:
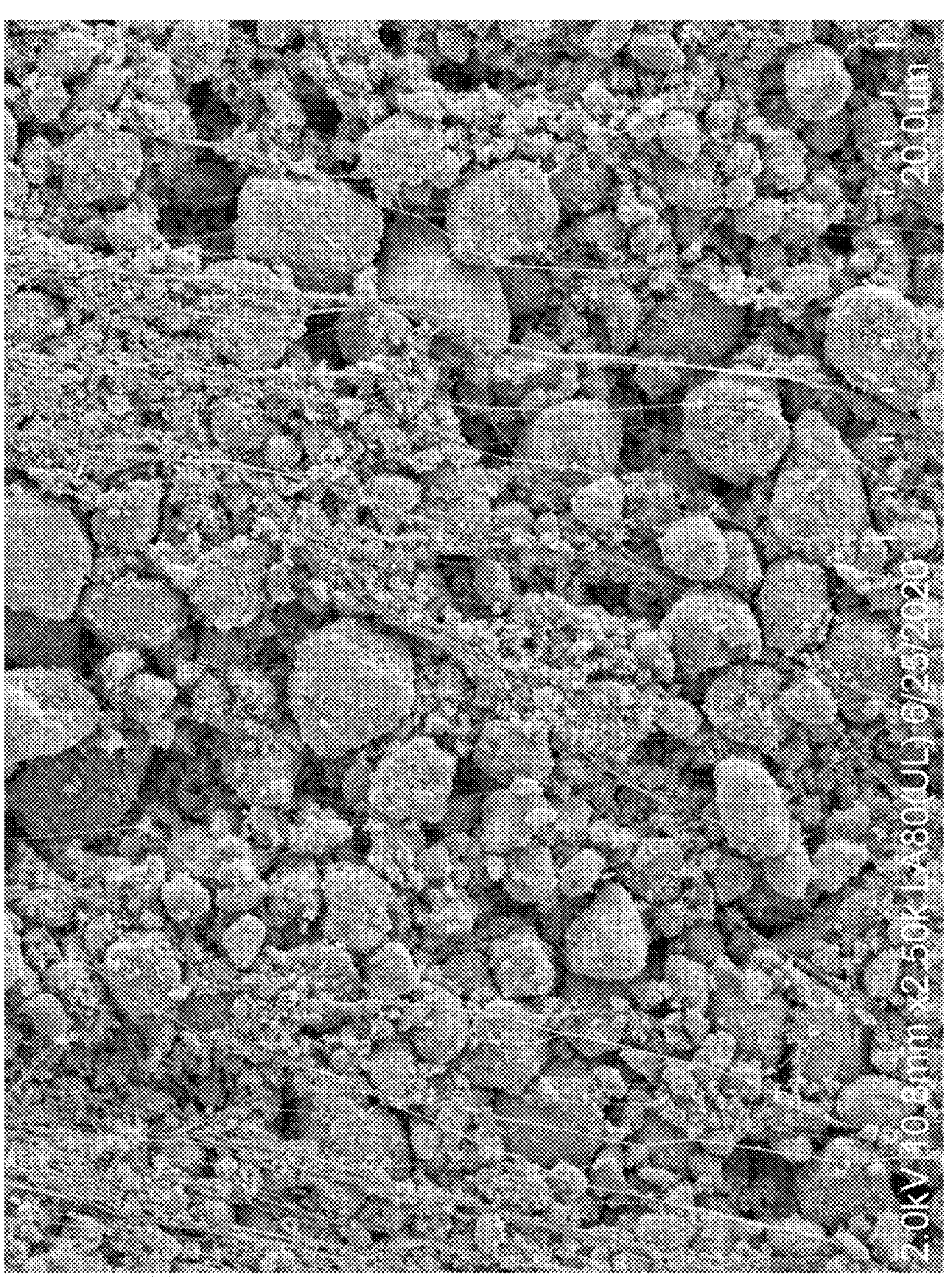
FIG. 36 is an SEM image of the top view of microporous material particles as shown in FIG. 35 (the image is to the scale noted in the figure).

FIG. 35 is an SEM image of a top view of microporous material particles, for example the particles 3200 forming the sorbent material layer 3100 as shown in FIGS. 32A and 32B, where the particles may have different and variable sizes and shapes or configurations. Some of the particles may be larger or smaller than the others, and some of the particles may be rounder or less round than the others. Displayed on the bottom of the image is: "2.9 kV 10.8 mm×200 LM (UL) Jun. 25, 2020." The distance between two subsequent white lines as shown at the bottom right hand corner represents 200 μm. FIG. 36 is another SEM image of the top view of microporous material particles as shown in FIG. 35 but at a greater magnification, where the distance between two subsequent white lines as shown at the bottom right hand corner represents 20 μm. Displayed on the bottom of the image is: "2.0 kV 10.8 mm×2.50 k LA80(UL) Jun. 25, 2020."

LIST OF REFERENCE SIGNS

1 Inlet gas stream, gas inflow, main gas inflow direction
2 Outlet gas stream, gas outflow, main gas outflow direction
3 Gas inlet channel
4 Gas outlet channel
5 Particulate sorbent material layer
6 Sheet of fabric material enclosing the sorbent material
7 Part of a frame, defining the geometrical structure of a sorbent layer and supporting the fabric material enclosing the sorbent material
8 Structure blocking the end of a gas inlet channel
9 Structure blocking the beginning of a gas outlet channel
10 Secondary heat transfer structure inside the sorbent material layer
11 Tube containing a heat transfer fluid, being part of the primary heat transfer structure inside the sorbent material layer
12 Z-profile being part of the frame defining the geometrical structure of a sorbent layer
13 Path of a by-pass gas flow along the edge of the packed bed of sorbent material inside the sorbent material layer
14 Container, enclosing the stack of the layers of sorbent material
15 Gas outlet manifold
16 Valve/lid opening and sealing the outlet manifold with respect to the environment
17 C-profile being part of the frame defining the geometrical structure of a sorbent layer
18 inlet face
19 outlet face
20 heat transfer structure in thermal model
21 sorbent material in thermal model
22 thermal contact resistance in thermal model
23 wedge formed spacers at edges
24 mounting screw
25 mounting and orienting screw
26 wedge formed spacers on
27 heat transfer fluid distributor
28 heat transfer fluid return line
100 external support structure
200 flexible connection sites or components
2200 base portions
2202 deflected portions
2204 openings
2206 internal volume
2400 porous laminate material layer
2402 endcaps
3100 sorbent material layer
3101 first portion
3102 first side
3103 second portion
3104 second side
3105 third portion
3106 pores or openings
3108 nodes
3110 fibrils
3112 foreign particles
3200 sorbent particles
d distance between 18 and 19
d1 a larger cross-sectional thickness of the sorbent material layer
d2 a smaller cross-sectional thickness of the sorbent material layer
Tb temperature boundary in thermal model
L distance between fin groups

What is claimed is:

1. A gas separation unit for the separation of a first gas from a mixture comprising said first gas as well as further gases different from the first gas by using a cyclic adsorption/desorption process that uses a loose particulate sorbent material for gas adsorption, the gas separation unit comprising:

the loose particulate sorbent material arranged in at least two stacked layers, wherein each respective layer of the at least two stacked layers comprises two sheets of a flexible porous material, the flexible porous material being gas permeable but impermeable to the loose particulate sorbent material, and an external support structure comprising a plurality of base portions, deflected portions, and openings between the base portions and the deflected portions, wherein:

(1) the loose particulate sorbent material is disposed within an internal volume of the external support structure and supported by the external support structure, (2) the at least two stacked layers are arranged essentially parallel to each other defining an inlet face of each respective layer of the at least two stacked layers and an outlet face of each respective layer of the at least two stacked layers, (3) the loose particulate sorbent material of each respective layer of the at least two stacked layers is arranged between the two sheets of the flexible porous material of each respective layer with a distance between the two sheets being in the range of 0.1-2.5 cm, and (4) the two sheets of the flexible porous material of each respective layer enclosing a cavity in which the loose particulate sorbent material of the respective layer is located, a gas inlet side or gas inlet manifold through which an inflow of gas mixture enters the gas separation unit, and a gas outlet side or gas outlet manifold through which a gas outflow exits the gas separation unit, wherein a gas pathway from the inflow to the outflow being confined in the gas separation unit to pass through at least one layer of the at least two stacked layers, wherein directionality of the inflow and the outflow through the external support structure is controlled by the deflected portions of the external support structure;

wherein the at least two stacked layers are arranged in the gas separation unit such that the inflow passes through the inlet face, subsequently through the particulate sorbent material located in the cavity of the respective layer of the at least two stacked layers, and subsequently to exit the respective layer through the outlet face to form the gas outflow;

wherein the at least two stacked layers are arranged such that inlet faces of adjacent layers of the at least two stacked layers are facing each other enclosing gas inlet channels and such that outlet faces are facing each other enclosing gas outlet channels;

wherein the mean distance between adjacent inlet faces and/or adjacent outlet faces defining said channels, measured in a direction essentially perpendicular to a main gas inflow direction and a main gas outflow direction, respectively, is in the range of 0.5-5 cm;

wherein the length of the inlet face and/or of the outlet face in a direction parallel to the main gas inflow direction and the main gas outflow direction, respectively, is at least ten times larger than a distance (d) between the two sheets in the respective layer of the at least two stacked layers; and wherein at least one layer of the at least two stacked layers is provided with primary heat exchange elements, the primary heat exchange elements comprising a tubing comprising a heat exchange fluid, in combination with secondary heat exchange elements for increasing the heat transfer between the sorbent material and the heat exchange elements.

2. The gas separation unit according to claim 1, wherein the base portions and deflected portions of the external support structure are formed from a continuous sheet of rigid material.

3. The gas separation unit according to claim 2, wherein the external support structure forms a cheese grate, louver, or fishnet configuration.

4. The gas separation unit according to claim 1, wherein the plurality of base portions are separate components that are attached or affixed to each other.

5. The gas separation unit according to claim 1, wherein the loose particulate sorbent material includes at least a first set of particulate with a first size and a second set of particulate with a second size smaller than the first size.

6. The gas separation unit according to claim 5, wherein the first set occupies a first region within the internal volume, and the second set occupies a second region within the internal volume that is different from the first region.

7. The gas separation unit according to claim 5, wherein the external support structure has a tapering configuration.

8. The gas separation unit according to claim 1, wherein the external support structure comprises at least one endcap through which the loose particulate sorbent material is provided to fill the support structure.

9. The gas separation unit according to claim 1, wherein the length of the inlet face and/or of the outlet face in a direction parallel to the main gas inflow direction and the main gas outflow direction, respectively, is at least 40 times larger than distance (d) between the sheets in the layer.

10. The gas separation unit according to claim 1, wherein the flexible porous material comprises a hydrophobic material.

11. The gas separation unit according to claim 1, wherein the at least two stacked layers comprise more than five (5) layers, and the more than five layers are either:

stacked essentially parallel to each other in the unit; or stacked under relative inclination angles in the range of 0.2-15°, the corresponding inlet channels converging in the main gas inflow direction and the corresponding outlet channels widening in the main gas outflow direction.

12. The gas separation unit according to claim 1, wherein the at least two stacked layers are essentially planar structures stacked essentially parallel to each other, or wherein the layers are essentially cylindrical structures arranged concentrically to each other.

13. The gas separation unit according to claim 1, wherein spacers are located within said layers.

14. The gas separation unit according to claim 1, wherein the primary heat exchange elements or secondary heat exchange elements also act as frame structure supporting the sheets of flexible porous material.

15. The gas separation unit according to claim 1, wherein the secondary heat exchange elements further comprise an expanded material.

16. The gas separation unit according to claim 1, wherein the loose particulate sorbent material is an amine-modified particulate material.

17. The gas separation unit according to claim 1, wherein the external support structure is provided with holes into which the loose particulate sorbent material is filled and the openings of which holes are closed after filling in the sorbent material.

18. The gas separation unit according to claim 1, wherein the gas separation unit comprises a surrounding cage comprising gas inlet openings for the inflow and gas outlet openings for the outflow, wherein the surrounding cage is gastight other than the gas inlet openings and gas outlet openings.

19. The gas separation unit according to claim 1, wherein the two sheets of each respective layer are separated from each other by a distance in the range of 0.5-1.5 cm, or wherein the mean distance between adjacent inlet faces or adjacent outlet faces, measured in a direction essentially parallel to a main gas inflow direction and the main gas outflow direction, respectively, is in the range of 0.5-1.5 cm.

20. The gas separation unit according to claim 1, wherein the length of at least one of the inlet face or of the outlet face in a direction parallel to the main gas inflow direction and the main gas outflow direction, respectively, is at least 80 times larger than a distance (d) between the two sheets in the respective layer.

21. The gas separation unit according to claim 1, wherein the flexible porous material is a flexible fabric material that is woven or nonwoven textile material, the flexible fabric material comprising polymeric fibers or yarns, the polymeric fibers or yarns comprising at least one of expanded polytetrafluoroethylene (ePTFE), expanded polyethylene (ePE), polyethylene terephthalate (PET), or polyethylene (PE).

22. The gas separation unit according to claim 1, wherein the at least two stacked layers comprise more than 20 layers, and the more than 20 layers are either:

stacked essentially parallel to each other in the unit, by using a stack of corresponding external support structures; or stacked under relative inclination angles in the range of 0.5-10°, the corresponding inlet channels converging in the main gas inflow direction and the corresponding outlet channels widening in the main gas outflow direction, wherein the inlet channels are closed at their downstream ends by lateral edges of adjacent layers being in contact, and wherein the outlet channels are closed at their upstream end by lateral edges of adjacent layers.

23. The gas separation unit according to claim 1, wherein spacers are located within said layers, the spacers being rigid bar or rail structures, including T, H, C, or Z-bar structures, or being provided by junctures or seams between the sheets.

24. The gas separation unit according to claim 1, wherein the primary heat exchange elements or the secondary heat exchange elements also act as frame structure supporting the sheets of flexible porous material.

25. The gas separation unit according to claim 1, wherein the secondary heat exchange elements comprises an expanded metal including a corrugated expanded metal.

26. The gas separation unit according to claim 1, wherein the loose particulate sorbent material is an amine-modified particulate material, the amine-modified particulate material comprising an amine-modified nanofibrilated cellulose with an average particle diameter in the range of 60 to 1200 μm, for the adsorption of carbon dioxide.

27. The gas separation unit according to claim 1, comprising a surrounding cage, the surrounding cage comprising gas inlet openings for the inflow and gas outlet openings for the outflow, wherein the surrounding cage is gastight other than the gas inlet openings and gas outlet openings, the surrounding cage being made of a flexible material or a stiff material, and the surrounding cage being attached to a vacuum unit for the desorption process, wherein the gas inlet openings and/or the gas outlet openings are provided with controllable lids or valves for changing between adsorption and desorption stages.

28. The gas separation unit according to claim 1, wherein the loose particulate sorbent material of each respective layer is arranged between the two sheets of the flexible porous material of each respective layer with a distance between the two sheets being in the range of 0.1-0.5 cm.

29. A method for extracting carbon dioxide from air or flue gases in a cyclic adsorption/desorption process that uses a loose particulate sorbent material for gas adsorption, comprising:

using a gas separation unit according to claim 1 to adsorb carbon dioxide or carbon dioxide and water vapor, wherein the adsorption takes place in a temperature range of −30-40° C. and at 0.7 to 1.3 bar absolute pressure, and after the adsorption of carbon dioxide or carbon dioxide and water vapor the sorbent material is desorbed by heating it up to 50-120° C. and reducing the partial pressure of $CO_2$ around the sorbent material by reducing the absolute pressure, and/or exposing the sorbent material to a purge gas flow.

30. A gas separation unit for the separation of a first gas from a mixture comprising said first gas as well as further gases different from the first gas by using a cyclic adsorption/desorption process using a loose particulate sorbent material for gas adsorption, the gas separation unit comprising:

the loose particulate sorbent material arranged in at least two stacked layers, wherein each respective layer of the at least two stacked layers comprises two sheets of a flexible porous material, the flexible porous material being gas permeable but impermeable to the loose particulate sorbent material, and an external support structure comprising a plurality of base portions, deflected portions, and openings between the base portions and the deflected portions, wherein:

(1) the loose particulate sorbent material disposed within an internal volume of the external support structure and supported by the external support structure, (2) the at least two stacked layers arranged essentially parallel to each other defining an inlet face of each respective layer of the at least two stacked layers and an outlet face of each respective layer of the at least two stacked layers, (3) the loose particulate sorbent material of each respective layer of the at least two stacked layers arranged between the two sheets of the flexible porous material of each respective layer with a distance between the two sheets being in the range of 0.1-2.5 cm, and (4) the two sheets of the flexible porous material of each respective layer enclosing a cavity in which the loose particulate sorbent material of the respective layer is located, a gas inlet side or gas inlet manifold through which an inflow of gas mixture enters the gas separation unit, and a gas outlet side or gas outlet manifold through which a gas outflow exits the gas separation unit, wherein a gas pathway from the inflow to the outflow being confined in the gas separation unit to pass through at least one layer of the at least two stacked layers, wherein directionality of the inflow and the outflow through the external support structure is controlled by the deflected portions of the external support structure;

wherein the at least two stacked layers are arranged in the gas separation unit such that the inflow passes through the inlet face, subsequently through the particulate sorbent material located in the cavity of the respective layer of the at least two stacked layers, and subsequently to exit the respective layer through the outlet face to form the gas outflow;

wherein the at least two stacked layers are arranged such that inlet faces of adjacent layers of the at least two stacked layers are facing each other enclosing gas inlet channels and such that outlet faces are facing each other enclosing gas outlet channels;

wherein the mean distance between adjacent inlet faces and/or adjacent outlet faces defining said channels, measured in a direction essentially perpendicular to a main gas inflow direction and a main gas outflow direction, respectively, is in the range of 0.5-5 cm;

wherein the length of the inlet face and/or of the outlet face in a direction parallel to the main gas inflow direction and the main gas outflow direction, respectively, is at least ten times larger than a distance (d) between the two sheets in the respective layer of the at least two stacked layers; and wherein each respective layer of the at least two stacked layers comprises tubing and stackable backbone elements, wherein means are provided in or at the stackable backbone elements for fluid transfer attachment of ends of the tubing, and wherein the stackable backbone elements can be connected to each other, to transfer heat transfer fluid to and from the tubing in the respective layers of the at least two stacked layers.

31. A gas separation unit for the separation of a first gas from a mixture comprising said first gas as well as further gases different from the first gas by using a cyclic adsorption/desorption process using a loose particulate sorbent material for gas adsorption, the gas separation unit comprising:

the loose particulate sorbent material arranged in at least two stacked layers, wherein each respective layer of the at least two stacked layers comprises two sheets of a flexible porous material, the flexible porous material being gas permeable but impermeable to the loose particulate sorbent material, and an external support structure comprising a plurality of base portions, deflected portions, and openings therebetween, wherein the loose particulate sorbent material is disposed within an internal volume of the external support structure and supported by the external support structure, the at least two stacked layers are arranged essentially parallel to each other defining an inlet face of each respective layer of the at least two stacked layers and an outlet face of each respective layer of the at least two stacked layers, the loose particulate sorbent material of each respective layer of the at least two stacked layers is arranged between the two sheets of the flexible porous material of each respective layer with a distance between the two sheets being in the range of 0.1-2.5 cm, and the two sheets of the flexible porous material of each respective layer enclosing a cavity in which the loose particulate sorbent material of the respective layer is located, a gas inlet side or gas inlet manifold through which an inflow of gas mixture enters the gas separation unit, and a gas outlet side or gas outlet manifold through which a gas outflow exits the gas separation unit, wherein a gas pathway from the inflow to the outflow being confined in the gas separation unit to pass through at least one layer of the at least two stacked layers, wherein directionality of the inflow and the outflow through the external support structure is controlled by the deflected portions of the external support structure;

wherein the at least two stacked layers are arranged in the gas separation unit such that the inflow passes through the inlet face, subsequently through the particulate sorbent material located in the cavity of the respective layer of the at least two stacked layers, and subsequently to exit the respective layer through the outlet face to form the gas outflow;

wherein the at least two stacked layers are arranged such that inlet faces of adjacent layers of the at least two stacked layers are facing each other enclosing gas inlet channels and such that outlet faces are facing each other enclosing gas outlet channels;

wherein the mean distance between adjacent inlet faces and/or adjacent outlet faces defining said channels, measured in a direction essentially perpendicular to a main gas inflow direction and a main gas outflow direction, respectively, is in the range of 0.5-5 cm;

wherein the length of the inlet face and/or of the outlet face in a direction parallel to the main gas inflow direction and the main gas outflow direction, respectively, is at least ten times larger than a distance (d) between the two sheets in the respective layer of the at least two stacked layers, and wherein each respective layer of the at least two stacked layers comprises tubing and stackable backbone elements, in or as part of the external support structure, wherein means are provided in or at said stackable backbone elements for fluid transfer attachment of ends of the tubing, wherein the stackable backbone elements can be connected to each other, directly or via further tubing, involving using O-rings, to transfer heat transfer fluid to and from the tubing in the respective layers of the at least two stacked layers, wherein the stackable backbone elements are cylindrical elements with a diameter in the range of 1 to 5 cm and wherein the tubing of a primary heat exchange structure as well as a secondary heat exchange structure can be directly included in the external support structure during an injection molding process.

* * * * *